(12) United States Patent
Miura et al.

(10) Patent No.: US 9,165,146 B2
(45) Date of Patent: Oct. 20, 2015

(54) CONTENT MANAGEMENT DEVICE AND CONTENT MANAGEMENT METHOD

(75) Inventors: Kouji Miura, Osaka (JP); Natsume Matsuzaki, Osaka (JP); Yuichi Futa, Ishikawa (JP); Shunji Harada, Osaka (JO); Hideki Matsushima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 294 days.

(21) Appl. No.: 13/877,833

(22) PCT Filed: Aug. 7, 2012

(86) PCT No.: PCT/JP2012/005019
§ 371 (c)(1),
(2), (4) Date: Apr. 4, 2013

(87) PCT Pub. No.: WO2013/031101
PCT Pub. Date: Mar. 7, 2013

(65) Prior Publication Data
US 2013/0191927 A1 Jul. 25, 2013

(30) Foreign Application Priority Data
Aug. 26, 2011 (JP) ................................ 2011-184348

(51) Int. Cl.
*G06F 21/60* (2013.01)
*G06F 21/10* (2013.01)
*G06Q 10/10* (2012.01)

(52) U.S. Cl.
CPC ................ *G06F 21/60* (2013.01); *G06F 21/10* (2013.01); *G06Q 10/101* (2013.01)

(58) Field of Classification Search
CPC ........ G06F 21/60; G06F 21/10; G06Q 10/101
USPC .......................................................... 726/26
See application file for complete search history.

(56) References Cited

U.S. PATENT DOCUMENTS

| 7,428,621 | B1* | 9/2008 | Todd et al. ..................... 711/161 |
| 7,698,516 | B2* | 4/2010 | Todd et al. ..................... 711/161 |
| 8,347,224 | B2* | 1/2013 | Abe et al. ...................... 715/781 |
| 8,831,409 | B1* | 9/2014 | Chang et al. .................. 386/295 |
| 8,914,603 | B2* | 12/2014 | Panje ............................ 711/170 |
| 8,954,852 | B2* | 2/2015 | Oetzel et al. .................. 715/720 |
| 2008/0010410 | A1* | 1/2008 | Zilbershtein et al. ......... 711/118 |
| 2010/0114949 | A1 | 5/2010 | Sakamoto |
| 2012/0005253 | A1 | 1/2012 | Marivoet et al. |

FOREIGN PATENT DOCUMENTS

| JP | 2002-169758 | 6/2002 | |
| JP | 2003-91647 | 3/2003 | |
| JP | 2004-178525 | 6/2004 | |
| JP | 2005-108017 | 4/2005 | |
| JP | 2007-323306 | 12/2007 | |
| JP | 2007323306 | * 12/2007 | ............. G06F 21/24 |
| JP | 2008-109410 | 5/2008 | |
| JP | 2008-186183 | 8/2008 | |
| JP | 2010-113523 | 5/2010 | |
| JP | 2011-175427 | 9/2011 | |
| JP | 2012-8770 | 1/2012 | |
| WO | 2010/087793 | 8/2010 | |

OTHER PUBLICATIONS

International Search Report issued Nov. 6, 2012 in International (PCT) Application No. PCT/JP2012/005019.

* cited by examiner

*Primary Examiner* — Kambiz Zand
*Assistant Examiner* — Tongoc Tran
(74) *Attorney, Agent, or Firm* — Wenderoth, Lind & Ponack, L.L.P.

(57) ABSTRACT

Provided is a content management device for protecting a content of a provider. A content management device 800 deletes one or more contents shared with and held by a user of another device. The content management device 800 comprises: a sharing unit 801 configured to distribute the contents to the user and thereby share the contents with the user; and a switching unit 802 configured to switch a method of the deletion to another method according to a time elapsed from the distribution.

20 Claims, 42 Drawing Sheets

FIG. 5

Content management table 120

| Content ID | Content management information | | |
|---|---|---|---|
| | Content file path | Thumbnail file path | Shooting date and time |
| 1234567890 | /usr/c/20110421.jpg | /usr/s/s20110421.jpg | 20110421102358 |
| 1234777 | /usr/c/20110520.jpg | /usr/s/s20110520.jpg | 20110520101500 |

FIG. 20A  User ID table

| User ID | User information ||||
|---|---|---|---|---|
| | User name | Password | Terminal ID | Terminal address |
| 1001EEFF | Kaori Tanaka | abc123 | 1234 | 123.123.1.101 |
| 2002AACC | Yukari Yamamoto | xby136 | 3642 | 123.123.1.102 |
| 3005ABCD | Sayuri Suzuki | 123xyz | 5792 | 123.123.1.103 |
| 1002AAAA | Ichiro Ito | 362ade | 2742 | 123.123.1.104 |

FIG. 20B  Sharing partner list

| Sharing source user ID | Sharing destination user ID |
|---|---|
| 1002AAAA | 1001EEFF |
| | 2002AACC |
| | 3005ABCD |

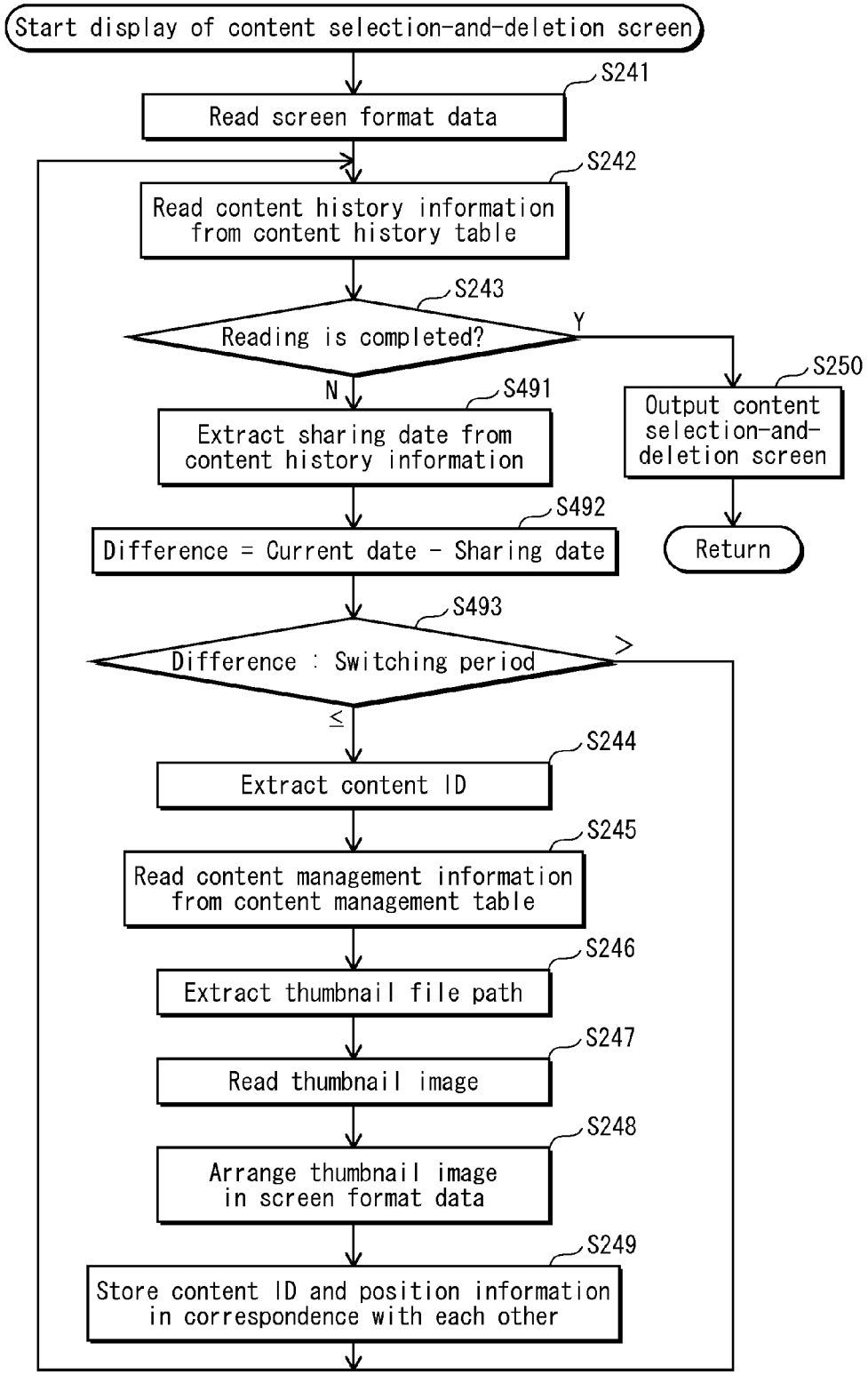

CONTENT MANAGEMENT DEVICE AND CONTENT MANAGEMENT METHOD

TECHNICAL FIELD

The present invention relates to a technology for managing contents shared with other users.

BACKGROUND ART

In recent years, digital cameras and digital movie cameras have been widely prevalent. Accordingly, it is becoming increasingly popular to store digital photographs and digital movies (hereinafter "photographs" and "movies") taken by such cameras into a communication device (hereinafter "terminal device") such as a personal computer (PC), and to view the photographs and the movies. Also, along with the spread of the Internet, the number of terminal devices connected to a network has been increased. As a result, contents (e.g., photographs and movies) stored in a terminal device are exchanged among friends via the network.

Patent Literature 1 discloses a service in which contents including video data and audio data are distributed to clients via a network. In a service as described above, a content provider can distribute contents to multiple clients by accessing a server via operation of his/her own terminal device. Patent Literature 2 discloses a technology for exchanging digital contents between terminal devices, such as mobile terminals, without intervention of a server.

CITATION LIST

Patent Literature

[Patent Literature 1]
Japanese Patent Application Publication No. 2003-091647
[Patent Literature 2]
Japanese Patent Application Publication No. 2005-108017
[Patent Literature 3]
Japanese Patent Application Publication No. 2011-175427
[Patent Literature 4]
Japanese Patent Application Publication No. 2012-008770
[Patent Literature 5]
Japanese Patent Application Publication No. 2008-186183

SUMMARY OF INVENTION

Technical Problem

However, contents of a content provider cannot be sufficiently protected if a recipient of the contents either duplicates, retouches, or distributes the contents without permission of the content provider.

In order to solve the above problems, one aspect of the present invention aims to provide a content management device, a server device, a content management method, a computer program, a recording medium, and an integrated circuit that each can protect contents of a provider.

Solution to Problem

In order to solve the above problem, one aspect of the present invention is a content management device for deleting one or more contents shared with and held by a user of another device, comprising: a sharing unit configured to distribute the contents to the user and thereby share the contents with the user; and a switching unit configured to switch a method of the deletion to another method according to a time elapsed from the distribution.

Advantageous Effects of Invention

The above aspect produces an advantageous effect of protecting the contents of a provider.

BRIEF DESCRIPTION OF DRAWINGS

FIG. 5 shows an example of the data structure of a content management table 120.
FIG. 11 shows an example of the data structure of a history table 161a.
FIG. 21 is a block diagram showing the structure of a reception terminal device 300a.

FIG. 39 is a block diagram showing the structure of a transmission terminal device 100a.

FIG. 41 is a flowchart showing the operations for transferring a command message among the transmission terminal device 100a, the relay server device 500, and the reception terminal device 300a.

FIG. 48 is a flowchart showing the details of the operations by the deletion processing unit 106 to display the content selection-and-deletion screen 461 according to a Modification.

DESCRIPTION OF EMBODIMENTS

Figure 1:
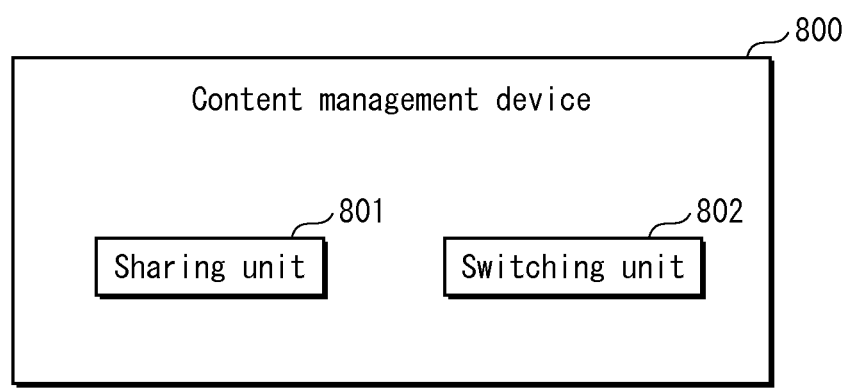
FIG. 1 is a block diagram showing the structure of a content management device 800 according to Embodiment 1.

1. Findings Serving as a Basis for the Present Invention

As described above in the Background Art, exchanging of contents has been quite popular. In such content distribution via a network, there is a case where a content provider wishes to delete content after having distributed the content.

The following describes an example in which a content provider wishes to delete content that has already been distributed.

(1) A content distributed by a content provider includes shooting location information acquired from a Global Positioning System (GPS). When distributing the content, the provider did not notice that the content included the shooting location information Immediately after distributing the content, the provider noticed that the content included the shooting location information. Accordingly, the provider wishes to delete the content to protect his/her privacy.

(2) The provider did not like his/her facial expression included in a distributed content. Accordingly, the provider wishes to delete the content.

(3) The provider has distributed a lot of contents to a friend. However, the friendship between the provider and the friend is over. Accordingly, the provider wishes to delete all contents that have been distributed to the friend thus far.

The present inventors have found the following characteristics about the combinations of sharing partners and shared contents.

A provider's demand for deleting an individual content shared with a user of another device (hereinafter, also referred to as "another user") arises within a relatively short period after distribution of the content. For example, deletion of a content including shooting location information of a GPS or deletion of a content occurring when replacing the content is often conducted immediately after distribution of the content.

In contrast, a provider's demand for deleting all contents shared with a particular user does not rely on a period after distribution of the contents. For example, if a content provider wishes to delete contents shared with a user because of a rift in a friendship with the user, the content provider is likely to wish to delete all contents shared with the user. Also, the timing for the deletion does not rely on a period after distribution of the contents.

In this way, a demand for deleting an individual content arises within a short period after distribution of the content. On the other hand, a demand for deleting all contents shared with a particular user arises regardless of a period after distribution of the contents.

In view of such characteristics, it is effective to switch methods for deleting a content according to the time elapsed after distribution of the content.

2. Aspects of the Present Invention

One aspect of the present invention is a content management device for deleting one or more contents shared with and held by a user of another device, comprising: a sharing unit configured to distribute the contents to the user and thereby share the contents with the user; and a switching unit configured to switch a method of the deletion to another method according to a time elapsed from the distribution.

According to this aspect, the shared contents can be deleted with use of either of the methods that are switched according to the time elapsed from the distribution.

The methods may include a first display method and a second display method, the first display method being for displaying information indicating the contents so as to delete one of the contents, and the second display method being for displaying information indicating the user so as to delete all of the contents.

According to this aspect, when deleting the shared contents, either the first display method for displaying information indicating the contents or the second display method for displaying information indicating the user can be used according to the time elapsed from the distribution.

The content management device may further comprise: a reception unit configured to receive a request for deleting either the one content or all of the contents with use of one of the first and second display methods to which the switching unit has switched; and a deletion instruction unit configured to give an instruction to delete either the one content or all of the contents according to the request.

This makes it possible to receive a request for deleting either the one content or all of the contents with use of one of the first and second display methods according to the time elapsed from the distribution, and to give an instruction to delete either the one content or all of the contents.

The content management device may further comprise a communication unit configured to transmit a deletion message according to the instruction by the deletion instruction unit.

According to this aspect, upon receiving the deletion message, the device can delete either the one content or all of the contents.

The methods may include a first deletion method and a second deletion method, the first deletion method being for deleting one of the contents, and the second deletion method being for deleting all of the contents.

According to this aspect, when deleting the shared contents, either the first deletion method for deleting one of the contents or the second deletion method being deleting all of the contents can be used according to the time elapsed from the distribution.

The content management device may further comprise: a reception unit configured to receive a request for deleting either the one content or all of the contents; and a deletion instruction unit configured to give an instruction to delete either the one content or all of the contents with use of one of the first and second deletion methods to which the switching unit has switched.

This makes it possible to give an instruction to delete either the one content or all of the contents with use of one of the first and second deletion methods according to the time elapsed from the distribution.

The content management device may further comprise a communication unit configured to transmit a deletion message according to the instruction by the deletion instruction unit.

According to this aspect, upon receiving the deletion message, the device can delete either the one content or all of the contents.

The switching unit may include: a rule holding unit holding a temporal rule defining switching of the methods according to the time elapsed from the distribution; and a switch configured to switch between the methods based on the temporal rule.

This makes it possible to switch between the methods based on the temporal rule.

The content management device may be a server device, and may further comprise a sharing history storage unit configured to store sharing history information on sharing of the contents with the user. The rule holding unit may hold, as the temporal rule, a timing at which the switching unit switches between display formats of the sharing history information. The switching unit may switch between the display formats according to the timing.

This makes it possible to switch between display formats of the sharing history information according to the timing defined by the temporal rule, and to display the sharing history information using the display format that has been switched to.

The content management device may be a terminal device of a user who provides the contents. The content management device may further comprise a sharing history storage unit configured to store sharing history information on sharing of the contents with the user of the other device. The rule holding unit may hold, as the temporal rule, a timing at which the switching unit switches a storage format of the sharing history information to another storage format. The switching unit may include a format conversion unit configured to convert the storage format according to the timing.

This makes it possible to switch between the storage formats of the sharing history information according to the timing defined by the temporal rule, resulting in reduction of unnecessary sharing history information and downsizing of overall sharing history information.

The content management device may further comprise a sharing history storage unit configured to store sharing history information on sharing of the contents with the user. The switching unit may include: a timing storage unit configured to store a timing at which a format of the sharing history information is converted; and a format conversion unit configured to convert the format according to the timing.

This makes it possible to convert the format of the sharing history information at an appropriate timing, resulting in reduction of unnecessary sharing history information and downsizing of overall sharing history information.

The sharing history information may at least include sharing time information indicating a time at which each of the contents was shared. The switching may be performed according to a time elapsed from the time indicated by the sharing time information.

This makes it possible to switch the method of the deletion of the contents according to the time elapsed from when the sharing was performed.

The switching unit may further include: a threshold storage unit storing a switching threshold; a time acquisition unit configured to acquire a current time; and a comparison unit configured to calculate a difference between the current time and the time indicated by the sharing time information, compare the difference to the switching threshold, and switch between the methods when the difference is larger than the switching threshold.

With this aspect, the difference between the current time and the sharing time is calculated. Then, the difference is compared to the threshold. According to a result of the comparison, the format of the sharing history information is converted. This makes it possible to uniformly determine the timing at which the format is converted.

The sharing history information may at least include one or more shared content identifiers identifying the one or more contents, and a sharing user identifier identifying the user.

The format conversion unit may delete the shared content identifiers from the sharing history information.

This makes it possible to reduce unnecessary sharing history information by deleting the shared content identifiers.

The sharing unit may be further configured to write the shared content identifiers and the sharing user identifier into the sharing history storage unit.

This makes it possible to include the shared content identifiers and the sharing user identifier in the sharing history information.

The sharing history information may at least include one or more shared content identifiers identifying the one or more contents, and a sharing terminal identifier identifying a terminal device that is the other device of the user. The format conversion unit may delete the shared content identifiers from the sharing history information.

This makes it possible to reduce unnecessary sharing history information by deleting the shared content identifiers.

The sharing unit may be further configured to write the shared content identifiers and the sharing terminal identifier into the sharing history storage unit.

This makes it possible to include the shared content identifiers and the sharing terminal identifier in the sharing history information.

The sharing history information may at least include one or more shared content identifiers identifying the one or more contents. The format conversion unit may replace the sharing history information including the one or more shared content identifiers with sharing history information composed of a sharing user identifier identifying the user.

This makes it possible to replace the sharing history information including the shared content identifiers with the sharing history information composed of the sharing user identifier identifying the user, resulting in downsizing of the sharing history information.

The sharing history information may at least include one or more shared content identifiers identifying the one or more contents. The format conversion unit may replace the sharing history information including the one or more shared content identifiers with sharing history information composed of a sharing terminal identifier identifying a terminal device that is the other device of the user.

This makes it possible to replace the sharing history information including the shared content identifiers with the sharing history information composed of the sharing terminal identifier, resulting in downsizing of the sharing history information.

The content management device may further comprise an input unit configured to receive an input of a timing at which the switching is performed. The switching unit may hold the timing received by the input unit.

This allows the user of the content management device to change the timing at which the method of the deletion of the contents is switched.

Another aspect of the present invention is a server device for deleting one or more contents shared with and held by a user of another device, comprising: a sharing unit configured to distribute the contents to the user and thereby share the contents with the user; and a switching unit configured to switch a method of the deletion to another method according to a time elapsed from the distribution.

According to this aspect, the shared contents can be deleted with use of either of the methods that are switched according to the time elapsed from the distribution.

Yet another aspect of the present invention is a content management method used in a content management device for deleting one or more contents shared with and held by a user of another device, the content management method comprising the steps of: distributing the contents to the user and thereby sharing the contents with the user; and switching a method of the deletion to another method according to a time elapsed from the distribution.

According to this aspect, the content management method is used in the content management device, whereby the shared contents can be deleted with use of either of the methods that are switched according to the time elapsed from the distribution.

Another aspect of the present invention is a computer program for a content management method used in a content management device for deleting one or more contents shared with and held by a user of another device, the computer program causing a computer to perform the steps of: distributing the contents to the user and thereby sharing the contents with the user; and switching a method of the deletion to another method according to a time elapsed from the distribution.

According to this aspect, the computer program is executed by the computer, whereby the shared contents can be deleted with use of either of the methods that are switched according to the time elapsed from the distribution.

Another aspect of the present invention is a computer-readable recording medium storing thereon a computer program for a content management method used in a content management device for deleting one or more contents shared with and held by a user of another device, the computer program causing a computer to perform the steps of: distributing the contents to the user and thereby sharing the contents with the user; and switching a method of the deletion to another method according to a time elapsed from the distribution.

According to this aspect, the computer program stored on the recording medium is executed by the computer, whereby the shared contents can be deleted with use of either of the methods that are switched according to the time elapsed from the distribution.

Another aspect of the present invention is an integrated circuit built in a content management device for deleting one or more contents shared with and held by a user of another device, the integrated circuit comprising: a sharing unit configured to distribute the contents to the user and thereby share the contents with the user; and a switching unit configured to switch a method of the deletion to another method according to a time elapsed from the distribution.

According to this aspect, the integrated circuit is built in the content management device, whereby the shared contents can be deleted with use of either of the methods that are switched according to the time elapsed from the distribution.

3. Embodiment 1

The following describes a content management device 800 according to Embodiment 1 of the present invention.

(1) The content management device 800 deletes one or more contents shared with and held by a user of another device.

As shown in FIG. 1, the content management device 800 comprises a sharing unit 801 and a switching unit 802.

The sharing unit 801 distributes the contents to the user and thereby shares the contents with the user.

The switching unit 802 switches a method of the deletion to another method according to a time elapsed from the distribution.

(2) The methods switched by the switching unit 802 may include a first display method and a second display method, the first display method being for displaying information indicating the contents so as to delete one of the contents, and the second display method being for displaying information indicating the user so as to delete all of the contents.

(3) The content management device 800 may further comprise: a reception unit that receives a request for deleting either the one content or all of the contents with use of one of the first and second display methods to which the switching unit 802 has switched; and a deletion instruction unit that gives an instruction to delete either the one content or all of the contents according to the request.

(4) The content management device 800 may further comprise a communication unit that transmits a deletion message according to the instruction by the deletion instruction unit.

(5) The methods switched by the switching unit 802 may include a first deletion method and a second deletion method, the first deletion method being for deleting one of the contents, and the second deletion method being for deleting all of the contents.

(6) The content management device 800 may further comprise: a reception unit that receives a request for deleting either the one content or all of the contents; and a deletion instruction unit that gives an instruction to delete either the one content or all of the contents with use of one of the first and second deletion methods to which the switching unit 802 has switched.

(7) The content management device 800 may further comprise a communication unit that transmits a deletion message according to the instruction by the deletion instruction unit.

(8) The switching unit 802 may include: a rule holding unit holding a temporal rule defining switching of the methods according to the time elapsed from the distribution; and a switch that switches between the methods based on the temporal rule.

(9) The content management device 800 may be a server device, and may further comprise a sharing history storage unit that stores sharing history information on sharing of the contents with the user. The rule holding unit holds, as the temporal rule, a timing at which the switching unit 802 switches between display formats of the sharing history information. The switching unit 802 switches between the display formats according to the timing.

(10) The content management device 800 may be a terminal device of a user who provides the contents. The content management device 800 further comprises a sharing history storage unit that stores sharing history information on sharing of the contents with the user of the other device. The rule holding unit holds, as the temporal rule, a timing at which the switching unit 802 switches a storage format of the sharing history information to another storage format. The switching unit 802 includes a format conversion unit that converts the storage format according to the timing.

(11) The content management device 800 may further comprise a sharing history storage unit that stores sharing history information on sharing of the contents with the user. The switching unit 802 includes: a timing storage unit that stores a timing at which a format of the sharing history information is converted; and a format conversion unit that converts the format according to the timing.

(12) The sharing history information may at least include sharing time information indicating a time at which each of the contents was shared. The switching by the switching unit 802 is performed according to a time elapsed from the time indicated by the sharing time information.

(13) The switching unit 802 may further include: a threshold storage unit storing a switching threshold; a time acquisition unit that acquires a current time; and a comparison unit that calculates a difference between the current time and the time indicated by the sharing time information, compares the difference to the switching threshold, and switches between the methods when the difference is larger than the switching threshold.

(14) The sharing history information may at least include one or more shared content identifiers identifying the one or more contents, and a sharing user identifier identifying the user. The format conversion unit deletes the shared content identifiers from the sharing history information.

(15) The sharing unit 801 may write the shared content identifiers and the sharing user identifier into the sharing history storage unit.

(16) The sharing history information may at least include one or more shared content identifiers identifying the one or more contents, and a sharing terminal identifier identifying a terminal device that is the other device of the user. The format conversion unit deletes the shared content identifiers from the sharing history information.

(17) The sharing unit 801 may write the shared content identifiers and the sharing terminal identifier into the sharing history storage unit.

(18) The sharing history information may at least include one or more shared content identifiers identifying the one or more contents. The format conversion unit replaces the sharing history information including the one or more shared content identifiers with sharing history information composed of a sharing user identifier identifying the user.

(19) The sharing history information may at least include one or more shared content identifiers identifying the one or more contents. The format conversion unit replaces the sharing history information including the one or more shared content identifiers with sharing history information composed of a sharing terminal identifier identifying a terminal device that is the other device of the user.

(20) The content management device 800 may further comprise an input unit that receives an input of a timing at which the switching is performed. The switching unit 802 holds the timing received by the input unit.

(21) The present invention according to Embodiment 1 may be a server device for deleting one or more contents shared with and held by a user of another device. The server device comprises: a sharing unit 801 that distributes the contents to the user and thereby shares the contents with the user; and a switching unit 802 that switches a method of the deletion to another method according to a time elapsed from the distribution.

(22) The present invention according to Embodiment 1 may be a content management method used in the content management device 800 for deleting one or more contents shared with and held by a user of another device. The content management method comprises the steps of: distributing the contents to the user and thereby sharing the contents with the user; and switching a method of the deletion to another method according to a time elapsed from the distribution.

(23) The present invention according to Embodiment 1 may be a computer program for a content management method used in the content management device 800 for deleting one or more contents shared with and held by a user of another device. The computer program causes a computer to perform the steps of: distributing the contents to the user and thereby sharing the contents with the user; and switching a method of the deletion to another method according to a time elapsed from the distribution.

(24) The present invention according to Embodiment 1 may be a computer-readable recording medium storing thereon a computer program for a content management method used in the content management device 800 for deleting one or more contents shared with and held by a user of another device. The computer program causes a computer to perform the steps of: distributing the contents to the user and thereby sharing the contents with the user; and switching a method of the deletion to another method according to a time elapsed from the distribution.

(25) The present invention according to Embodiment 1 may be an integrated circuit built in the content management device 800 for deleting one or more contents shared with and held by a user of another device. The integrated circuit comprises: a sharing unit 801 that distributes the contents to the user and thereby shares the contents with the user; and a switching unit 802 that switches a method of the deletion to another method according to a time elapsed from the distribution.

4. Embodiment 2

The following describes a terminal device 700 as an embodiment of the present invention.

Figure 2:
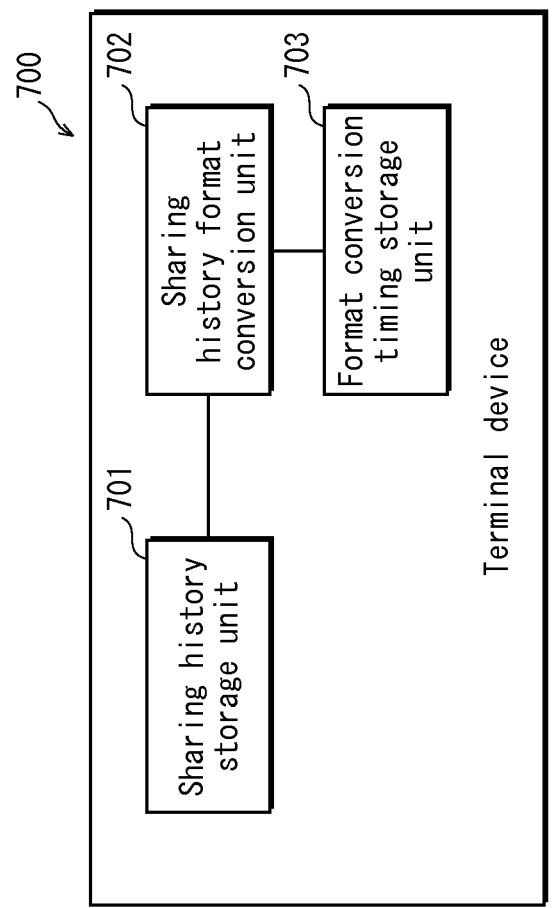
FIG. 2 is a block diagram showing the structure of a terminal device 700 according to Embodiment 2.

The terminal device 700 shares a content with another user, and deletes the content. As shown in FIG. 2, the terminal device 700 includes a sharing history storage unit 701, a sharing history format conversion unit 702, and a format conversion timing storage unit 703.

The sharing history storage unit 701 stores sharing history information.

The sharing history format conversion unit 702 converts a format of sharing history information stored in the sharing history storage unit 701.

The format conversion timing storage unit 703 stores a timing at which the sharing history format conversion unit 702 converts the format.

The sharing history format conversion unit 702 converts the format of the sharing history information according to the timing stored in the format conversion timing storage unit 703.

5. Embodiment 3

The following describes a data management system 20 as Embodiment 3 of the present invention, with reference to the drawings.

Figure 3:
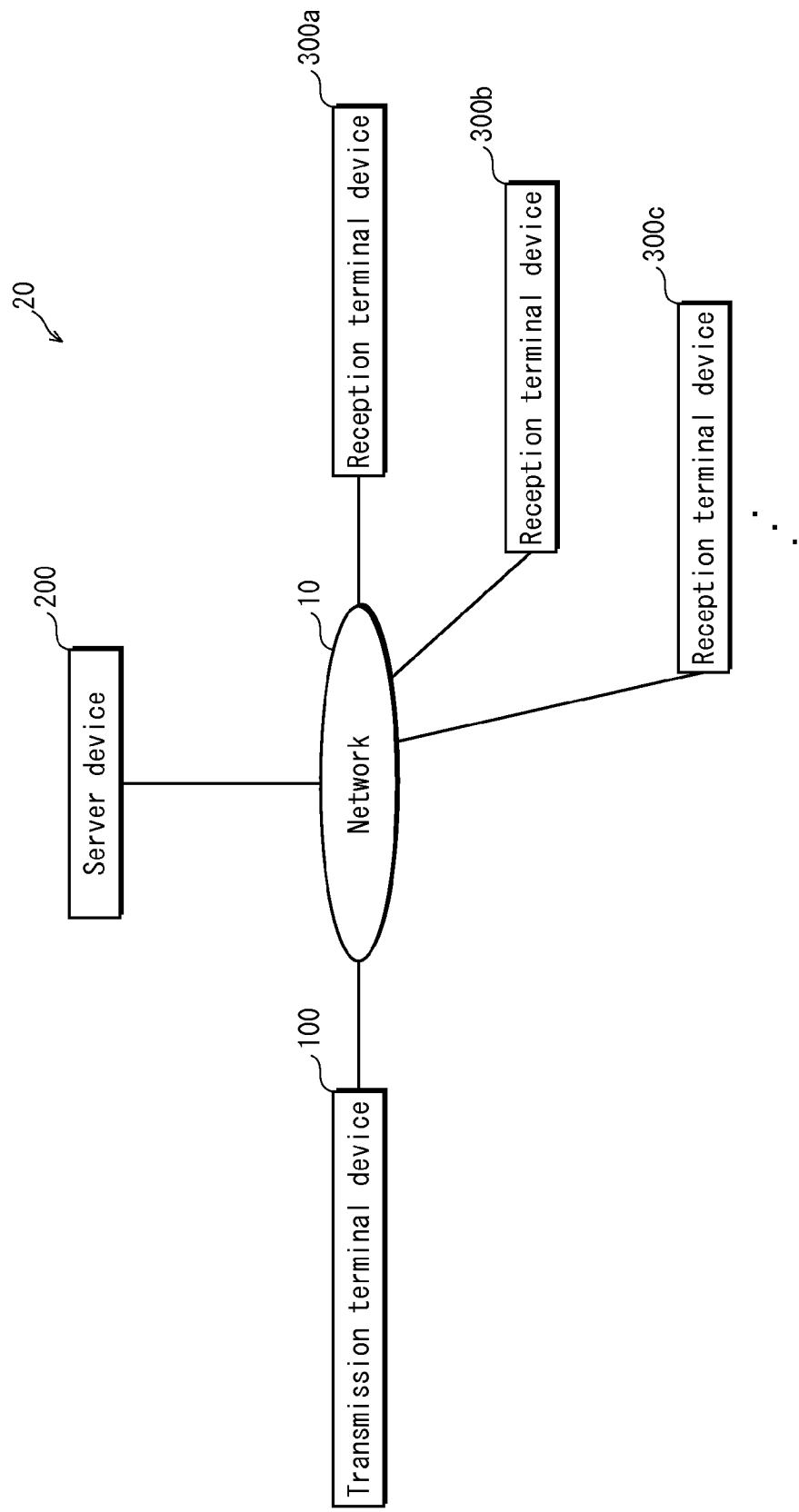
FIG. 3 is a block diagram showing the structure of a data management system 20 according to Embodiment 3.

As shown in FIG. 3, the data management system 20 is composed of a transmission terminal device 100, a server device 200, reception terminal devices 300a, 300b, 300c, . . . . The transmission terminal device 100, the server device 200, and the reception terminal devices 300a, 300b, 300c, . . . are connected to each other via a network 10.

5.1 Transmission Terminal Device 100

Figure 4:
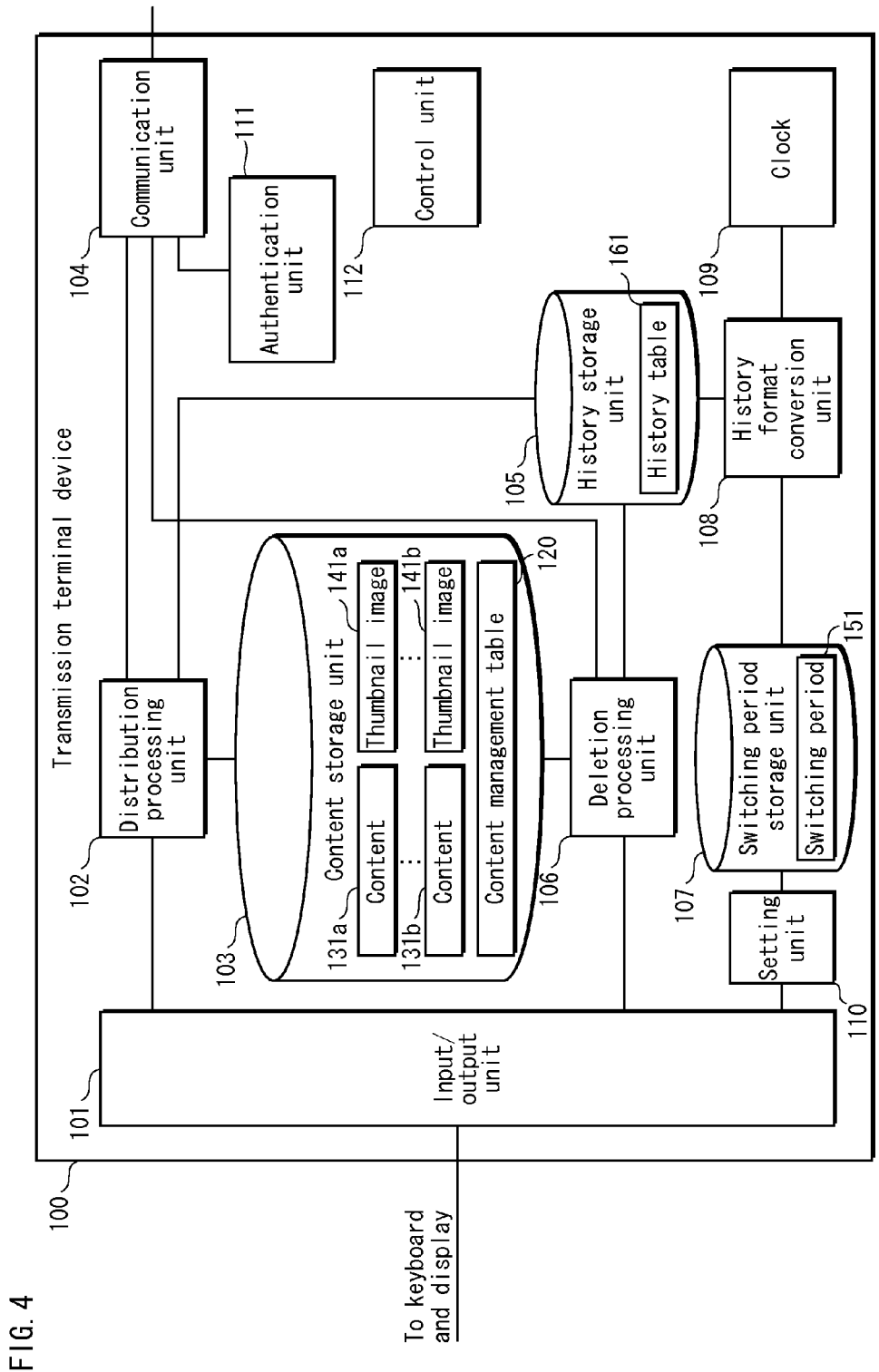
FIG. 4 is a block diagram showing the structure of a transmission terminal device 100.

As shown in FIG. 4, the transmission terminal device 100 includes an input/output unit 101, a distribution processing unit 102, a content storage unit 103, a communication unit 104, a history storage unit 105, a deletion processing unit 106, a switching period storage unit 107, a history format conversion unit 108, a clock 109, a setting unit 110, an authentication unit 111, and a control unit 112. The transmission terminal device 100 is connected to a remote control, a mouse, a keyboard, and a display unit.

The transmission terminal device 100 is specifically a computer system including a microprocessor, a ROM, a RAM, and a hard disk drive (HDD) unit. One of the RAM and the HDD unit stores computer programs. The microprocessor operates according to the computer programs, whereby the input/output unit 101, the distribution processing unit 102, the communication unit 104, the deletion processing unit 106, the history format conversion unit 108, the setting unit 110, the authentication unit 111, and the control unit 112 achieve parts of their functions.

(1) Content Storage Unit 103

For example, the content storage unit 103 is composed of a recording medium such as an HDD unit, and stores a plurality of contents 131a, . . . , 131b, and thumbnail images 141a, . . . , 141b thereof, and a content management table 120.

Note that the content storage unit 103 is not limited to being composed of a recording medium such as an HDD unit. For example, the content storage unit 103 may be composed of a different recording medium such as a semiconductor memory.

For example, each of the contents 131a, . . . , 131b is compressed data generated by compression of digital video and digital audio with high efficiency. The thumbnail images 141a, . . . , 141b respectively correspond to the contents 131a, . . . , 131b. Each of the thumbnail images 141a, . . . , 141b is compressed data generated by downsizing and compressing a representative still image of a corresponding one of the contents 131a, . . . , 131b. Each of the representative images is a still image from among a plurality of still images constituting the corresponding one of the contents 131a, . . . , 131b.

Note that each of the contents 131a, . . . , 131b is not limited to being compressed data generated by compression of video image and audio with high efficiency. For example, each of the contents 131a, . . . , 131b may be compressed data generated by compressing a still image, or compressed data generated by compressing audio. Alternatively, each of the contents 131a, . . . , 131b may be text data, a database, or a spreadsheet generated by spreadsheet software. In such a case, a list of content names may be displayed instead of thumbnail images, as described below.

The content management table 120 is management data for managing each content stored in the content storage unit 103. For example, the content management table 120 includes an area for storing one or more pieces of content management information, as shown in FIG. 5. The pieces of content management information stored in the content management table 120 correspond one-to-one to the contents 131a, . . . , 131b. Each piece of content management information is composed of a content ID, a content file path, a thumbnail file path, and a shooting date and time.

The content ID is identification information for uniquely identifying a corresponding content. The content file path is information indicating a position in the content storage unit 103 at which the corresponding content is stored, and the name of the content. The thumbnail file path is information indicating a position in the content storage unit 103 at which the thumbnail image of the corresponding content is stored, and the name of the thumbnail image. The shooting date and time indicates a date and time at which the corresponding content was shot. The shooting date and time is indicated by year, month, day, hour, minute, and second.

As shown in FIG. 5, content management information 125 includes a content ID 121 "1234567890", a content file path 122 "/usr/c/20110421.jpg", a thumbnail file path 123 "/usr/s/s20110421.jpg", and a shooting date and time 124 "20110421102358".

The content management information 125 indicates that: a corresponding content is identified by the content ID "1234567890"; the content is stored at a position in the content storage unit 103 indicated by the file path "/usr/c/20110421.jpg", with a name included by the file path "/usr/ c/20110421.jpg"; the thumbnail image of the content is stored at a position in the content storage unit 103 indicated by the file path "/usr/s/s20110421.jpg", with a name included by the file path "/usr/s/s20110421.jpg"; and the content was shot on Apr. 21, 2011, at 10 hours, 23 minutes, and 58 seconds.

(2) Switching Period Storage Unit 107

Figure 6:
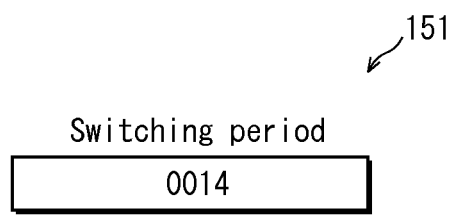
FIG. 6 shows an example of the data structure of a switching period 151.

For example, the switching period storage unit 107 is composed of a recording medium such as an HDD unit. The switching period storage unit 107 stores a switching period 151 as shown in FIG. 6, for example. Note that the switching period storage unit 107 is not limited to being composed of a recording medium such as an HDD unit. For example, the switching period storage unit 107 may be composed of a different recording medium such as a semiconductor memory.

The switching period 151 indicates the number of days that elapse after the date any of the contents in the content storage unit 103 was shared with any of the reception terminal devices 300a, 300b, 300c, . . . used by other users. Based on a reference date, which is a date on which the number of days indicated by the switching period 151 elapse after the date a content was shared, the format of history information that corresponds to the content and that is in a history table 161 (described later) stored in the history storage unit 105 is switched to another format. More specifically, the switching is performed before or after the reference date. Switching of the formats is described later.

For example, the switching period 151 is represented by four-digit numbers. In FIG. 6, the switching period 151 is represented by "0014", which indicates that the format of history information needs to be switched 14 days after the day a content was shared.

The switching period storage unit 107 stores the switching period 151 in advance. Alternatively, the switching period storage unit 107 may store a switching period input by a user via the input/output unit 101.

In the above example, the switching period storage unit 107 stores the single switching period 151. However, it is not limited to such.

The switching period storage unit 107 may store a plurality of switching periods each corresponding to a different type of content. For example, the switching period storage unit 107 may store a single switching period for a single content, and another switching period for an album content composed of a plurality of contents. As for the album content, a piece of history data is generated as many as the number of contents constituting the album content. Accordingly, the history data of the album content is larger in size than the history data of the single content. In view of this, the switching period of the single content may be set longer than the switching period of the album content, so that the larger the history data, the shorter the switching period. In this way, the switching period of the album content comes earlier than the single period, resulting in downsizing of the history data of the album content.

Alternatively, the switching period storage unit 107 may store a plurality of switching periods each corresponding to a different user with whom a content is shared. For example, the switching period storage unit 107 may store a switching period for a "user A" who is a content-sharing partner; store another switching period for a "user B" who is another content-sharing partner; and store yet another switching period for a "user C" who is yet another content-sharing partner.

For example, the switching periods of the respective users may be set such that the closer the friendship between a content provider and a user, the longer the switching period of the user. This is because, in general, the more distant the friendship, the more likely the friendship is to end. By setting the switching periods in the above-described manner, the switching period of a user with whom the friendship is more likely to end comes earlier than the switching periods of the other users, enabling downsizing of the history data.

Also, the users with whom contents are shared may belong to a group, and the switching period storage unit 107 may store switching periods each determined in accordance with the participation fee or participation period of the group. For example, the group may be a hobby group. For example, the switching period storage unit 107 may store a switching period for a user who belongs to the group for five years or longer, and may store another switching period for a user who belongs to the group less than 5 years.

For example, the switching periods of the respective users may be set such that the longer a user belongs to the group, the longer the switching period of the user, i.e., the shorter a user belongs to the group, the shorter the switching period of the user. This is because the shorter the participation period of the group, the more likely the trust relationship within the group is to fall apart. In this way, the switching period of a user whose participation period is shorter comes earlier than the switching period of a user whose participation period is longer, enabling downsizing of the history data.

Also, the switching period storage unit 107 may store a plurality of switching periods each corresponding to a different frequency of communication between the transmission terminal device 100 and a reception terminal device via the network. Here, the frequency of communication refers to the number of occurrences of communication between the transmission terminal device 100 and a reception terminal device within a unit period.

For example, the switching period storage unit 107 may store a switching period for a reception terminal device whose frequency of communication with the transmission terminal device 100 within a month is 100 times or greater; store another switching period for a reception terminal device whose frequency of communication therewith in a month is 10 times or greater and less than 100 times; and store yet another switching period whose frequency of communication therewith is less than 10 times. In this case, the switching periods of the respective users may be set such that the higher the frequency of communication with the reception terminal device of a user, the longer the switching period of the user, i.e., the lower the frequency of communication with the reception terminal device of a user, the shorter the switching period of the user. This is because the lower the frequency of communication, the more likely that the strength of the friendship with the user is low and the trust relationship with the user is to fall apart. By setting the switching periods in the above-described manner, the switching period of the user corresponding to a lower frequency of communication comes earlier than the switching period of a user corresponding to a higher frequency of communication, enabling downsizing of the history data.

(3) History Storage Unit 105

For example, the history storage unit 105 is composed of a recording medium such as an HDD unit, and stores the history table 161. Note that the history storage unit 105 is not limited to being composed of a recording medium such as an HDD unit. For example, the history storage unit 105 may be composed of a different recording medium such as a semiconductor memory.

Figure 7:
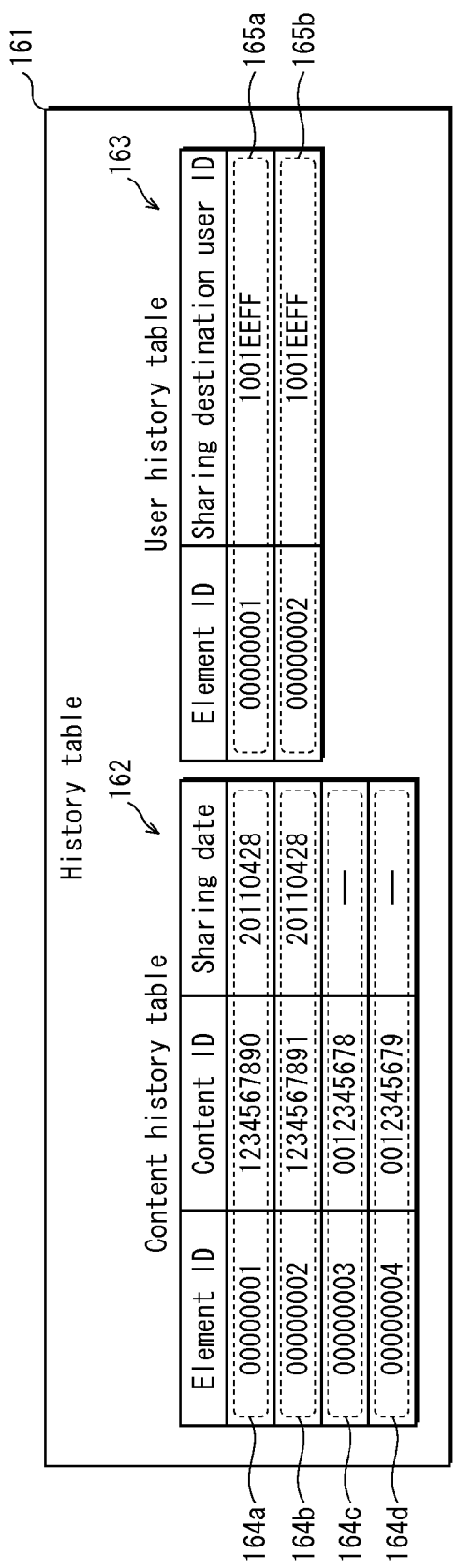
FIG. 7 shows an example of the data structure of a history table 161.

The history table 161 is a data table for storing a sharing history which indicates that each content provided by the transmission terminal device 100 is shared with one of the reception terminal devices. As shown in FIG. 7, the history table 161 is composed of a content history table 162 and a user history table 163.

As shown in FIG. 7, the content history table 162 includes an area for storing a plurality of pieces of content history information. The pieces of content history information correspond one-to-one to the contents targeted for registration with respect to the content history table 162. Each piece of content history information includes an element ID, a content ID, and a sharing date. Note that each piece of content history information may not include a sharing date during its generation process. The element ID is identification information identifying a corresponding piece of content history information, and is an eight-digit numerical value, for example. Note that the element ID is also used for the purpose of concatenating the corresponding piece of content history information in the content history table 162 with a corresponding piece of user history information in the user history table 163. The content ID is identification information identifying a corresponding content. The sharing date indicates the date on which the corresponding content was shared with one of the reception terminal devices.

As shown in FIG. 7, the content history table 162 includes pieces of content history information 164a, 164b, 164c, and 164d, for example. Each of the pieces of content history information 164a and 164b includes an element ID, a content ID, and a sharing date. Each of the pieces of content history information 164c and 164d includes an element ID and a content ID, but not a sharing date. Note that the pieces of content history information 164c and 164d are in an incomplete state during their generation process for the content history table 162. Each of the pieces of content history information 164c and 164d will include a sharing date upon completion of generation of the pieces of content history information 164c and 164d.

As shown in FIG. 7, the user history table 163 includes an area for storing a plurality of pieces of user history information. The pieces of user history information correspond one-to-one to users who are targeted for registration with respect to the user history table 163 and with whom contents are shared. Each piece of user history information includes an element ID and a sharing destination user ID. The element ID is identification information identifying a corresponding piece of user history information. As described above, the element ID is also used for the purpose of concatenating a piece of content history information in the content history table 162 with the piece of user history information in the user history table 163. The sharing destination user ID is identification information identifying a corresponding sharing destination user. The sharing destination user is a user, from among the users of the reception terminal devices 300a, 300b, 300c, . . . , with whom a content of the transmission terminal device 100 is shared.

As shown in FIG. 7, the user history table 163 includes pieces of user history information 165a and 165b. Each piece of user history information 165a and 165b includes an element ID and a sharing destination user ID.

As shown in FIG. 7, the content history information 164a and the user history information 165a correspond to each other, since each of the pieces of information 164a and 165a includes the same element ID "00000001". Also, the content history information 164a includes a content ID "1234567890" and a sharing date "20110428", and the user history information 165a includes a sharing destination user ID "1001EEFF". Accordingly, the content history information 164a and the user history information 165a indicate that the content identified by the content ID "1234567890" was shared by the user identified by the sharing destination user ID "1001EEFF" on Apr. 28, 2011. Similarly, the content history information 164b and the user history information 165b indicate that the content identified by a content ID "1234567891" was shared by the user identified by the user ID "1001EEFF" on Apr. 28, 2011.

(Short-Term Format and Long-Term Format)

The history table 161 of the history storage unit 105 has two types of data formats. One of the data formats is referred to as a short-term format, and the other as a long-term format. The short-term format is used when the switching period has not elapsed since the day a content was shared. The long-term format is used when the switching period has elapsed since the day a content was shared.

The data in the short-term format is composed of a pair consisting of a piece of content history information in the content history table 162 and a piece of user history information in the user history table 163. The piece of content history information and the piece of the user history information in the pair include the same element ID.

The content history information 164a and the user history information 165a constitute data in the short-term format. This is because the content history information 164a and the user history information 165a include the same element ID "00000001". Similarly, the content history information 164b and the user history information 165b constitute data in the short-term format.

In contrast, the data in the long-term format is composed of only a piece of user history information in the user history table 163. In this case, none of the pieces of content history information in the content history table 162 includes the same element ID as the element ID included in the piece of user history information.

As described above, the long-term format differs from the short-term format in that the data in the long-term format does not include a content ID and a sharing date.

In the above example, the history table 161 for managing the sharing history of contents is composed of the content history table 162 and the user history table 163. However, the history table 161 is not limited to having such a data structure. The history table may be provided in any format as long as it can store a content ID, a sharing date, and a sharing destination user ID. For example, the history table may include an area for storing a plurality of history information, and each piece of history information may include a content ID, a sharing date, and a sharing destination user ID. Also, each piece of history information may include other information.

(4) Input/Output Unit 101

The input/output unit 101 is a communication circuit connected to devices such as a remote control, a mouse, a keyboard, and a display unit, and transfers data among these devices. For example, the input/output unit 101 is realized by a communication circuit conforming to the USB (Universal Serial Bus) standard. The input/output unit 101 receives input data from the remote control, the mouse, and the keyboard, and outputs the input data to the setting unit 110, the distribution processing unit 102, and the deletion processing unit 106. Also, the input/output unit 101 receives display data from the setting unit 110, the distribution processing unit 102, and the deletion processing unit 106, and outputs the display data to the display unit.

(5) Setting Unit 110

Figure 8:
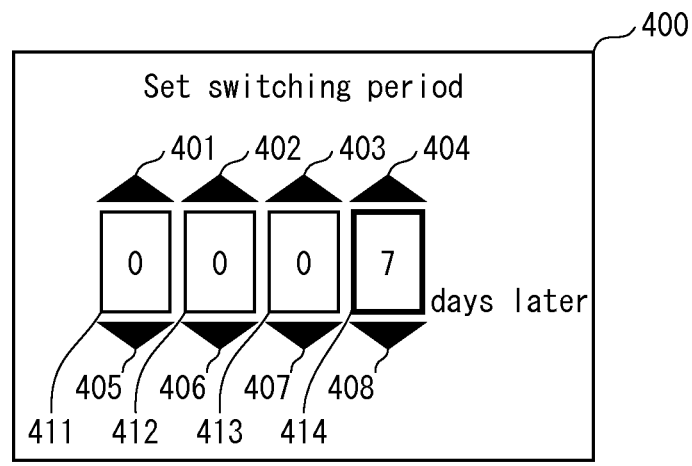
FIG. 8 shows a switching period setting screen 400 for setting a switching period.

The setting unit 110 stores screen format data that defines a switching period setting screen 400 for setting a switching period as shown in FIG. 8.

As shown in FIG. 8, the switching period setting screen 400 includes: input fields 411, 412, 413, and 414; and operation buttons 401, ..., 408. Each of the input fields 411, 412, 413, and 414 is a field for receiving a number corresponding to one of the digits of a four-digit number for the switching period, and for displaying the number. The operation button 401 is a button for changing the display of the input field 411 by adding "1" to the number displayed in the input field 411. The operation button 405 is a button for changing the display of the input field 411 by subtracting "1" from the number displayed in the input field 411. Similarly, the operation buttons 402 and 406 are buttons for adding and subtracting the number displayed in the input field 412; the operation buttons 403 and 407 are buttons for adding and subtracting the number displayed in the input field 413; and the operation buttons 404 and 408 are buttons for adding and subtracting the number displayed in the input field 414.

Note that the screen for setting the switching period is not limited to the switching period setting screen 400. The screen for setting the switching period is sufficient as long as it includes a field for receiving an input of the switching period.

(6) Distribution Processing Unit 102

The distribution processing unit 102 is a circuit that: receives a selection of a shared content; receives a selection of a sharing partner; generates a distribution command message; and transmits the distribution command message to any of the reception terminal devices 300a, 300b, 300c, ....

Figure 9:
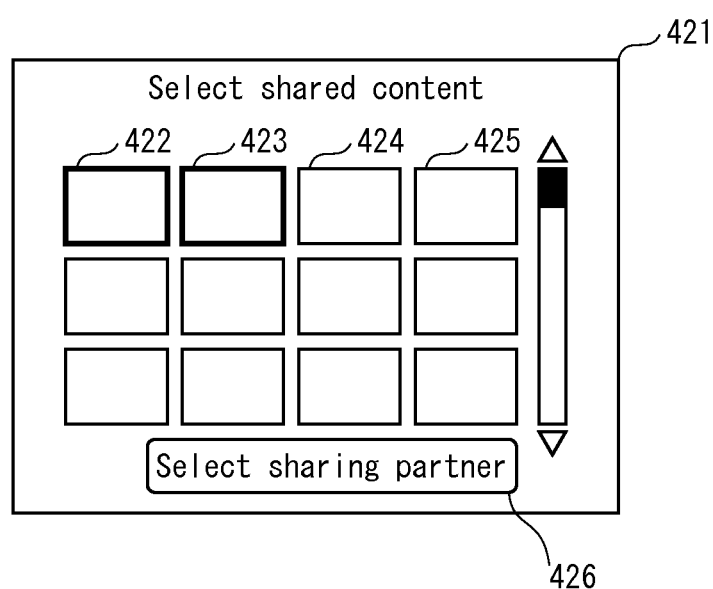
FIG. 9 shows a sharing content selection screen 421.
Figure 10:
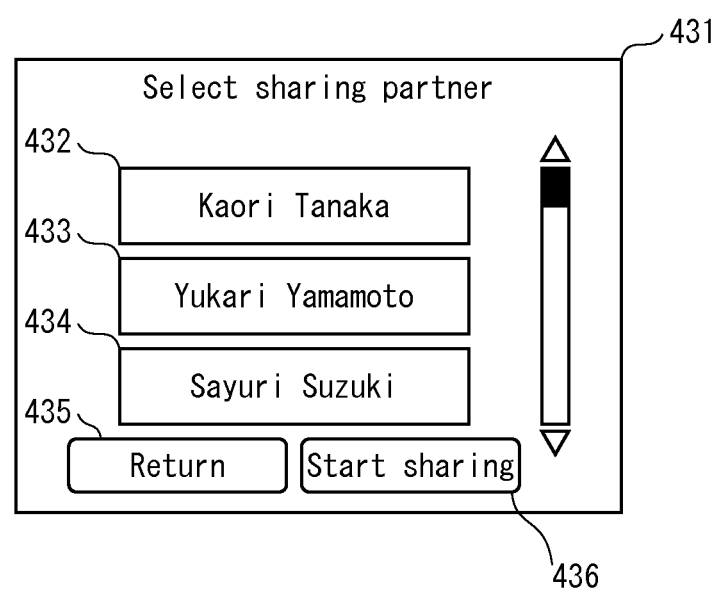
FIG. 10 shows a sharing partner selection screen 431.

For example, the distribution processing unit 102 stores two pieces of screen format data, one of which defines a sharing content selection screen 421 as shown in FIG. 9 and the other defines a sharing partner selection screen 431 as shown in FIG. 10.

The sharing content selection screen 421 shows a plurality of thumbnail images stored in the content storage unit 103, and is used by the user to select a content. On the sharing content selection screen 421, display frames 422, 423, 424, 425, ..., and a button 426 are arranged. The display frames 422, 423, 424, 425, ... are arranged in rows and columns in order to display the thumbnail images in rows and columns. The button 426 is provided for giving an instruction to switch to the sharing partner selection screen 431.

The sharing partner selection screen 431 shows the names of sharing partners, and is used by the user to select a sharing partner from among the sharing partners shown thereon. On the sharing partner selection screen 431, display frames 432, 433, 434, ..., a button 435, and a button 436 are arranged. The display frames 432, 433, 434, ... are provided for displaying the names of a plurality of sharing partners. The button 435 is provided for giving an instruction to return to the sharing content selection screen 421. The button 436 is provided for giving an instruction to start sharing.

(7) Communication Unit 104

The communication unit 104 is a communication circuit connected to the network 10. The communication unit 104 receives information from either the server device 200 or the reception terminal devices 300a, 300b, 300c, ..., and transmits information to either the server device 200 or the reception terminal devices 300a, 300b, 300c, ....

(8) Clock 109

The clock 109 is a circuit that holds the current date and outputs the current date.

(9) History Format Conversion Unit 108

The history format conversion unit 108 is a circuit that switches between the formats within the history table 161 stored in the history storage unit 105. Specifically, the history format conversion unit 108 performs the switching based on whether the switching period in the switching period storage unit 107 has elapsed from the day a content was shared.

(10) Deletion Processing Unit 106

The deletion processing unit 106 is a circuit that: generates either a content selection-and-deletion command message or a user selection-and-deletion command message, based on a deletion target content selected by the user; and transmits the message thus generated to the reception terminal devices 300a, 300b, 300c, ..., via the communication unit 104.

Figure 14:
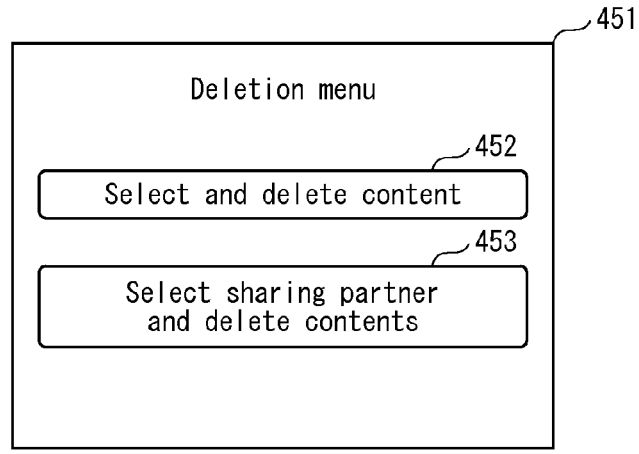
FIG. 14 shows a deletion menu screen 451.
Figure 15:
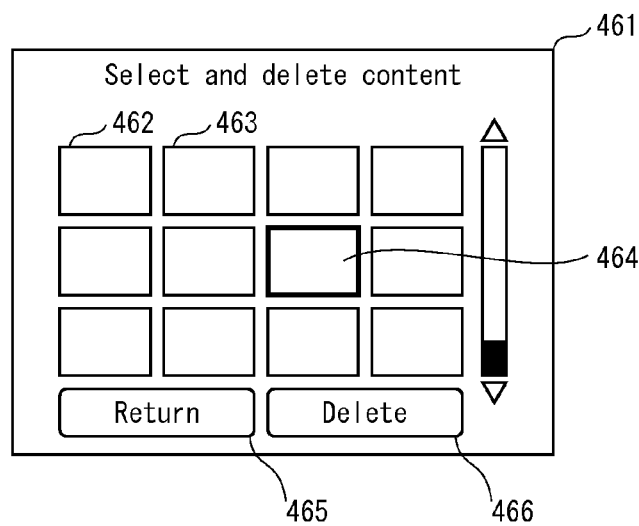
FIG. 15 shows a content selection-and-deletion screen 461.
Figure 16:
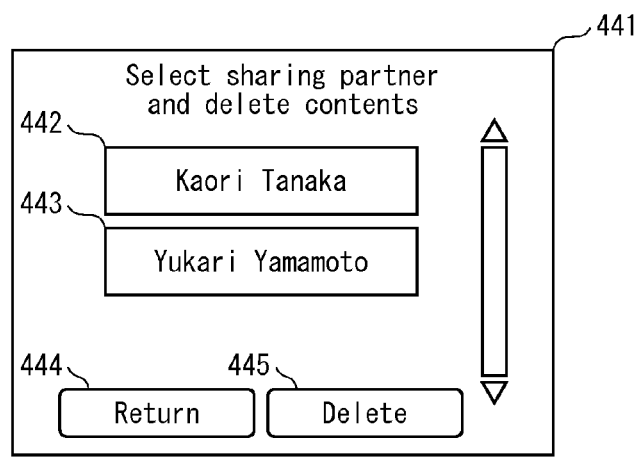
FIG. 16 shows a sharing partner selection-and-deletion screen 441.

The deletion processing unit 106 stores three pieces of screen format data, a first of which defines a deletion menu screen 451, a second of which defines a content selection-and-deletion screen 461, and a third of which defines a sharing partner selection-and-deletion screen 441, as shown by the examples shown in FIGS. 14 to 16.

On the deletion menu screen 451, buttons 452 and 453 are arranged as shown in FIG. 14. The button 452 is provided for selecting and deleting a content. The button 453 is provided for selecting and deleting a user. The deletion menu screen 451 is used to select whether to select and delete a content or to select and delete a user.

The content selection-and-deletion screen 461 shows a plurality of thumbnail images stored in the content storage unit 103, as shown in FIG. 15, and is used by the user to select a content to be deleted. On the content selection-and-deletion screen 461, display frames 462, 463, ..., and buttons 466 and 465 are arranged. The display frames 462, 463, ... are arranged in rows and columns in order to display the thumbnail images in rows and columns. The button 466 is provided for giving an instruction to perform deletion, and the button 465 is provided for returning to the deletion menu screen 451. A display frame 464 displaying a thumbnail image selected by the user is highlighted by a frame line thicker than those of the other display frames.

Furthermore, the sharing partner selection-and-deletion screen 441 shows the names of sharing partners, as shown in FIG. 16, and is used by the user to select a sharing partner whose contents are to be deleted from among the sharing partners shown thereon. All contents shared with the selected sharing partner are deleted. On the sharing partner selection-and-deletion screen 441, display frames 442, 443, ..., and buttons 445 and 444 are arranged. The display frames 442, 443, ... are provided for displaying the names of a plurality of sharing partners. The button 445 is provided for giving an instruction to perform deletion. The button 444 is provided for returning to the deletion menu screen 451.

(11) Authentication Unit 111

The authentication unit 111 performs challenge-response mutual authentication with the server device 200. Also, the authentication unit 111 performs challenge-response mutual authentication with the reception terminal devices 300a, 300b, 300c, ....

(12) Control Unit 112

The control unit 112 controls the coordination of operations by the input/output unit 101, the distribution processing unit 102, the communication unit 104, the deletion processing unit 106, the history format conversion unit 108, the clock 109, the setting unit 110, and the authentication unit 111.

5.2 Server Device 200

Figure 19:
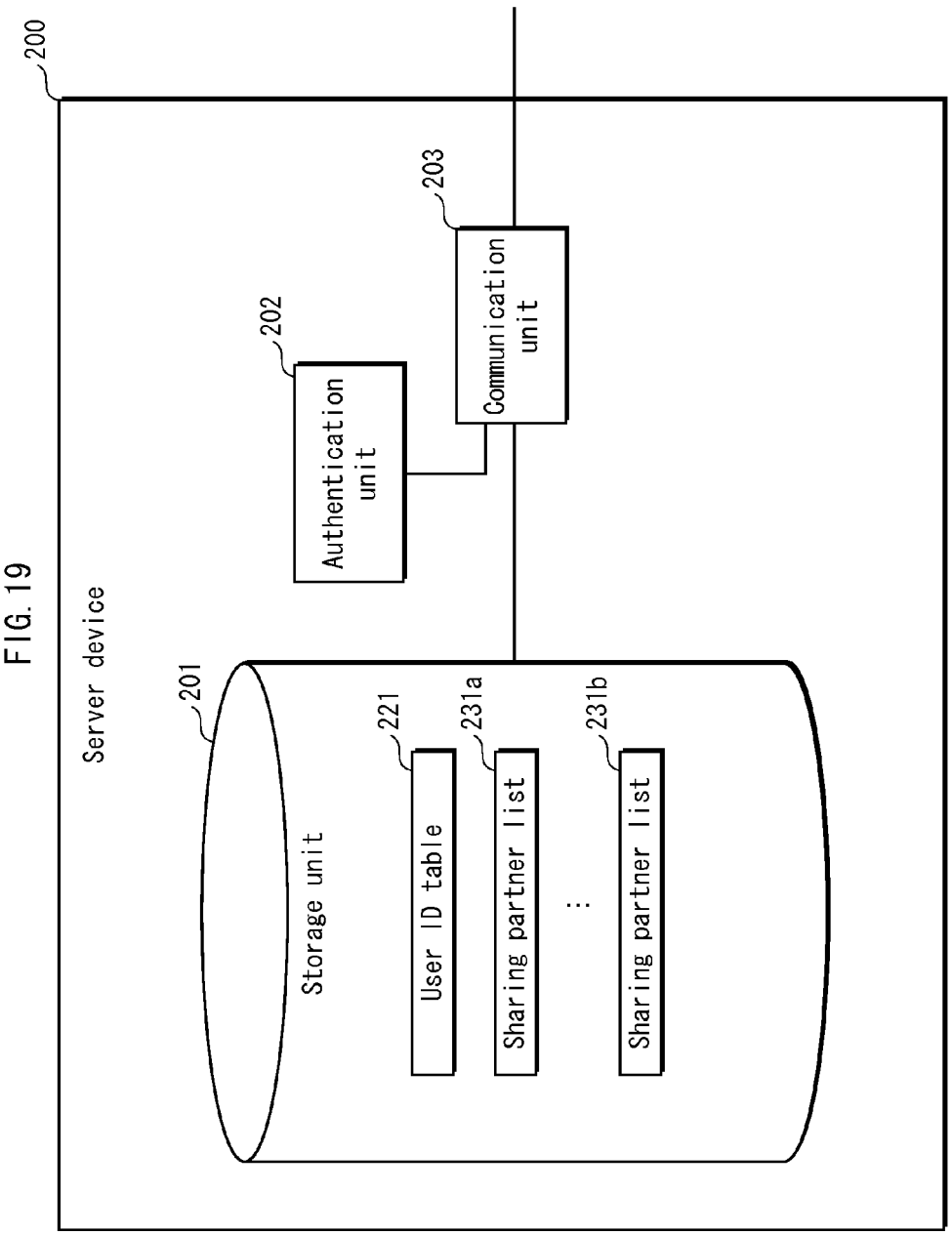
FIG. 19 is a block diagram showing the structure of a server device 200.

As shown in FIG. 19, the server device 200 is composed of a storage unit 201, an authentication unit 202, and a communication unit 203.

The server device 200 is specifically a computer system including a microprocessor, a ROM, a RAM, and a hard disk unit. The RAM or the hard disk unit stores computer programs. The authentication unit 202 and the communication unit 203 in the server device 200 achieve parts of their functions by the microprocessor operating according to the computer programs.

(1) Storage Unit 201

The storage unit 201 is composed of a hard disk unit, and stores a user ID table 221 and sharing partner lists 231a, . . . , 231b, as shown in FIG. 19.

(User ID Table 221)

Figure 20:
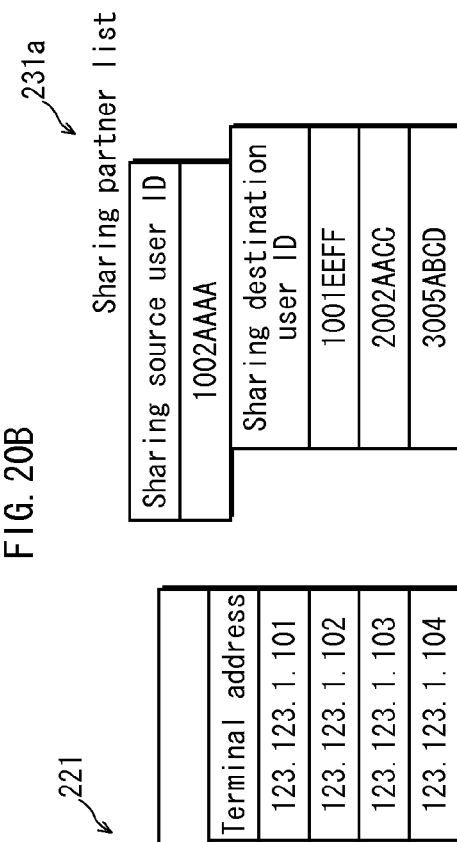
FIG. 20A shows an example of the data structure of a user ID table 221 stored in a storage unit 201.
FIG. 20B shows an example of the data structure of a sharing partner list 231a stored in the storage unit 201.

As shown in FIG. 20A as an example, the user ID table 221 includes an area for storing a plurality of pieces of user information. Each of the pieces of user information corresponds to one of the users registered in the server device 200, and is composed of a user ID, a user name, a password, a terminal ID, and a terminal address. The user ID is identification information identifying a corresponding user. The user name is the name of the user. The password is that assigned to the user. The terminal ID is identification information identifying the terminal device of the user. The terminal address is information indicating the position, in the network, at which the terminal device is arranged. For example, the terminal address is an IP address.

As shown in FIG. 20A, user IDs "1001EEFF", "2002AACC", "3005ABCD", and "1002AAAA" are registered in the user ID table 221, for example.

(Sharing Partner Lists 231a, . . . , 231b)

As shown in FIG. 20B, the sharing partner list 231a is a list generated in correspondence with a user who is the provider of a content, for example. The sharing partner list 231a is generated in correspondence with the user having the transmission terminal device 100, for example.

The sharing partner list 231a includes an area for storing a sharing source user ID and a plurality of sharing destination user IDs. The sharing source user ID is identification information identifying the user who is the provider of the content. Each of the sharing destination user IDs is identification information identifying a user who receives the content.

The other sharing partner lists have the same data structure as the sharing partner list 231a; therefore, a description thereof is omitted.

(2) Authentication Unit 202

The authentication unit 202 performs challenge-response mutual authentication with the transmission terminal device 100.

(3) Communication Unit 203

The communication unit 203 is a communication circuit connected to the network 10. The communication unit 203 receives information from the transmission terminal device 100, and transmits information to the transmission terminal device 100.

5.3 Reception Terminal Devices 300a, 300b, . . . , 300c

Figure 21:
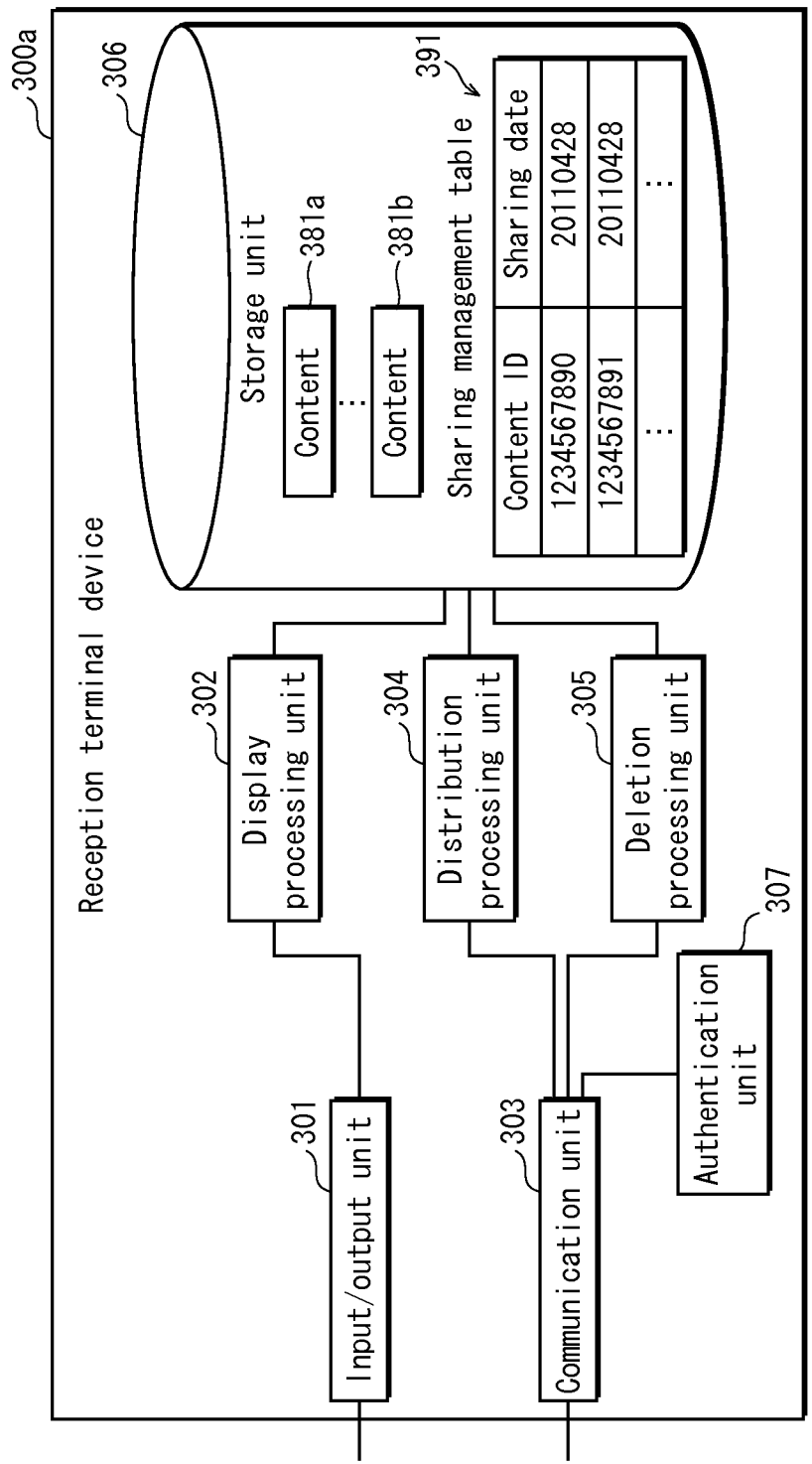

As shown in FIG. 21, the reception terminal device 300a is composed of an input/output unit 301, a display processing unit 302, a communication unit 303, a distribution processing unit 304, a deletion processing unit 305, a storage unit 306, and an authentication unit 307. The reception terminal device 300a is connected to a remote control, a mouse, a keyboard, and a display unit.

The reception terminal device 300a is specifically a computer system including a microprocessor, a ROM, a RAM, and a hard disk unit. The RAM or the hard disk unit stores computer programs. The microprocessor operates according to the computer programs, whereby the input/output unit 301, the display processing unit 302, the communication unit 303, the distribution processing unit 304, the deletion processing unit 305, and the authentication unit 307 included in the reception terminal device 300a achieve parts of their functions.

The reception terminal devices 300b, . . . , 300c have the same structure as the reception terminal device 300a. Accordingly, a description of the reception terminal devices 300b, . . . , 300c is omitted.

(1) Storage Unit 306

The storage unit 306 is composed of a hard disk unit, and stores contents 381a, . . . , 381b, and a sharing management table 391, as shown in FIG. 21.

(Contents 381a, . . . , 381b)

The contents 381a, . . . , 381b are contents transmitted from the transmission terminal device 100. Details of the contents are as described above.

(Sharing Management Table 391)

The sharing management table 391 is a data table that stores information regarding shared contents. For example, the sharing management table 391 includes an area for storing a plurality of pieces of sharing management information, as shown in FIG. 21.

The pieces of sharing management information correspond one-to-one to contents shared by the sharing destination user having the reception terminal device 300a. Each of the pieces of sharing management information is composed of a content ID and a sharing date. The content ID is identification information identifying a content provided by the user who is the provider of the content. The sharing date indicates the date on which the content was shared.

(2) Input/Output Unit 301

The input/output unit 301 is a communication circuit connected to devices such as a remote control, a mouse, a keyboard, and a display unit, and transfers data among these devices. Similarly to the input/output unit 101, the input/output unit 301 is realized by a communication circuit conforming to the USB standard, for example. The input/output unit 301 receives input data from the remote control, the mouse, and the keyboard, and outputs the input data to the display processing unit 302. Also, the input/output unit 301 receives display data from the display processing unit 302, and outputs the display data to the display unit.

(3) Display Processing Unit 302

The display processing unit 302 receives a content stored in the storage unit 306 in response to a user instruction received via the input/output unit 301, and outputs the content to the display unit via the input/output unit 301.

(4) Communication Unit 303

The communication unit 303 is a communication circuit connected to the network 10. The communication unit 303 receives information from the transmission terminal device 100, and transmits information to the transmission terminal device 100.

(5) Authentication Unit 307

The authentication unit 307 performs challenge-response mutual authentication with the transmission terminal device 100, prior to receipt of a command message. Only when the mutual authentication is successful, the authentication unit 307 permits the communication unit 303 to receive the command message from the transmission terminal device 100. When the mutual authentication fails, the authentication unit 307 causes the communication unit 303 to reject communication with the transmission terminal device 100.

(6) Distribution Processing Unit 304

Figure 12:
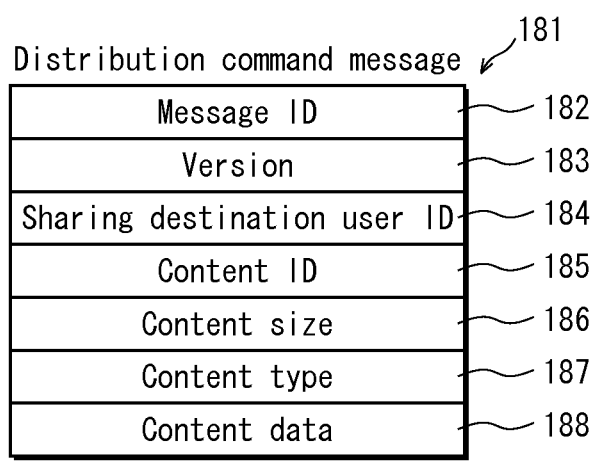
FIG. 12 shows an example of the data structure of a distribution command message 181.

When the mutual authentication by the authentication unit 307 with the transmission terminal device 100 is successful, the distribution processing unit 304 receives, for example, a distribution command message 181 shown in FIG. 12, from the transmission terminal device 100 via the network 10 and the communication unit 303.

(7) Deletion Processing Unit 305

Figure 17:
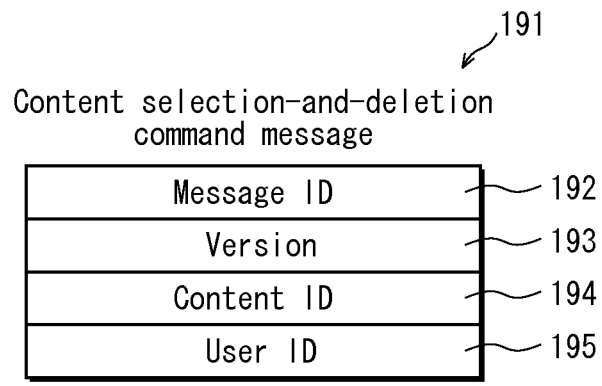
FIG. 17 shows an example of the data structure of a content selection-and-deletion command message 191.
Figure 18:
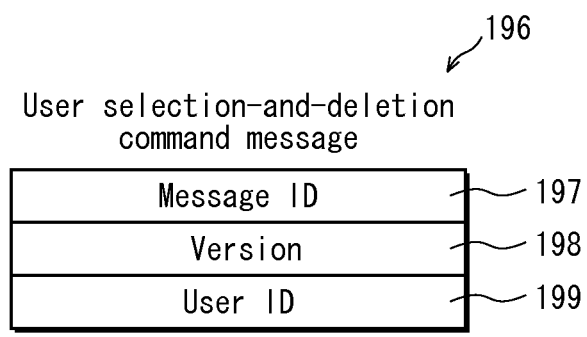
FIG. 18 shows an example of the data structure of a user selection-and-deletion command message 196.

When the mutual authentication by the authentication unit 307 with the transmission terminal device 100 is successful, the deletion processing unit 305 receives, for example, a content selection-and-deletion command message 191 shown in FIG. 17 or a user selection-and-deletion command message 196 shown in FIG. 18, from the transmission terminal device 100 via the network 10 and the communication unit 303.

5.4 Operations in Data Management System 20

The following describes in detail operations in the data management system 20.

(1) General Operations of Transmission Terminal Device 100

Figure 22:
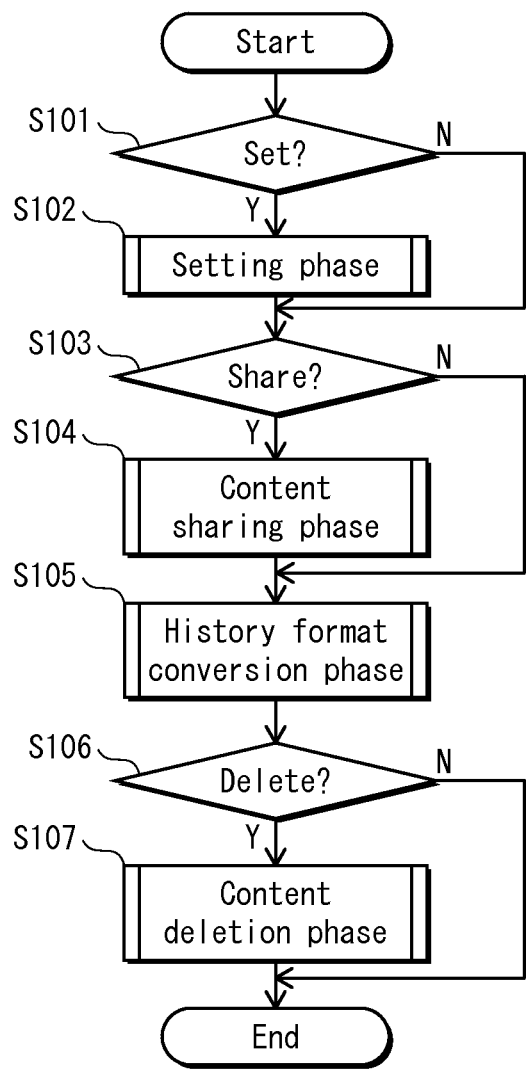
FIG. 22 is a flowchart showing the general operations of the transmission terminal device 100.

Here, general operations of the transmission terminal device 100 are described, with reference to the flowchart shown in FIG. 22.

An instruction for setting a switching period is input by the user via any of (i) an operation using a setting button of the remote control, (ii) an operation using the mouse, and (iii) an input operation using the keyboard. The setting unit 110 receives the instruction for setting a switching period from the remote control, the mouse, or the keyboard, via the input/output unit 101. Upon receiving the instruction for setting a switching period from the user (Y in step S101), the setting unit 110 performs operations for a setting phase (step S102). If not receiving the instruction for setting a switching period from the user (N in step S101), the setting unit 110 does not perform operations for the setting phase.

Next, an instruction for sharing a content is input by the user via any of (i) an operation using a button of the remote control, (ii) an operation using the mouse, and (iii) an input operation using the keyboard. The distribution processing unit 102 receives the instruction for sharing a content from the remote control, the mouse, or the keyboard, via the input/output unit 101. Upon receiving the instruction for sharing a content from the user (Y in step S103), the distribution processing unit 102 performs operations for a content sharing phase (step S104). If not receiving the instruction for sharing a content from the user (N in step S103), the distribution processing unit 102 does not perform the operations for the content sharing phase.

Next, the history format conversion unit 108 performs operations for a history format conversion phase (step S105).

Next, an instruction for deleting a content is input by the user via any of (i) an operation using a button of the remote control, (ii) an operation using the mouse, and (iii) an input operation using the keyboard. The deletion processing unit 106 receives the instruction for deleting a content from the remote control, the mouse, or the keyboard, via the input/output unit 101. Upon receiving the instruction for deleting a content from the user (Y in step S106), the deletion processing unit 106 performs operations for the content deletion phase (step S107). If not receiving the instruction for deleting a content from the user (N in step S106), the deletion processing unit 106 does not perform the operations for the content deletion phase.

(2) Operations of Setting Unit 110 in Transmission Terminal Device 100

Figure 23:
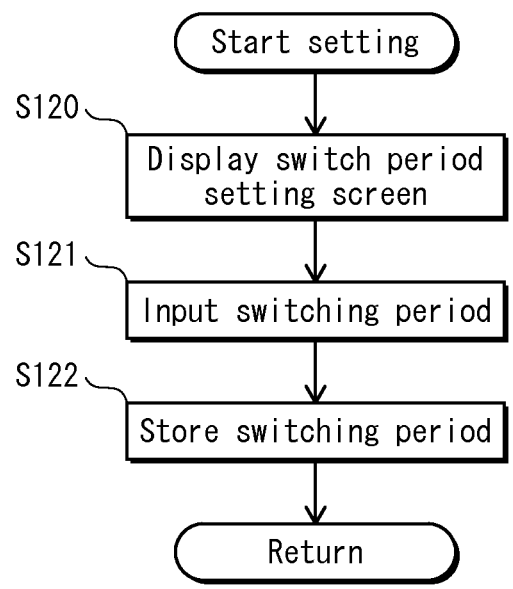
FIG. 23 is a flowchart showing the operations of a setting unit 110 of the transmission terminal device 100.

The following describes operations of the setting unit 110 in the transmission terminal device 100, with reference to the flowchart shown in FIG. 23.

The setting unit 110 reads screen format data defining the switching period setting screen 400, generates the switching period setting screen 400 using the screen format data, and outputs the switching period setting screen 400 thus generated to the display unit via the input/output unit 101 (step S120). Next, the setting unit 110 receives a switching period from the remote control, the mouse, or the keyboard (step S121), and writes the switching period as the switching period 151 into the switching period storage unit 107 (step S122).

(3) Operations for Sharing Content in Data Management System 20

Figure 24:
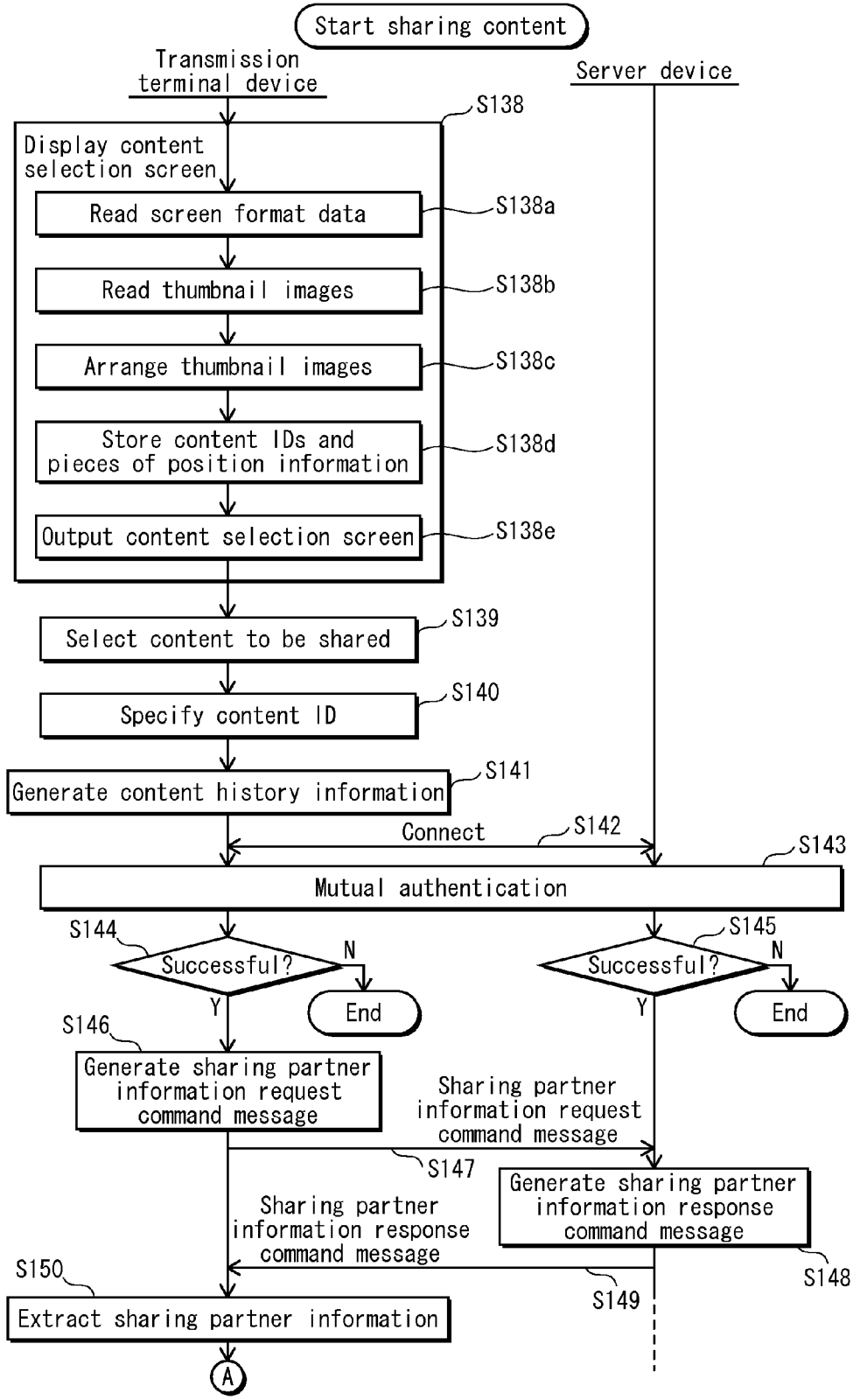
FIG. 24 is a flowchart showing the operations for sharing a content in the data management system 20, and is continued to FIG. 25.
Figure 25:
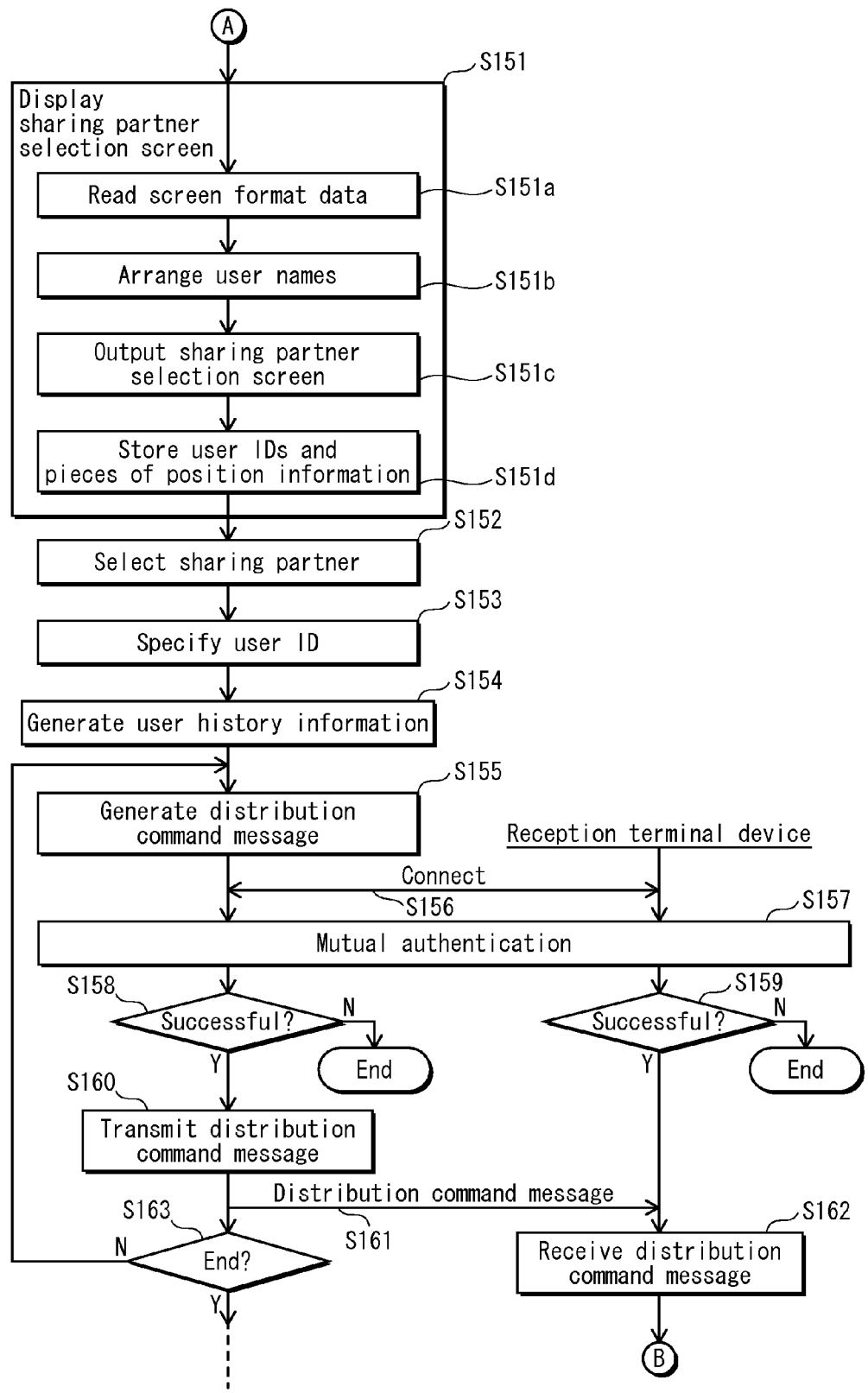
FIG. 25 is a flowchart showing the operations for sharing a content in the data management system 20, and is continued to FIG. 26.
Figure 26:
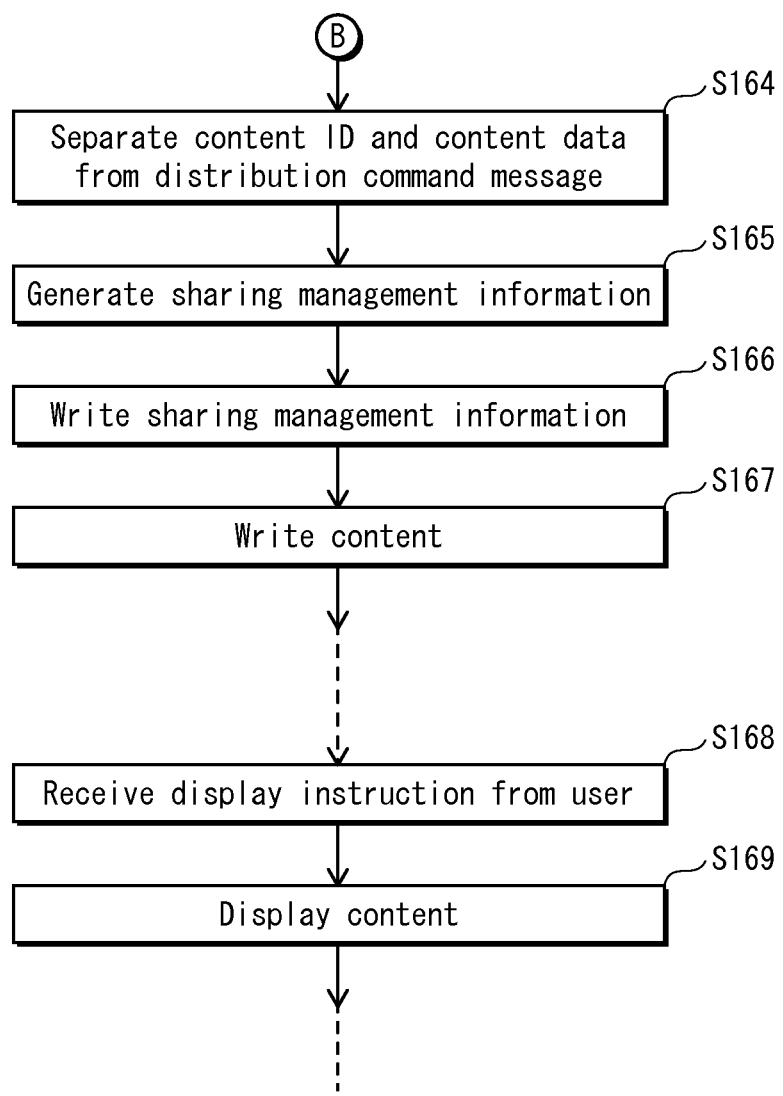
FIG. 26 is a flowchart showing the operations for sharing a content in the data management system 20, and is continued from FIG. 25.

The following describes operations for sharing a content in the data management system 20, with reference to the flowcharts shown in FIGS. 24 to 26.

The transmission terminal device 100 receives a selection of a content to be shared, receives a selection of a sharing partner, generates a distribution command message, and transmits the distribution command message to the reception terminal device of the selected sharing partner (e.g., reception terminal device 300*a*), in the following manner. The reception terminal device 300*a* receives the distribution command message, stores the content, and plays back the content.

The distribution processing unit 102 reads screen format data defining the sharing content selection screen 421 (step S138*a*). Next, the distribution processing unit 102 sequentially reads all pieces of content management information stored in the content management table 120 in the content storage unit 103, extracts thumbnail file paths from the pieces of content management information, and reads the thumbnail images specified by the thumbnail file paths from the content storage unit 103 (step S138*b*). Next, the distribution processing unit 102 arranges the thumbnail images in the respective display frames within the screen format data defining the sharing content selection screen 421, and thereby generates the sharing content selection screen 421 showing an array of the thumbnail images (step S138*c*). At this point, the distribution processing unit 102 associates, for each thumbnail image in the sharing content selection screen 421, a piece of position information indicating the arrangement position of the thumbnail image, with the content ID corresponding to the thumbnail image, and stores the pieces of position information and the content IDs as an arrangement position correspondence table of the content IDs (step S138*d*). Next, the distribution processing unit 102 outputs the sharing content selection screen 421 thus generated to the display unit via the input/output unit 101 (step S138*e*). In this way, the distribution processing unit 102 displays the sharing content selection screen 421 (step S138).

Next, a content to be shared is selected by the user from the list of thumbnail images displayed on the sharing content selection screen 421. The selection of a content by the user is performed with use of the remote control, the mouse, or the keyboard. When a content is selected, the distribution processing unit 102 acquires, via the input/output unit 101, a piece of position information indicating the arrangement position of the thumbnail image of the content selected by the user using the remote control, the mouse, or the keyboard (step S139). Then, the distribution processing unit 102 specifies the content ID corresponding to the piece of position information, with use of the arrangement position correspondence table of the content IDs (step S140).

In the above example, a content to be shared is selected by the user from the list of thumbnail images displayed on the sharing content selection screen. However, it is not limited to such. For example, a list of content names or the like may be displayed instead of the list of thumbnail images, and the user may select a content to be shared from the list.

Next, the distribution processing unit 102 newly generates an element ID in the history table 161, generates a piece of content history information including the element ID and the specified content ID, and writes the piece of content history information into the content history table 162. The new element ID is generated by adding "1" to the element ID having the largest value among the element IDs in the history table 161. If a plurality of content IDs are specified, the distribution processing unit 102 newly generates element IDs for the respective specified content IDs; generates, for each of the specified content IDs, a piece of content history information including the specified content ID and a corresponding element ID; and writes the pieces of content history information thus generated into the content history table 162 (step S141). Note that step S141 may be performed after a distribution command message is successfully transmitted, i.e., after step S163 described below. In this case, the content history information is written after the distribution command message is correctly transmitted to the sharing partner. This eliminates the need for deleting the content history information already written when transmission of the distribution command message fails.

For example, assume that the content IDs of the contents selected by the user are "0012345678" and "0012345679".

In this case, the distribution processing unit 102 generates an element ID "00000003" for the content ID "0012345678", generates a piece of content history information including the element ID "00000003" and the content ID "0012345678", and writes the piece of content history information into the content history table 162 as the content history information 164c. Similarly, the distribution processing unit 102 generates a piece of content history information including the element ID "00000004" and the content ID "0012345679", and writes the piece of content history information into the content history table 162 as the content history information 164d. FIG. 7 shows an example of the content history table 162, in which the pieces of content history information 164c and 164d are written in the aforementioned manner. As described above, the pieces of content history information 164c and 164d are in an incomplete state during their generation process.

Next, the communication unit 104 connects to the server device 200 via the network 10 (step S142), and the authentication unit 111 performs challenge-response mutual authentication with the authentication unit 202 of the server device 200 (step S143).

Figure 27:
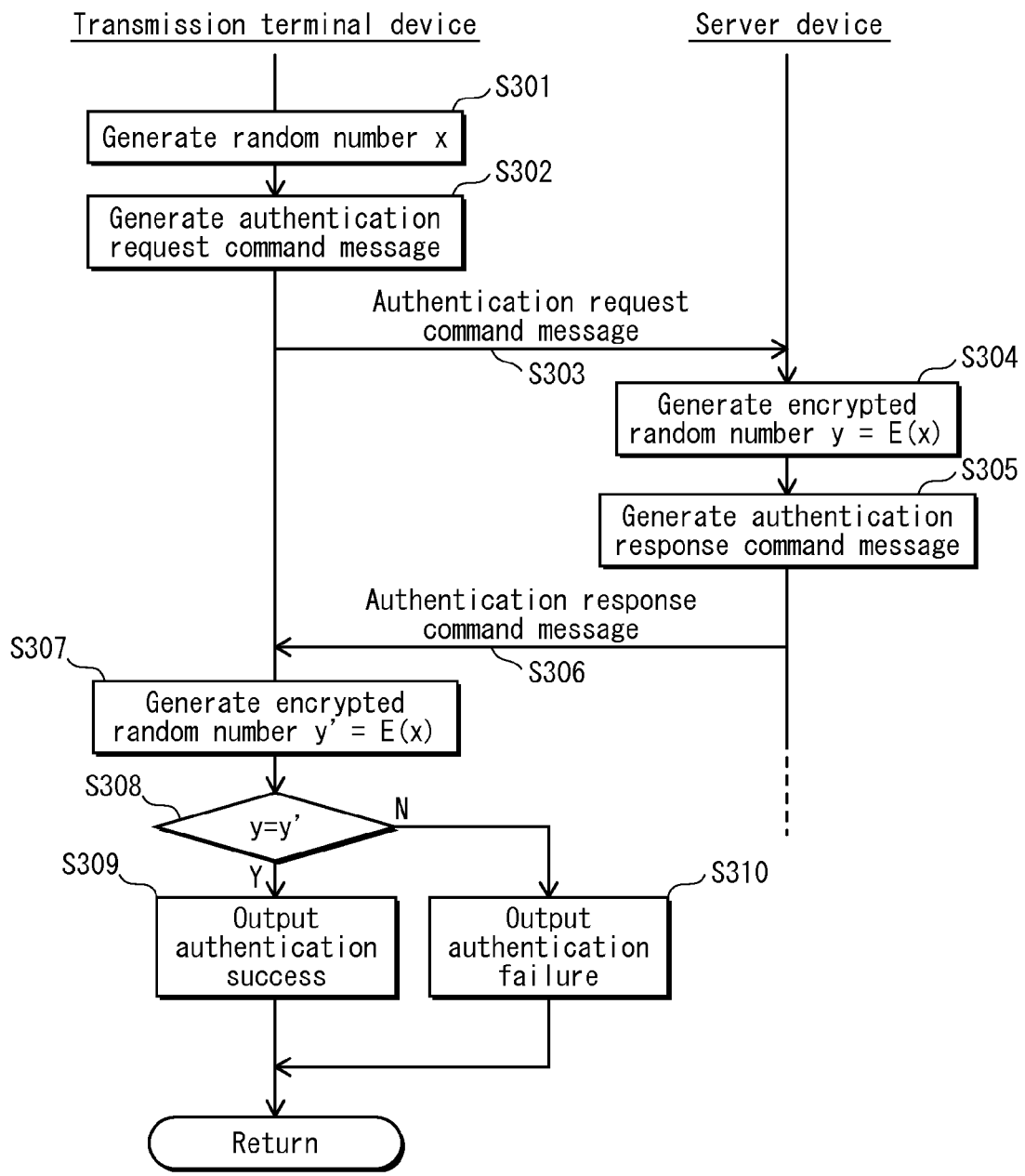
FIG. 27 is a flowchart showing the operations by the transmission terminal device 100 to authenticate the server device 200.

An example of the challenge-response mutual authentication is as follows. Here, a description is provided of operations when the transmission terminal device 100 authenticates the server device 200, with reference to the flowchart of FIG. 27.

Figure 28:
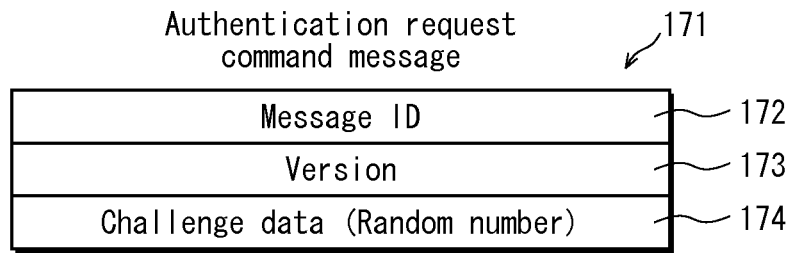
FIG. 28 shows an example of the data structure of an authentication request command message 171.

The authentication unit 111 generates a random number x as challenge data (step S301), and generates, for example, an authentication request command message 171 shown in FIG. 28 (step S302). As shown in FIG. 28, the authentication request command message 171 is composed of a message ID 172, a version 173, and challenge data 174.

The message ID 172 is identification information indicating that the message is an authentication request command message.

The version 173 is identification information identifying the version number of the authentication request command message. In a case where the message data included in the message is modified by addition, deletion, etc. due to system expansion, the version number is increased. Each of the transmission terminal device 100 and the server device 200 compares the value of the version number included in the authentication request command message to the value of the version number supported by the device itself, and judges whether the message is processable or not.

The challenge data 174 is used during the authentication of the server device 200 performed by the transmission terminal device 100, and is the random number x generated in step S301.

Figure 29:
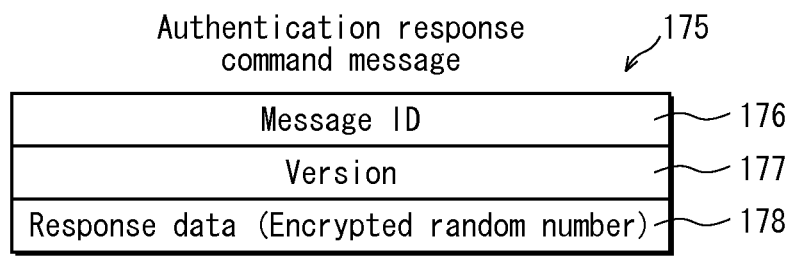
FIG. 29 shows an example of the data structure of an authentication response command message 175.

The authentication unit 111 transmits the authentication request command message 171 to the server device 200, via the communication unit 104 and the network 10 (step S303). The authentication unit 202 of the server device 200 receives the authentication request command message 171 via the network 10 and the communication unit 203 (step S303), extracts the random number x as the challenge data from the authentication request command message 171, and generates an encrypted random number y=E(x) by applying an encryption algorithm to the random number x (step S304). Note that E(x) is ciphertext generated by applying an encryption algorithm to x. For example, the encryption algorithm is the Advanced Encryption Standard (AES). Next, the server device 200 generates an authentication response command message 175 shown in FIG. 29 as an example (step S305). As shown in FIG. 29, the authentication response command message 175 is composed of a message ID 176, a version 177, and response data 178.

The message ID 176 is identification information indicating that the message is an authentication response command message.

The version 177 is identification information identifying the version number of the authentication response command message. In a case where the message data included in the message is modified by addition, deletion, etc. due to system expansion, the version number is increased. Each of the transmission terminal device 100 and the server device 200 compares the value of the version number included in the authentication response command message to the value of the version number supported by the device itself, and judges whether the message is processable or not.

The response data 178 is used during the authentication of the server device 200 performed by the transmission terminal device 100, and is the encrypted random number y generated in step S304.

The authentication unit 202 transmits the authentication response command message 175 to the transmission terminal device 100, via the communication unit 203 and the network 10 (step S306). The authentication unit 111 receives the authentication response command message 175 (step S306), generates an encrypted random number y'=E(x) by applying the same encryption algorithm as mentioned above to the random number x (step S307), extracts the encrypted random number y from the authentication response command message 175, and compares the encrypted random number y to the encrypted random number y' (step S308). If the random numbers y and y' match (Y in step S308), the authentication unit 111 determines that the server device 200 is an authentic device, and outputs a result indicating a success in authentication (step S309). If the random numbers y and y' do not match (N in step S308), the authentication unit 111 determines that the server device 200 is inauthentic, and outputs a result indicating a failure in authentication (step S310).

The authentication unit 202 of the server device 200 determines whether the transmission terminal device 100 is authentic or not through the same procedures performed by the authentication unit 111. When determining each other to be authentic, the transmission terminal device 100 and the server device 200 determine the mutual authentication to be a success, and perform subsequent communications. If at least one of the transmission terminal device 100 and the server device 200 is determined to be inauthentic, the subsequent communications are not performed.

Referring back to the flowchart in FIG. 24, a description of the operations for sharing a content continues.

When the authentication fails (N in step S144 or N in step S145), the transmission terminal device 100 or the server device 200 does not perform subsequent processing.

Figure 30:
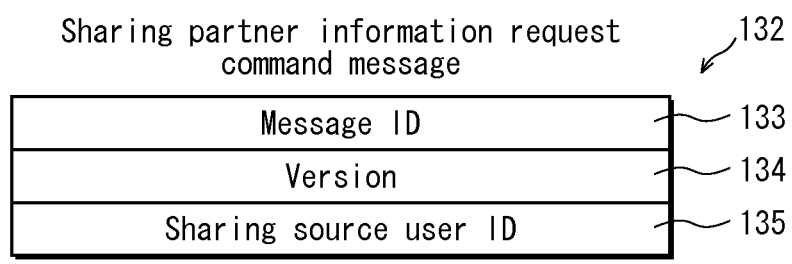
FIG. 30 shows an example of the data structure of a sharing partner information request command message 132.

When the authentication is successful (Y in step S144), the distribution processing unit 102 of the transmission terminal device 100 generates a sharing partner information request command message 132 shown in FIG. 30 as an example (step S146). The communication unit 104 transmits the sharing partner information request command message 132 thus generated to the server device 200 (step S147). As shown in FIG. 30, the sharing partner information request command message 132 is composed of a message ID 133, a version 134, and a sharing source user ID 135.

The message ID 133 is identification information indicating that the message is a sharing partner information request command message.

The version 134 is identification information identifying the version number of the sharing partner information request command message. In a case where the message data included in the message is modified by addition, deletion, etc. due to system expansion, the version number is increased. Each of the transmission terminal device 100 and the server device 200 compares the value of the version number included in the sharing partner information request command message to the value of the version number supported by the device itself, and judges whether the message is processable or not.

The sharing source user ID 135 is identification information for identifying the user of the transmission terminal device 100.

Figure 31:
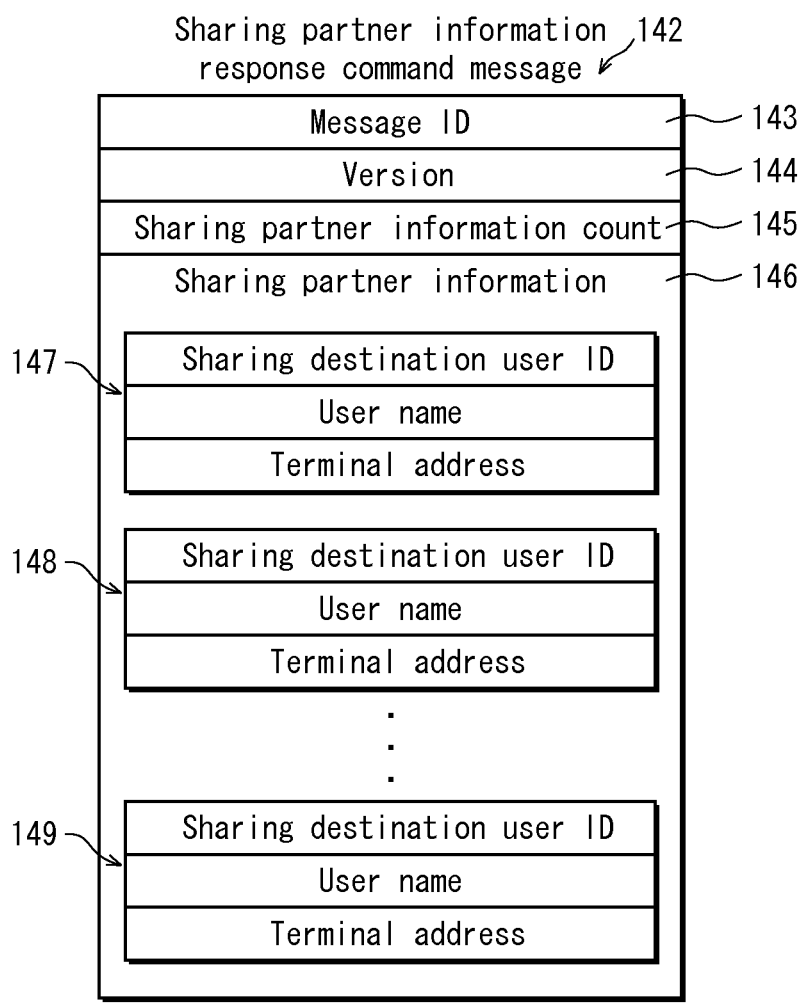
FIG. 31 shows an example of the data structure of a sharing partner information response command message 142.

When the authentication is successful (Y in step S145), the communication unit 203 of the server device 200 receives the sharing partner information request command message 132 (step S147), extracts a sharing source user ID from the sharing partner information request command message 132, reads the sharing partner list 231*a* corresponding to the sharing source user ID, and reads sharing destination user IDs within the sharing partner list 231*a*. Furthermore, the communication unit 203 reads, from the user ID table 221, a user name and a terminal address corresponding to each of the sharing destination user IDs. Finally, the communication unit 203 generates sharing partner information including all sets of a sharing destination user ID, a user name, and a terminal address thus read, generates a sharing partner information response command message 142 as shown by an example of FIG. 31 (step S148), and transmits the sharing partner information response command message 142 to the transmission terminal device 100 via the network 10 (step S149). The sharing partner information response command message 142 is composed of a message ID 143, a version 144, a sharing partner information count 145, and sharing partner information 146, as shown in FIG. 31.

The message ID 143 is identification information indicating that the message is a sharing partner information response command message.

The version 144 is identification information identifying the version number of the sharing partner information response command message. In a case where the message data included in the message is modified by addition, deletion, etc. due to system expansion, the version number is increased. Each of the transmission terminal device 100 and the server device 200 compares the value of the version number included in the sharing partner information response command message to the value of the version number supported by the device itself, and judges whether the message is processable or not.

The sharing partner information count 145 is the number of sets included in the sharing partner information 146.

The sharing partner information 146 is composed of at least one set. In the present example, the sharing partner information 146 is composed of sets 147, 148, ..., 149. Each set includes a sharing destination user ID, a user name, and a terminal address.

Next, the distribution processing unit 102 receives the sharing partner information response command message 142 from the server device 200, via the network 10 and the communication unit 104 (step S149), and extracts, from the sharing partner information response command message 142, sharing partner information generated for the user of the transmission terminal device 100 (step S150). As described above, the sharing partner information as extracted above is composed of at least one set of a sharing destination user ID, a user name, and a terminal address.

Although the sharing partner information is acquired from the server device 200 in the present example, it is not limited to such. For example, the transmission terminal device 100 may store the sharing partner information in advance.

Next, the distribution processing unit 102 reads screen format data defining the sharing partner selection screen 431 (step S151*a*), acquires user names included in the sharing partner information, arranges the user names in the display frames 432, 433, 434, ... of the screen format data defining the sharing partner selection screen 431, and thereby generates the sharing partner selection screen 431 in which the user names are arranged (step S151*b*), and outputs the sharing partner selection screen 431 to the display unit via the input/output unit 101 (step S151*c*). At this point, the distribution processing unit 102 associates, for each user name in the sharing partner selection screen 431, a piece of position information indicating the arrangement position of the user name with the user ID corresponding to the user name, and stores the pieces of position information and the user IDs as an arrangement position correspondence table of the user names (step S151*d*). In this way, the sharing partner selection screen 431 is displayed (step S151).

Next, the user name of a sharing partner with whom a content is to be shared is selected by the user of the transmission terminal device 100 from the list of user names displayed on the sharing partner selection screen 431. The selection of a user name by the user is performed with use of the remote control, the mouse, or the keyboard. When a user name is selected, the distribution processing unit 102 acquires, via the input/output unit 101, a piece of position information indicating the arrangement position of the user name selected by the user using the remote control, the mouse, or the keyboard (step S152). Then, the distribution processing unit 102 specifies the user ID corresponding to the piece of position information, with use of the arrangement position correspondence table of the user IDs (step S153). Next, the distribution processing unit 102 generates user history information including the generated element ID and the specified user ID, and writes the user history information into the user history table 163. If a plurality of content IDs are specified, the distribution processing unit 102 generates, for each of the specified content IDs, a piece of user history information including an element ID generated for the content ID and a user ID specified for the content ID, and writes the pieces of user history information thus generated into the user history table 163. Also, the distribution processing unit 102 additionally writes the current date as a sharing date into the content history information in the content history table 162 (step S154). Note that step S154 may be performed after the distribution command message is successfully transmitted, i.e., after step S163 described below. In this case, the user history information and the content history information are written after the distribution command message is correctly transmitted to the sharing partner. This eliminates the need for deleting the user history information and the content history information already written when transmission of the distribution command message fails.

Here, the user ID of the sharing partner selected by the user is assumed to be "2002AACC", for example.

Figure 11:
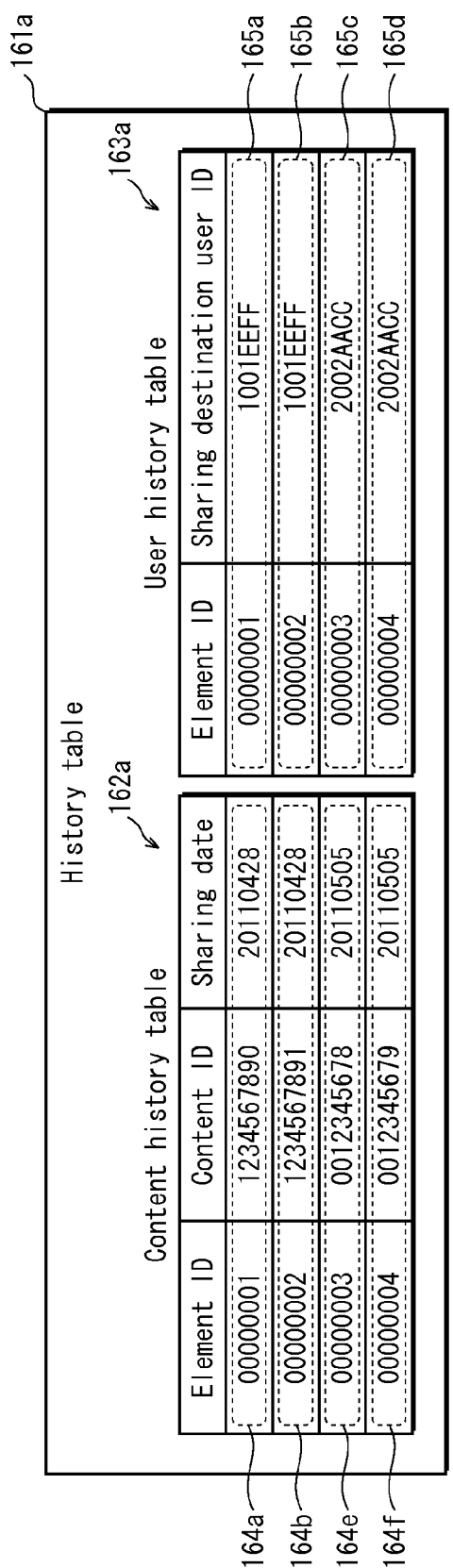

In a user history table 163a shown in FIG. 11, user history information 165c and user history information 165d are additionally written. The user history information 165c includes an element ID "00000003" and a sharing destination user ID "2002AACC", and the user history information 165d includes an element ID "00000004" and a sharing destination user ID "2002AACC".

Also, a content history table 162a shown in FIG. 11 includes content history information 164e and content history information 164f, instead of the pieces of content history information 164c and 164d shown in FIG. 7. Each of the pieces of content history information 164e and 164f further includes a sharing date "20110505".

In FIG. 11, the content history information 164e and the user history information 165c constitute data in the short-term format. Similarly, the content history information 164f and the user history information 165d constitute data in the short-term format.

Next, the distribution processing unit 102 generates one distribution command message for a pair of the content ID of the content selected in the above step and the sharing destination user ID of the sharing partner (step S155).

For example, the distribution command message 181 shown in FIG. 12 is composed of a message ID 182, a version 183, a sharing destination user ID 184, a content ID 185, a content size 186, a content type 187, and content data 188.

The message ID 182 is identification information indicating that the message is a distribution command message.

The version 183 is identification information identifying the version number of the distribution command message. In a case where the message data included in the message is modified by addition, deletion, etc. due to system expansion, the version number is increased. Each of the transmission terminal device 100 and the reception terminal device 300a compares the value of the version number included in the distribution command message to the value of the version number supported by the device itself, and judges whether the message is processable or not.

The sharing destination user ID 184 is identification information identifying the user with whom a content is to be shared, and is specified in step S153.

The content ID 185 is identification information identifying the content to be shared, and is specified in step S140.

The content size 186 is the data size of the content to be shared.

The content type 187 is information indicating the type and format of the content to be shared.

The content data 188 is the data of the content to be shared.

For example, the distribution processing unit 102 sets: the message ID 182 to "0001" indicating a distribution command message; the version 183 to "0100" indicating the initial version; the sharing destination user ID 184 to the sharing destination user ID specified in step S153; the content ID 185 to the content ID of the content specified in step S140; the content size 186 to the data size of the content selected by the user; the content type 187 to "image/jpeg"; and the content data 188 to the data of the content selected by the user.

The communication unit 104 of the transmission terminal device 100 connects to the device indicated by the terminal address in the sharing partner information extracted in step S150, i.e., the reception terminal device 300a (step S156), and the authentication unit 111 of the transmission terminal device 100 and the authentication unit 307 of the reception terminal device 300a perform mutual authentication (step S157). The mutual authentication is described above, and details thereof are thus omitted.

When the authentication fails (N in step S158 or N in step S159), the transmission terminal device 100 or the reception terminal device 300a does not perform subsequent processing.

When the authentication is successful (Y in step S158), the distribution processing unit 102 of the transmission terminal device 100 transmits the distribution command message to the reception terminal device 300a via the network 10 (steps S160 to S161).

When the authentication is successful (Y in step S159), the distribution processing unit 304 of the reception terminal device 300a receives the distribution command message from the transmission terminal device 100, via the network 10 and the communication unit 303 (steps S161 to S162).

The distribution processing unit 304 of the reception terminal device 300a separates the content ID and the content data from the distribution command message 181 (step S164), generates sharing management information including the separated content ID (step S165), and writes the generated sharing management information into the sharing management table 391 (step S166). At this point, the distribution processing unit 304 includes the current date in the sharing management information as a sharing date. Also, the distribution processing unit 304 writes the separated content data into the storage unit 306 as a content (step S167).

The distribution processing unit 102 of the transmission terminal device 100 repeats generation of a distribution command message, mutual authentication, and transmission of the distribution command message, until transmission of all distribution command messages is completed (N in step S163). When transmission of all distribution command messages is completed (Y in step S163), the transmission terminal device 100 ends the processing for sharing a content.

The display processing unit 302 of the reception terminal device 300a receives, via the input/output unit 301, a user instruction to display the content (step S168), reads the content stored in the storage unit 306, and outputs the content to the display unit via the input/output unit 301. The display unit displays the content (step S169).

(4) Operations of History Format Conversion Unit 108 of Transmission Terminal Device 100

Figure 32:
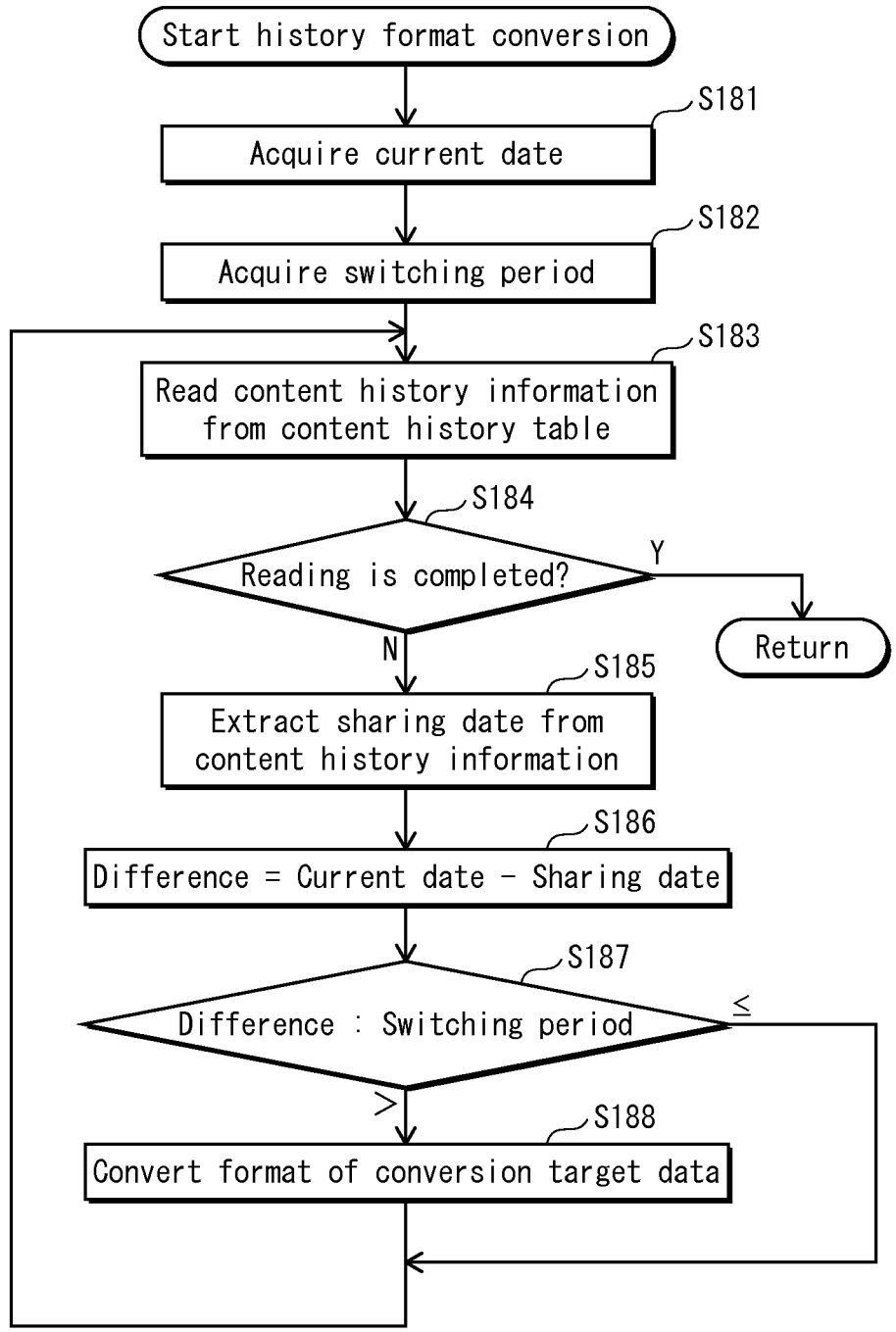
FIG. 32 is a flowchart showing the operations of a history format conversion unit 108 of the transmission terminal device 100.

The following describes operations of the history format conversion unit 108 in the transmission terminal device 100, with reference to the flowchart shown in FIG. 32.

The history format conversion unit 108 acquires the current date from the clock 109 (step S181). Note that the history format conversion unit 108 can acquire the current date from the clock 109 at any timing. For example, the acquisition may be performed at predetermined intervals. Alternatively, the acquisition may be performed in synchronization with a user operation for giving instruction to convert the history format.

Next, the history format conversion unit 108 reads the switching period from the switching period storage unit 107 (step S182).

Then, the history format conversion unit 108 sequentially reads all pieces of content history information from the content history table 162 in the history table 161 stored in the history storage unit 105 (step S183). When reading of all pieces of content history information is completed (Y in step S184), the processing of converting the history format is ended.

When reading of all pieces of content history information is not completed (N in step S184), the history format conversion unit 108 extracts a sharing date from the read piece of content history information (step S185), and calculates a difference with use of the following formula.

Difference=Current date−Sharing date (step S186)

Next, the history format conversion unit 108 compares the calculated difference to the switching period (step S187). When the difference is smaller than or equal to the switching period (step S187), the history format conversion unit 108 does not perform any further processing. When the difference is larger than the switching period (step S187), the history format conversion unit 108 performs format conversion by deleting the read piece of content history information from the content history table 162 (step S188).

Next, the history format conversion unit 108 returns to step S183, and repeats the processing until reading of all pieces of content history information is completed (Y in step S184).

The above processing enables the format conversion of history information.

Here, assume that the current date is "May 13, 2011", the switching period is "14 days", and format conversion is performed on a history table 161a shown in FIG. 11, for example.

Regarding the content history information 164a in the content history table 162a, the sharing date in the content history information 164a is "20110428", which means "Apr. 28, 2011"; therefore, the difference between the sharing date "Apr. 28, 2011" and the current date "May 13, 2011" is larger than 14 days. Accordingly, the history format conversion unit 108 deletes the content history information 164a from the content history table 162a.

Also, regarding the content history information 164b in the content history table 162a, the difference between the sharing date "Apr. 28, 2011" in the content history information 164b and the current date "May 13, 2011" is larger than 14 days. Accordingly, the history format conversion unit 108 deletes the content history information 164b from the content history table 162a.

On the other hand, regarding the content history information 164e in the content history table 162a, the difference between the sharing date "May 5, 2011" in the content history information 164e and the current date "May 13, 2011" is smaller than 14 days. Accordingly, the history format conversion unit 108 does not perform any further processing on the content history information 164e. Also, regarding the content history information 164f in the content history table 162a, the difference between the sharing date "May 5, 2011" in the content history information 164f and the current date "May 13, 2011" is smaller than 14 days. Accordingly, the history format conversion unit 108 does not perform any further processing on the content history information 164f.

In this way, only the user history information 165a remains out of the pair of the content history information 164a and the user history information 165a shown in FIG. 11, and only the user history information 165b remains out of the pair of the content history information 164b and the user history information 165b.

Figure 13:
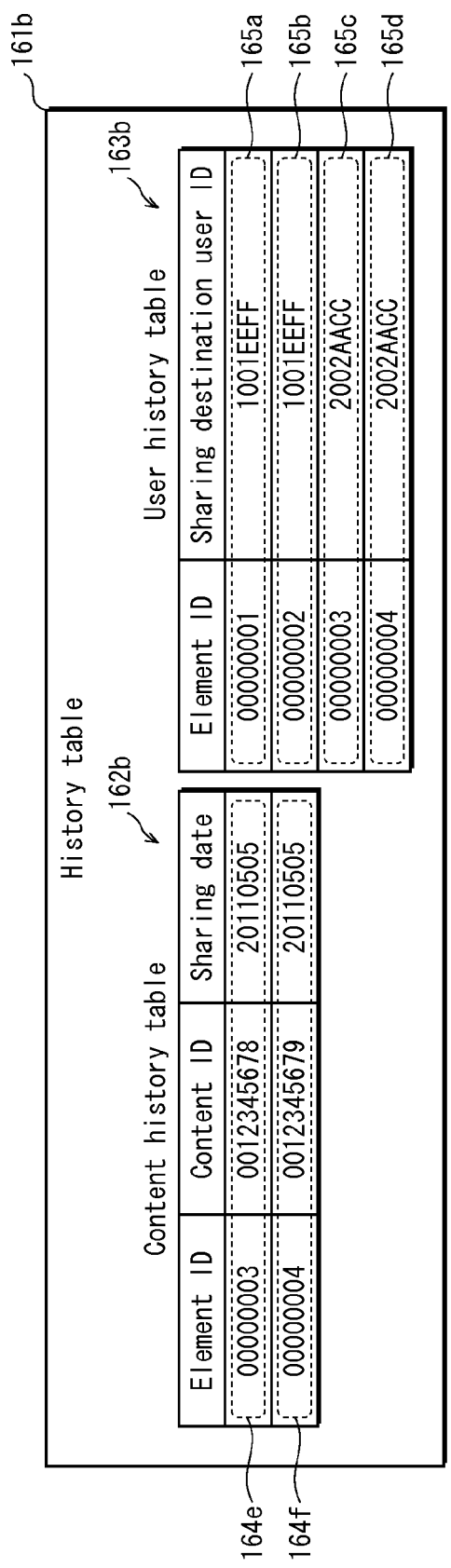
FIG. 13 shows an example of the data structure of a history table 161b.

As a result, the history table 161a shown in FIG. 11 is converted to a history table 161b shown in FIG. 13. As shown in FIG. 13, the history table 161b is composed of a content history table 162b and a user history table 163b. The content history table 162b includes the pieces of content history information 164e and 164f, and the user history table 163b includes the pieces of user history information 165a, 165b, 165c, and 165d.

In the history table 161a shown in FIG. 11, the following pairs constitute data in the short-term format: the content history information 164a and the user history information 165a, the content history information 164b and the user history information 165b; the content history information 164e and the user history information 165c; and the content history information 164f and the user history information 165d.

As can be seen, the history table 161a in the FIG. 11 only includes data in the short-term format.

On the other hand, the history table 161b in FIG. 13 includes pieces of data in the long-term format, i.e., the user history information 165a and the user history information 165b. Also, the content history information 164e and the user history information 165c constitute data in the short-term format, and the content history information 164f and the user history information 165d constitute data in the short-term format.

In this way, the history table 161b shown in FIG. 13 includes both data in the long-term format and data in the short-term format.

As described above, the content IDs and the sharing dates are deleted from the history table 161 by the format conversion. This reduces the size of data in the history table 161, thus realizing effective use of a recording medium and cost reduction.

(5) Operations for Deleting Content in Data Management System 20

Figure 33:
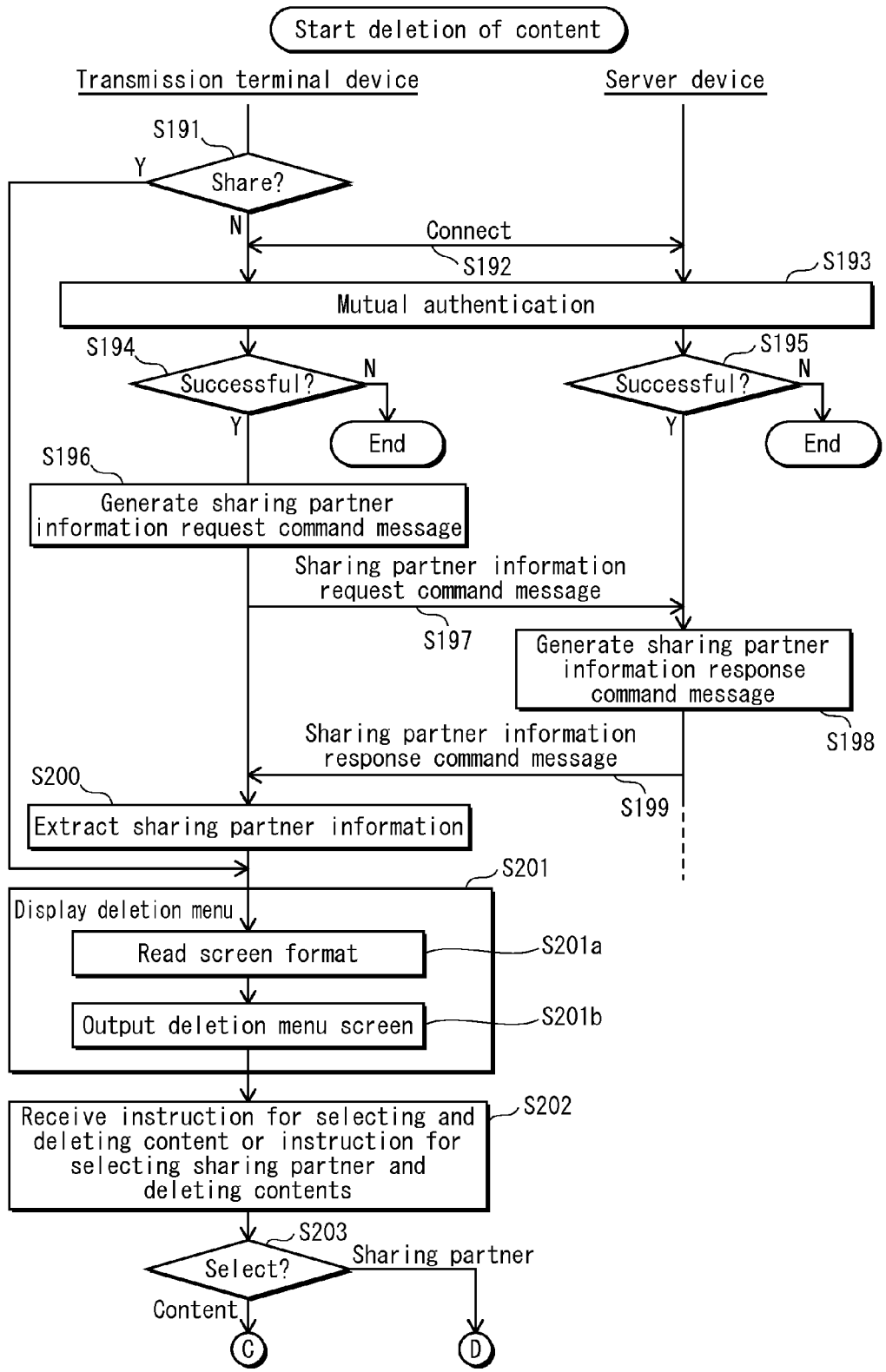
FIG. 33 is a flowchart showing the operations for deleting a content in the data management system 20, and is continued to FIGS. 34 and 35.
Figure 34:
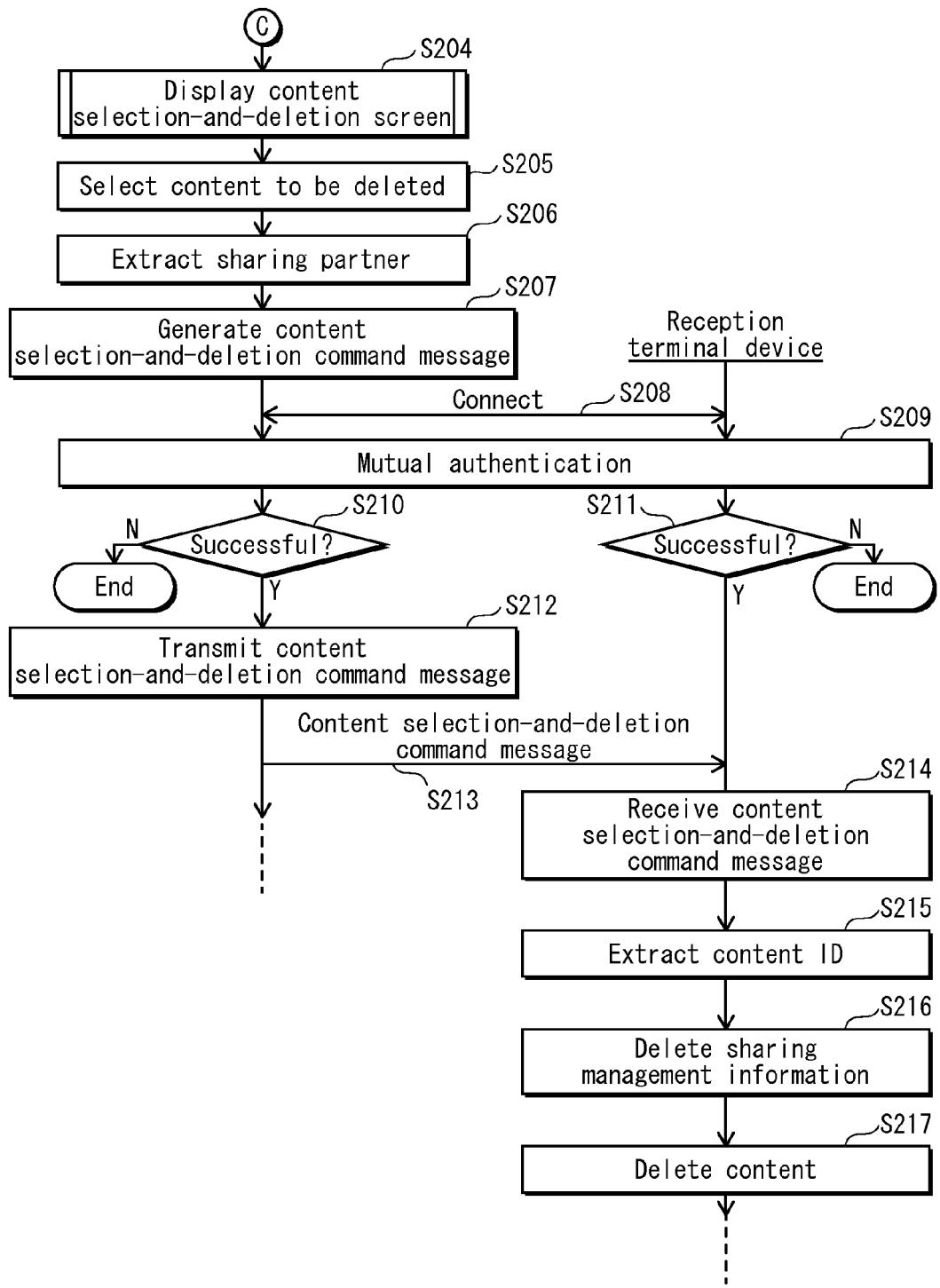
FIG. 34 is a flowchart showing the operations for deleting a content in the data management system 20, and is continued from FIG. 33.
Figure 35:
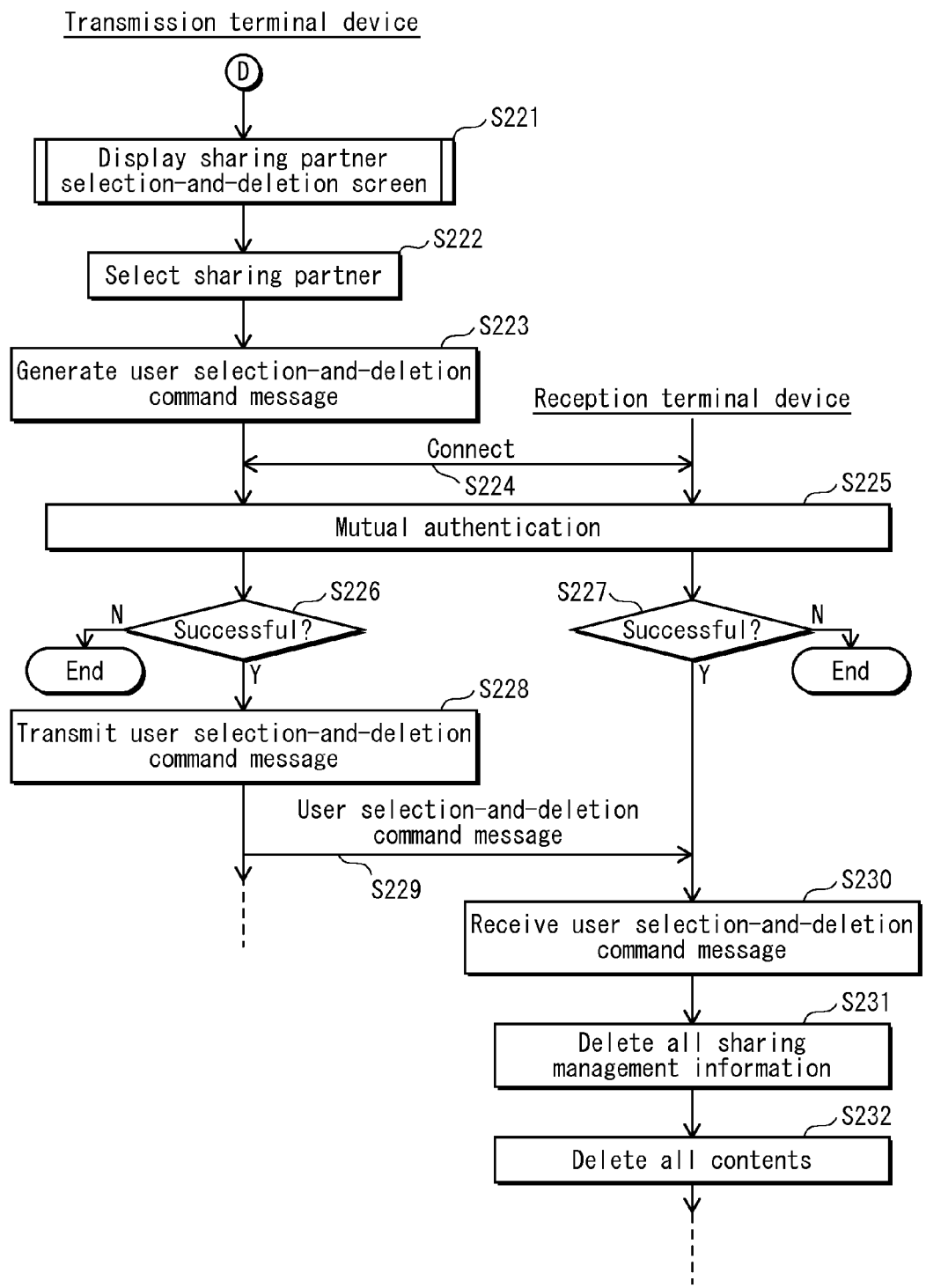
FIG. 35 is a flowchart showing the operations for deleting a content in the data management system 20, and is continued from FIG. 33.

The following describes operations for deleting a content in the data management system 20, with reference to the flowcharts shown in FIGS. 33 to 35.

As shown in step S103 of FIG. 22, when the distribution processing unit 102 does not receive an instruction for sharing a content from the user (N in step S191), the communication unit 104 connects to the server device 200 via the network 10 (step S192), and the authentication unit 111 performs challenge-response mutual authentication with the authentication unit 202 of the server device 200 (step S193). The mutual authentication is described above, and details thereof are thus omitted. When the authentication fails (N in step S194 or N in step S195), the transmission terminal device 100 or the server device 200 does not perform subsequent processing. When the authentication is successful (Y in step S194), the communication unit 104 of the transmission terminal device 100 generates the sharing partner information request command message 132 (step S196), and transmits the sharing partner information request command message 132 to the server device 200 (step S197). When the authentication is successful (Y in step S195), the communication unit 203 of the server device 200 receives the sharing partner information request command message 132 (step S197), extracts a sharing source user ID from the sharing partner information request command message 132, reads the sharing partner list 231a corresponding to the sharing source user ID, and reads sharing destination user IDs within the sharing partner list 231a. Furthermore, the communication unit 203 reads, from the user ID table 221, the user name and the terminal address corresponding to each of the sharing destination user IDs. Finally, the communication unit 203 generates sharing partner information including all sets of a sharing destination user ID, a user name, and a terminal address thus read, generates the sharing partner information response command message 142 including the sharing partner information (step S198), and transmits the sharing partner information response command message 142 to the transmission terminal device 100 via the network 10 (step S199). The distribution processing unit 102 extracts the sharing partner information generated for the user of the transmission terminal device 100, from the sharing partner information response command message 142 received from the server device 200 via the network 10 and the communication unit 104 (step S200). Note that the sharing partner information as extracted above is composed of at least one set of a sharing destination user ID, a user name, and a terminal address.

When the distribution processing unit 102 receives an instruction for sharing a content from the user (Y in step S191), control proceeds to step S201.

Next, the deletion processing unit 106 of the transmission terminal device 100 reads screen format data defining the deletion menu screen 451 (step S201a), generates the deletion menu screen 451 with use of the screen format data, and outputs the deletion menu screen 451 to the display unit via the input/output unit 101 (step S201b). In this way, the deletion processing unit 106 displays the deletion menu screen 451 (step S201).

Next, the deletion processing unit 106 receives, from the user, either an instruction for selecting and deleting a content or an instruction for selecting a sharing partner and deleting corresponding contents (step S202). Using the deletion menu screen 451, the user can select a deletion method. The button 452 of "Select and delete content" is selected in cases such as when the user wishes to delete a shared content including shooting location information of a GPS or to replace a shared content. The button 453 of "Select sharing partner and delete contents" is selected in cases such as when the user wishes to delete all contents shared with a friend because of a rift in a friendship with the friend.

Upon receiving an instruction for selecting and deleting a content ("Content" in step S203), the deletion processing unit 106 displays the content selection-and-deletion screen 461 (step S204). Details of the operations for displaying the content selection-and-deletion screen 461 are described later.

Next, a content to be deleted is selected by the user from the list of thumbnail images displayed on the content selection-and-deletion screen 461. The selection of a content by the user is performed with use of the remote control, the mouse, or the keyboard. When a content is selected, the deletion processing unit 106 acquires, via the input/output unit 101, a piece of position information indicating the arrangement position of the thumbnail image of the content selected by the user using the remote control, the mouse, or the keyboard, and specifies the content ID corresponding to the piece of position information, with use of an arrangement position correspondence table of deletion target content IDs. In this way, the deletion processing unit 106 receives the selection of the content to be deleted (step S205).

In the present example, a content to be deleted is selected by the user from the list of thumbnail images. However, it is not limited to such. For example, a list of content names or the like may be displayed instead of the list of thumbnail images, and the user may select a content to be deleted from the list.

Next, the deletion processing unit 106 reads the content history information including the specified content ID from the content history table 162, and extracts an element ID from the content history information. Next, the deletion processing unit 106 reads the user history information including the element ID from the user history table 163, and extracts a sharing destination user ID from the user history information (step S206).

Next, the deletion processing unit 106 generates the content selection-and-deletion command message 191, which includes a message ID 192, a version 193, a content ID 194, and a user ID 195, as shown in FIG. 17 (step S207).

The message ID 192 is identification information indicating that the message is a content selection-and-deletion command message. The version 193 is identification information identifying the version number of the content selection-and-deletion command message. In a case where the message data included in the message is modified by addition, deletion, etc. due to system expansion, the version number is increased. Each of the transmission terminal device 100 and the reception terminal device 300a compares the value of the version number included in the message to the value of the version number supported by the device itself, and judges whether the message is processable or not. The content ID 194 is a content ID that has been specified. The user ID 195 is a sharing destination user ID extracted from the user history table 163.

For example, the deletion processing unit 106 sets: the message ID 192 to "0002" indicating a content selection-and-deletion command message; the version 193 to "0100" indicating the initial version; the content ID 194 to the content ID "0012345679" selected by the user; and the user ID 195 to the sharing destination user ID "2002AACC".

Next, the communication unit 104 of the transmission terminal device 100 connects to the device indicated by the terminal address in the sharing partner information that has been extracted, i.e., the reception terminal device 300a (step S208), and the authentication unit 111 of the transmission terminal device 100 and the authentication unit 307 of the reception terminal device 300a perform mutual authentication (step S209). The mutual authentication is described above, and details thereof are thus omitted.

When the authentication fails (N in step S210 or N in step S211), the transmission terminal device 100 or the reception terminal device 300a does not perform subsequent processing.

When the authentication is successful (Y in step S210), the deletion processing unit 106 of the transmission terminal device 100 transmits the content selection-and-deletion command message to the reception terminal device 300a via the network 10 (steps S212 to S213).

When the authentication is successful (Y in step S211), the deletion processing unit 305 of the reception terminal device 300a receives the content selection-and-deletion command message from the transmission terminal device 100, via the network 10 and the communication unit 303 (steps S213 to S214). Next, the deletion processing unit 305 extracts a content ID from the content selection-and-deletion command message 191 (step S215), and deletes the sharing management information including the extracted content ID from the sharing management table 391 (step S216). Also, the deletion processing unit 305 deletes the content identified by the extracted content ID from the storage unit 306 (step S217). This completes the operations by the data management system 20 performed when a content is selected and deleted.

On the other hand, upon receiving an instruction for selecting a sharing partner and deleting corresponding contents ("Sharing partner" in step S203), the deletion processing unit 106 displays the sharing partner selection-and-deletion screen 441 (step S221). Details of the operations for displaying the sharing partner selection-and-deletion screen 441 are described later.

Next, a sharing partner whose contents are to be deleted is selected by the user of the transmission terminal device 100 from the list of user names displayed on the sharing partner selection-and-deletion screen 441. The selection of a sharing partner whose contents are to be deleted is performed with use of the remote control, the mouse, or the keyboard. The deletion processing unit 106 acquires, via the input/output unit 101, a piece of position information indicating the arrangement position of a user name selected by the user using the remote control, the mouse, or the keyboard, and specifies the sharing destination user ID corresponding to the piece of position information, with use of an arrangement position correspondence table of deletion target user IDs. In this way, the deletion processing unit 106 receives the selection of the sharing partner whose contents are to be deleted (step S222).

Next, the deletion processing unit 106 generates the user selection-and-deletion command message 196, which includes a message ID 197, a version 198, and a user ID 199, as shown by an example of FIG. 18 (step S223).

The message ID 197 is identification information indicating that the message is a user selection-and-deletion command message. The version 198 is identification information identifying the version number of the user selection-and-deletion command message. In a case where the message data included in the message is modified by addition, deletion, etc. due to system expansion, the version number is increased. Each of the transmission terminal device 100 and the reception terminal device 300a compares the value of the version number included in the message to the value of the version number supported by the device itself, and judges whether the message is processable or not. The user ID 199 is a sharing destination user ID that has been specified.

For example, the deletion processing unit 106 sets: the message ID 197 to "0003" indicating a user selection-and-deletion command message; the version 198 to "0100" indicating the initial version; and the user ID 199 to the sharing destination user ID "2002AACC" that has been extracted.

Next, the communication unit 104 of the transmission terminal device 100 connects to the device indicated by the terminal address in the sharing partner information that has been extracted, i.e., the reception terminal device 300a (step S224), and the authentication unit 111 of the transmission terminal device 100 and the authentication unit 307 of the reception terminal device 300a perform mutual authentication (step S225). The mutual authentication is described above, and details thereof are thus omitted.

When the authentication fails (N in step S226 or N in step S227), the transmission terminal device 100 or the reception terminal device 300a does not perform subsequent processing.

When the authentication is successful (Y in step S226), the deletion processing unit 106 of the transmission terminal device 100 transmits the user selection-and-deletion command message to the reception terminal device 300a via the network 10 (steps S228 to S229).

When the authentication is successful (Y in step S227), the deletion processing unit 305 of the reception terminal device 300a receives the user selection-and-deletion command message from the transmission terminal device 100, via the network 10 and the communication unit 303 (steps S229 to S230). Next, the deletion processing unit 305 deletes all pieces of sharing management information stored in the sharing management table 391 (step S231), and deletes all contents stored in the storage unit 306 (step S232). This completes the operations by the data management system 20 performed when a sharing partner is selected for deletion of corresponding contents.

(6) Details of Operations for Displaying Content Selection-and-Deletion Screen 461

Figure 36:
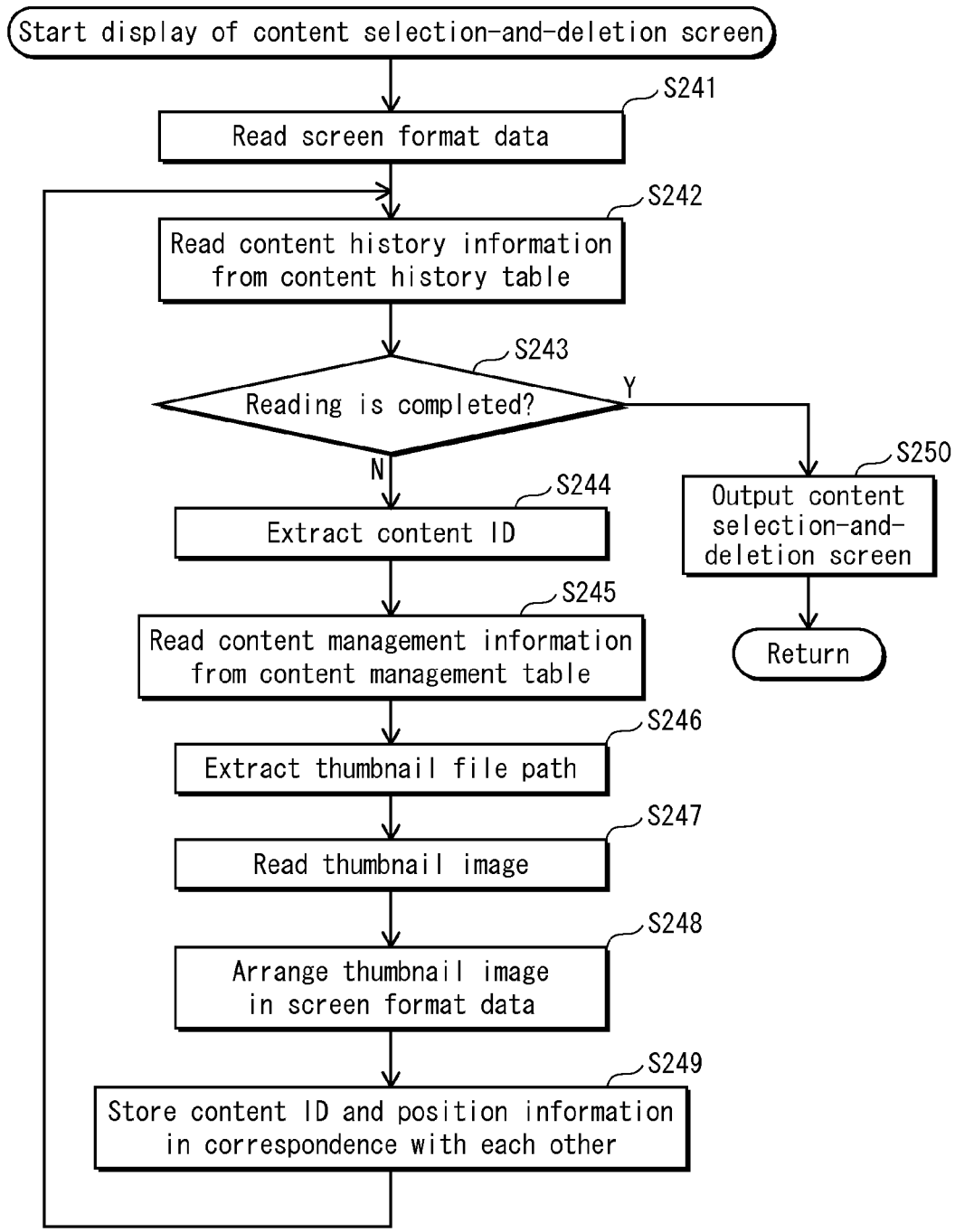
FIG. 36 is a flowchart showing the details of the operations by a deletion processing unit 106 to display the content selection-and-deletion screen 461.

The following describes operations for displaying the content selection-and-deletion screen 461, with reference to the flowchart shown in FIG. 36. The operations described here are the details of step S204 of the flowchart in FIG. 34.

The deletion processing unit 106 reads screen format data defining the content selection-and-deletion screen 461 (step S241).

Next, the deletion processing unit 106 sequentially reads pieces of content history information from the content history table 162 in the history table 161 (step S242). Upon completing reading of all pieces of content history information from the content history table 162 (Y in step S243), the deletion processing unit 106 outputs the content selection-and-deletion screen 461 in which thumbnail images are arranged, to the display unit via the input/output unit 101 (step S250). This completes the operations for displaying the content selection-and-deletion screen 461.

When reading of all pieces of content history information from the content history table 162 is not completed (N in step S243), the deletion processing unit 106 extracts a content ID from the read piece of content history information (step S244). Next, the deletion processing unit 106 reads, from the content management table 120, the content management information including the extracted content ID (step S245). Next, the deletion processing unit 106 extracts a thumbnail file path from the content management information thus read (step S246), and reads a thumbnail image from the content storage unit 103 with use of the thumbnail file path (step S247). Next, the deletion processing unit 106 arranges the thumbnail image in a display frame in the screen format data defining the content selection-and-deletion screen 461 (step S248). Also, the deletion processing unit 106 associates the content ID corresponding to the thumbnail image with a piece of position information indicating the display frame on the content selection-and-deletion screen 461 in which the thumbnail image is arranged, and stores the content ID and the piece of position information as data in an arrangement position correspondence table of deletion target content IDs (step S249). Subsequently, the deletion processing unit 106 returns to step S242 to repeat the processing.

(7) Details of Operations for Displaying Sharing Partner Selection-and-Deletion Screen 441

Figure 37:
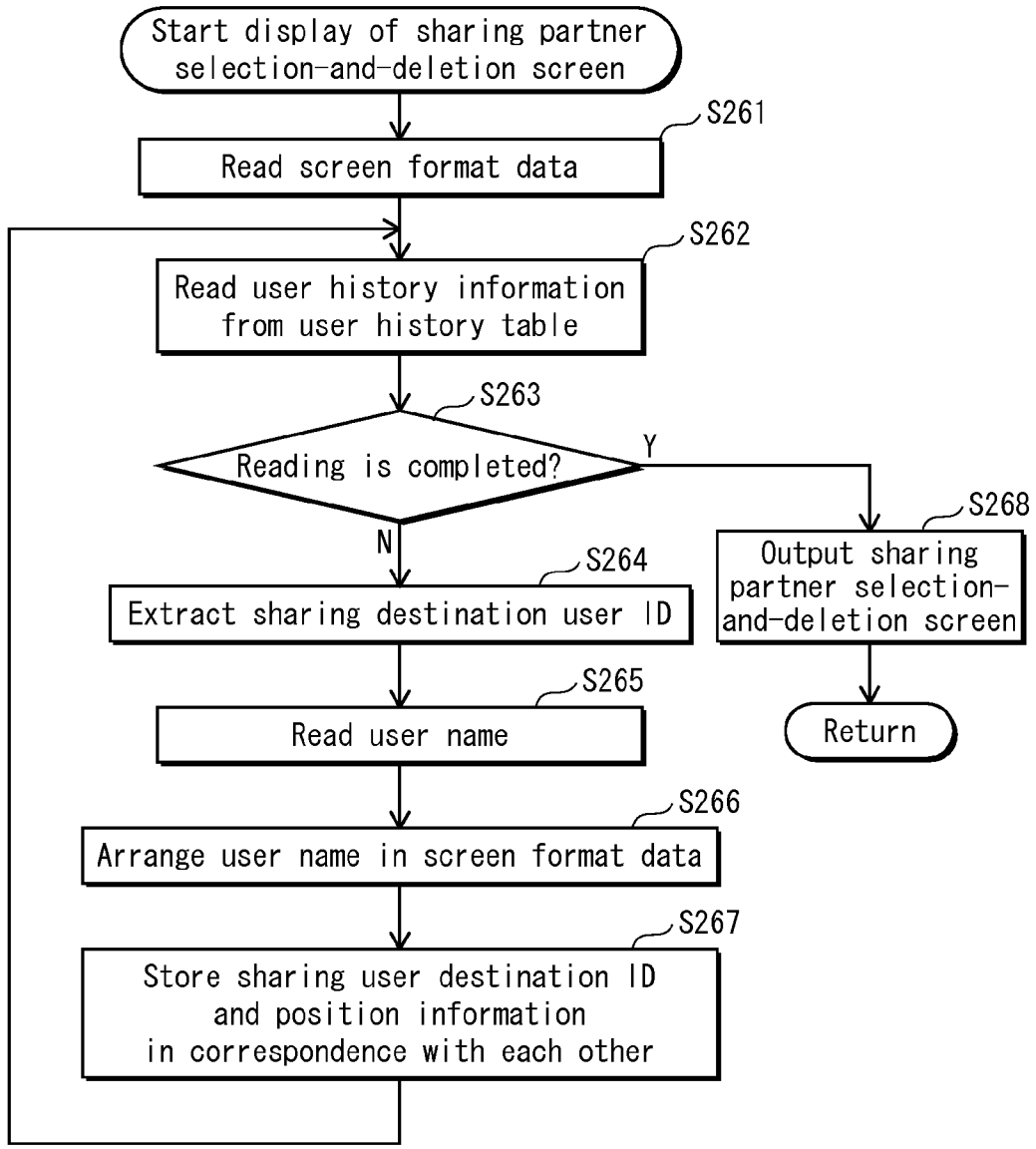
FIG. 37 is a flowchart showing the details of the operations by the deletion processing unit 106 to display the sharing partner selection-and-deletion screen 441.

The following describes operations for displaying the sharing partner selection-and-deletion screen 441, with reference to the flowchart shown in FIG. 37. The operations described here are the details of step S221 of the flowchart in FIG. 35.

The deletion processing unit 106 reads screen format data defining the sharing partner selection-and-deletion screen 441 (step S261).

Next, the deletion processing unit 106 sequentially reads pieces of user history information from the user history table 163 in the history table 161 (step S262). Upon completing reading of all pieces of user history information from the user history table 163 (Y in step S263), the deletion processing unit 106 outputs the sharing partner selection-and-deletion screen 441 in which user names are arranged, to the display unit via the input/output unit 101 (step S268). This completes the operations for displaying the sharing partner selection-and-deletion screen 441.

When reading of all pieces of user history information from the user history table 163 is not completed (N in step S263), the deletion processing unit 106 extracts a sharing destination user ID from the read piece of user history information (step S264). Next, the deletion processing unit 106 reads, from the sharing partner information, the user name corresponding to the extracted sharing destination user ID (step S265), and arranges the user name in a display frame in the screen format data defining the sharing partner selection-and-deletion screen 441 (step S266). Then, the deletion processing unit 106 associates the sharing destination user ID with a piece of position information indicating the display frame on the sharing partner selection-and-deletion screen 441 in which the user name is arranged, and stores the sharing destination user ID and the piece of position information as data in an arrangement position correspondence table of deletion target user IDs (step S267). Subsequently, the deletion processing unit 106 returns to step S262 to repeat the processing.

5.5 Conclusion

In order to delete a content shared by a content owner, it is necessary to hold the history of contents shared by the content owner and the terminal device of a sharing partner until the content owner deletes the content. This poses a problem in that an increase in the number of shared contents and sharing partners causes an increase in the amount of history to be stored.

To solve the problem, the above processing is performed so as to: share a content; delete the content; convert the history format; and set the switching period for converting the history format. In particular, the history format created at the time of sharing a content is converted according to the time elapsed after the sharing. That is, immediately after the sharing of a content, the history is in a format that includes the content ID of the content and the sharing destination user ID of a sharing partner with whom the content is shared, and, when a predetermined period has elapsed after the sharing of the content, the format of the history is converted to another format that does not include the content ID. This makes it possible to reduce the data size of sharing history stored for the purpose of deleting a shared content. In other words, it is possible to reduce the data size of the history of shared contents.

6. Embodiment 4

The following describes a data management system 20*a* as Embodiment 4 of the present invention, with reference to the drawings.

6.1 Structure of Data Management System 20*a*

Figure 38:
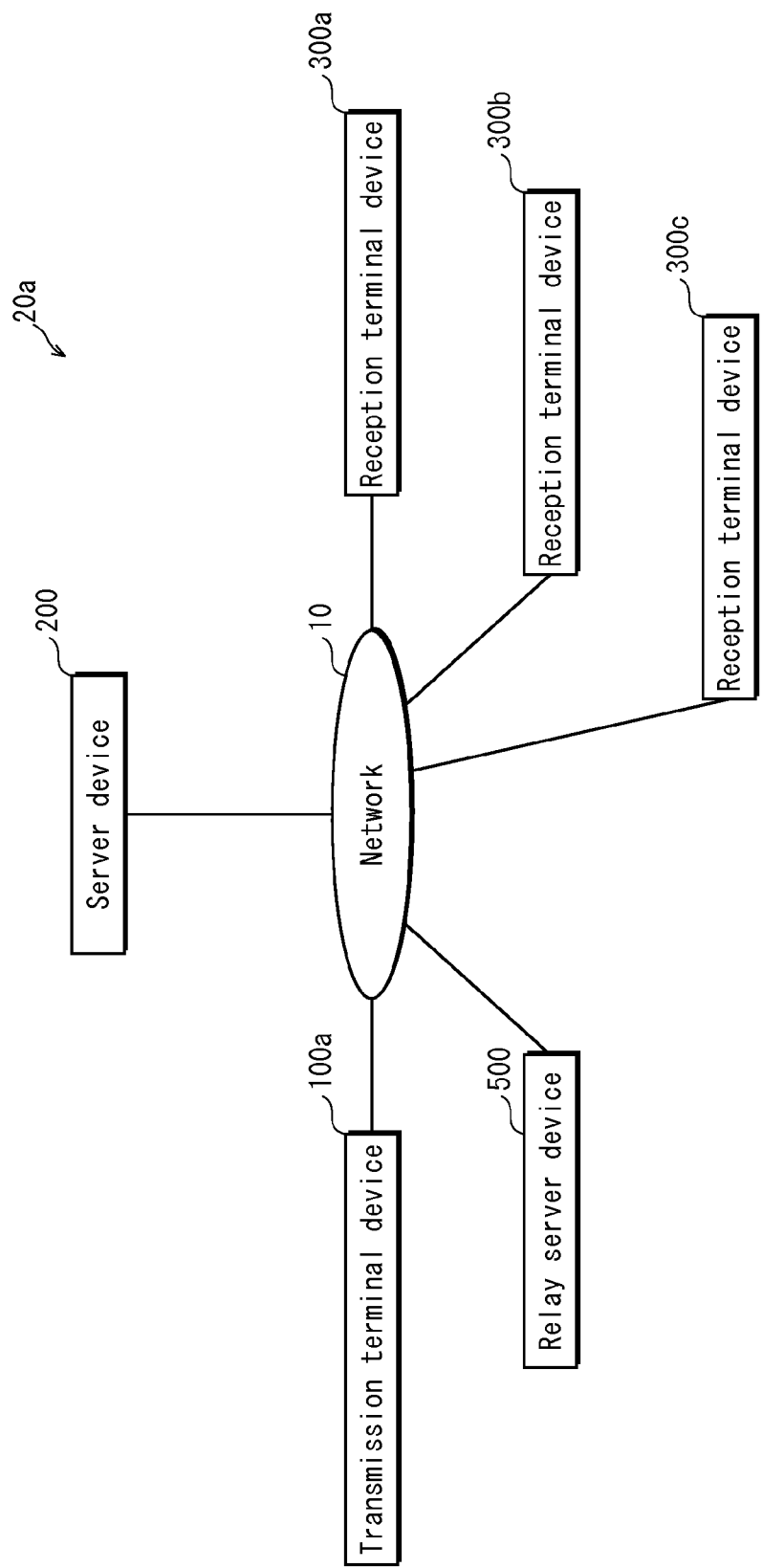
FIG. 38 is a block diagram showing the structure of a content management device 20a according to Embodiment 4.

As shown in FIG. 38, the data management system 20*a* is composed of a transmission terminal device 100*a*, the server device 200, the reception terminal devices 300*a*, 300*b*, 300*c*, . . . , and a relay server device 500. The transmission terminal device 100*a*, the server device 200, the reception terminal devices 300*a*, 300*b*, 300*c*, . . . , and the relay server device 500 are connected to each other via the network 10.

The data management system 20*a* has a similar structure to the data management system 20 according to Embodiment 3. The following mainly describes a difference with the data management system 20.

The server device 200 and the reception terminal devices 300*a*, 300*b*, 300*c*, . . . in the data management system 20*a* have the same structure as the corresponding devices in the data management system 20. The transmission terminal device 100*a* in the data management system 20*a* has a different structure from the transmission terminal device 100 in the data management system 20. The relay server device 500 in the data management system 20*a* does not exist in the data management system 20.

The following describes the transmission terminal device 100*a* and the relay server device 500.

6.2 Transmission Terminal Device 100*a*

Figure 39:
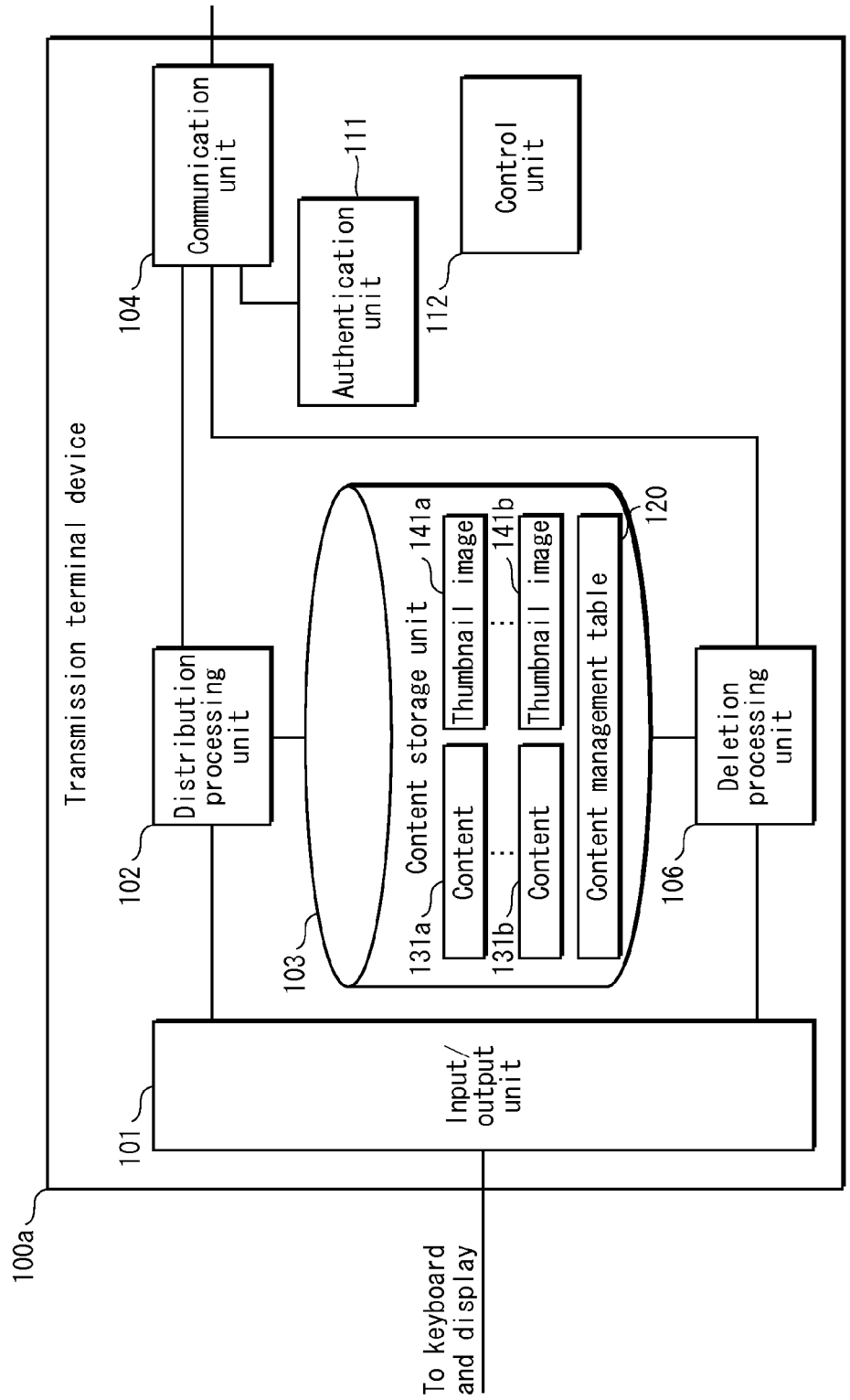

As shown in FIG. 39, the transmission terminal device 100*a* is composed of the input/output unit 101, the distribution processing unit 102, the content storage unit 103, the communication unit 104, the deletion processing unit 106, the authentication unit 111, and the control unit 112. The transmission terminal device 100*a* is connected to a remote control, a mouse, a keyboard, and a display unit.

The input/output unit 101, the distribution processing unit 102, the content storage unit 103, the communication unit 104, the deletion processing unit 106, the authentication unit 111, and the control unit 112 in the transmission terminal device 100*a* are respectively the same as the input/output unit 101, the distribution processing unit 102, the content storage unit 103, the communication unit 104, the deletion processing unit 106, the authentication unit 111, and the control unit 112 in the transmission terminal device 100 according to Embodiment 3. Accordingly, detailed descriptions of these components are omitted.

The transmission terminal device 100*a* is specifically a computer system including a microprocessor, a ROM, a RAM, and an HDD unit. One of the RAM and the HDD unit stores computer programs. The microprocessor operates according to the computer programs, whereby the input/output unit 101, the distribution processing unit 102, the communication unit 104, the deletion processing unit 106, the authentication unit 111, and the control unit 112 achieve parts of their functions.

6.3 Relay server Device 500

Figure 40:
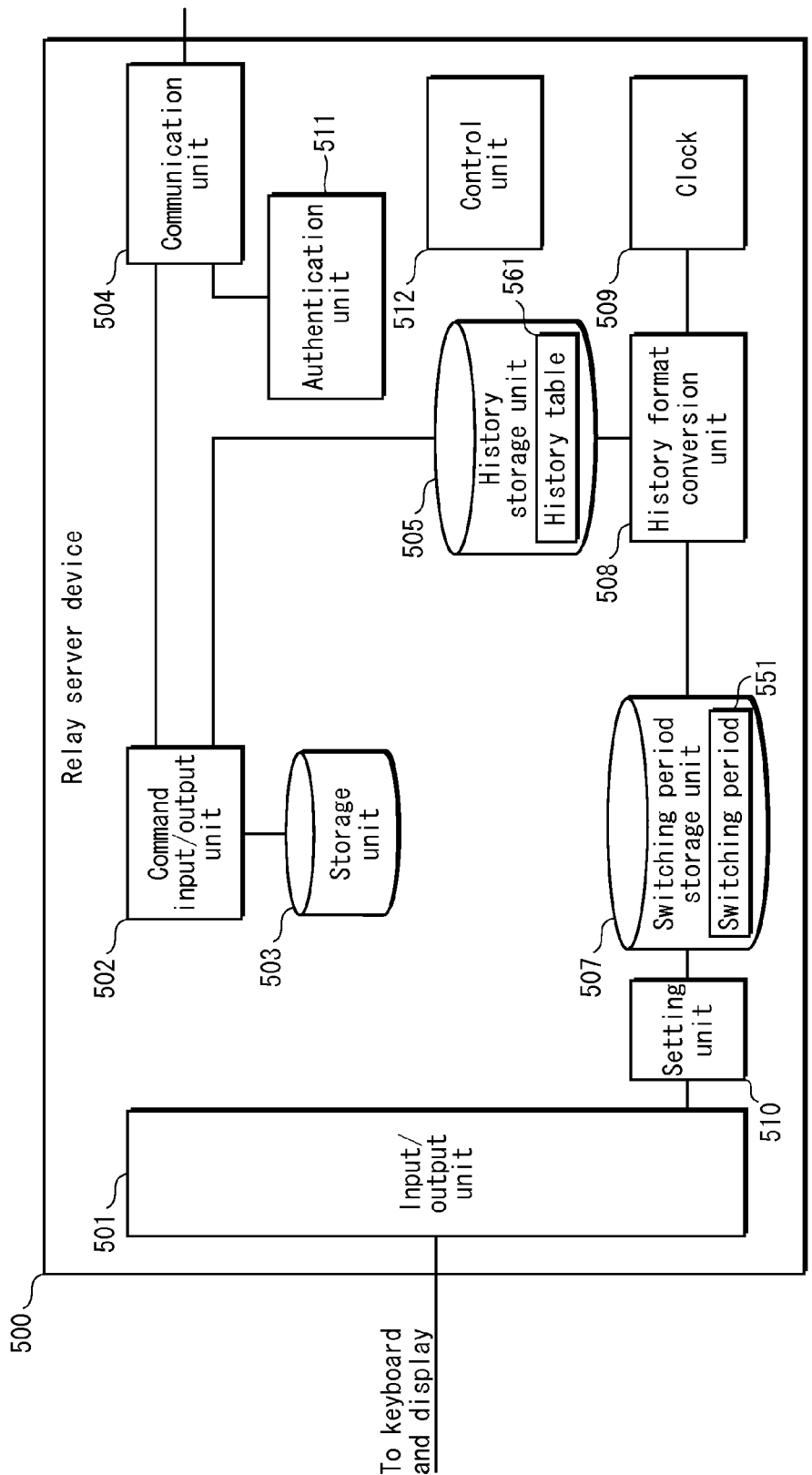
FIG. 40 is a block diagram showing the structure of a relay server device 500.

As shown in FIG. 40, the relay server device 500 is composed of an input/output unit 501, a command input/output unit 502, a storage unit 503, a communication unit 504, a history storage unit 505, a switching period storage unit 507, a history format conversion unit 508, a clock 509, a setting unit 510, an authentication unit 511, and a control unit 512. The relay server device 500 is connected to a remote control, a mouse, a keyboard, and a display unit.

The relay server device 500 is specifically a computer system including a microprocessor, a ROM, a RAM, and a hard disk unit. One of the RAM and the HDD unit stores computer programs. The microprocessor operates according to the computer programs, whereby the input/output unit 501, the command input/output unit 502, the communication unit 504, the history format conversion unit 508, the setting unit 510, the authentication unit 511, and the control unit 512 achieve parts of their functions.

The input/output unit 501, the history storage unit 505, the switching period storage unit 507, the history format conversion unit 508, the clock 509, and the setting unit 510 respectively have the same structures as the input/output unit 101, the history storage unit 105, the switching period storage unit 107, the history format conversion unit 108, the clock 109, and the setting unit 110 in the transmission terminal device 100 according to Embodiment 3.

The following mainly describes a difference with the components of the transmission terminal device 100 according to Embodiment 3.

(1) Storage Unit 503

The content storage unit 503 is composed of a recording medium such as an HDD unit, for example. The storage unit 503 includes an area for storing a command message in correspondence with a device ID to which the command message is to be transmitted. Note that the command message is any of the distribution command message, the content selection-and-deletion command message, and the user selection-and-deletion command message received from the transmission terminal device 100a.

The distribution command message, the content selection-and-deletion command message, and the user selection-and-deletion command message respectively have the same structures as the distribution command message, the content selection-and-deletion command message, and the user selection-and-deletion command message in Embodiment 3.

(2) History Storage Unit 505

The history storage unit 505 is composed of a recording medium such as an HDD unit, for example. The history storage unit 505 is the same as the history storage unit 105 in the transmission terminal device 100 according to Embodiment 3, and stores a history table 561. The history table 561 has the same data structure as the history table 161 stored in the history storage unit 105 of the transmission terminal device 100. The history table 561 includes the content history table 162 and the user history table 163.

The data management system 20a may include a plurality of transmission terminal devices. In this case, the history storage unit 505 may store history tables corresponding one-to-one with the transmission terminal devices. Also, each of the history tables may have attached thereto identification information identifying a corresponding transmission terminal device.

(3) Switching Period Storage Unit 507

The switching period storage unit 507 is composed of a recording medium such as an HDD unit, for example. Similarly to the switching period storage unit 107 in the transmission terminal device 100, the switching period storage unit 507 stores a switching period 551. The switching period 551 is the same as the switching period 151 stored in the switching period storage unit 107 of the transmission terminal device 100.

The switching period 551 indicates the number of days that elapse after the date any of the contents in the content storage unit 103 in the transmission terminal device 100a is shared with any of the reception terminal devices 300a, 300b, 300c, . . . used by other users. Based on a reference date, which is a date on which the number of days indicated by the switching period 551 elapse after the date a content was shared, the format of history information that corresponds to the content and that is in the history table 561 (described later) stored in the history storage unit 505 is switched to another format. More specifically, the switching is performed before or after the reference date. Detailed description regarding the switching of the format is provided above in Embodiment 3.

The switching period storage unit 507 stores the switching period 551 in advance. Alternatively, the switching period storage unit 507 may store a switching period input by an operator of the relay server device 500 via the input/output unit 501.

(4) Input/Output Unit 501

The input/output unit 501 is a communication circuit connected to devices such as a remote control, a mouse, a keyboard, and a display unit, and transfers data among these devices. The input/output unit 501 is realized by a communication circuit conforming to the USB standard, for example.

The input/output unit 501 receives input data from the remote control, the mouse, and the keyboard, and outputs the input data to the setting unit 510.

(5) Setting Unit 510

The setting unit 510 is the same as the setting unit 110 in the transmission terminal device 100 according to Embodiment 3.

(6) Command Input/Output Unit 502

The command input/output unit 502 receives, from the transmission terminal device 100a via the network 10 and the communication unit 504, any of a distribution command message, a content selection-and-deletion command message, and a user selection-and-deletion command message, in correspondence with a device ID identifying a transmission destination device. Upon receiving the command message, the command input/output unit 502 writes, into the storage unit 503, the command message in correspondence with the device ID identifying the transmission destination device.

Also, the command input/output unit 502 receives, from any of the reception terminal devices 300a, 300b, 300c, . . . , any of a request for a distribution command message, a request for a content selection-and-deletion command message, and a request for a user selection-and-deletion command message, together with a device ID identifying the reception terminal device that has sent the request. Upon receiving the device ID and the request, the command input/output unit 502 searches the storage unit 503 for the device ID and a command message corresponding to the request. If the corresponding command message exists, the command input/output unit 502 reads the command message from the storage unit 503. Next, the command input/output unit 502 transmits the command message thus read to the reception terminal device that has sent the request, via the communication unit 504 and the network 10.

Also, the command input/output unit 502 updates the history table 561 stored in the history storage unit 505.

(7) Communication Unit 504

The communication unit 504 is a communication circuit connected to the network 10. The communication unit 504 receives information from either the transmission terminal device 100a or the reception terminal devices 300a, 300b, 300c, . . . , and transmits information to either the transmission terminal device 100a or the reception terminal devices 300a, 300b, 300c, . . . .

(8) Clock 509

The clock 509 is a circuit that holds the current date and outputs the current date.

(9) History Format Conversion Unit 508

The history format conversion unit 508 is the same as the history format conversion unit 108 in the transmission terminal device 100 according to Embodiment 3. The history format conversion unit 508 is a circuit that switches between formats within the history table 561 stored in the history storage unit 505. Specifically, the history format conversion unit 508 performs the switching based on whether the switching period in the switching period storage unit 507 has elapsed from the day a content was shared.

(11) Authentication Unit 511

The authentication unit 511 performs challenge-response mutual authentication with the transmission terminal device 100a. Also, the authentication unit 511 performs challenge-response mutual authentication with the reception terminal devices 300a, 300b, 300c, . . . .

(12) Control Unit 512

The control unit 512 controls the coordination of operations by the input/output unit 501, the command input/output unit 502, the communication unit 504, the history format conversion unit 508, the clock 509, the setting unit 510, and the authentication unit 511.

6.3 Operations of Content Management System 20a

The following describes the operations of the data management system 20a, with particular attention to a difference with Embodiment 3.

(1) Content Management System 20a

Here, general operations of the data management system 20a are described, with reference to the flowchart shown in FIG. 22. The main difference between the general operations of the data management system 20a and those in Embodiment 3 is the subject of each of the operations.

An instruction for setting a switching period is input by the operator of the relay server device 500 via any of (i) an operation using a setting button of the remote control, (ii) an operation using the mouse, and (iii) an input operation using the keyboard. The setting unit 510 receives the instruction for setting a switching period from the remote control, the mouse, or the keyboard, via the input/output unit 501. Upon receiving the instruction for setting a switching period from the operator (Y in step S101), the setting unit 510 performs operations for a setting phase (step S102). If not receiving the instruction for setting a switching period from the operator (N in step S101), the setting unit 510 does not perform operations for the setting phase.

Next, an instruction for sharing a content is input by the user of the transmission terminal device 100a via any of (i) an operation using a button of the remote control, (ii) an operation using the mouse, and (iii) an input operation using the keyboard. The distribution processing unit 102 receives the instruction for sharing a content from the remote control, the mouse, or the keyboard, via the input/output unit 101. Upon receiving the instruction for sharing a content from the user of the transmission terminal device 100a (Y in step S103), the distribution processing unit 102 of the transmission terminal device 100a and the command input/output unit 502 of the relay server device 500 perform operations for a content sharing phase (step S104). If not receiving the instruction for sharing a content from the user of the transmission terminal device 100a (N in step S103), the operations for the content sharing phase are not performed.

Next, the history format conversion unit 508 of the relay server device 500 performs operations for a history format conversion phase (step S105).

Next, an instruction for deleting a content is input by the user of the transmission terminal device 100a via any of (i) an operation using a button of the remote control, (ii) an operation using the mouse, and (iii) an input operation using the keyboard. The deletion processing unit 106 receives the instruction for deleting a content from the remote control, the mouse, or the keyboard, via the input/output unit 101. Upon receiving the instruction for deleting a content from the user of the transmission terminal device 100a (Y in step S106), the deletion processing unit 106 of the transmission terminal device 100a and the command input/output unit 502 of the relay server device 500 perform operations for a content deletion phase (step S107). If not receiving the instruction for deleting a content from the user (N in step S106), the operations for the content deletion phase are not performed.

(2) Operations for Transmitting and Receiving Command Message

Figure 41:
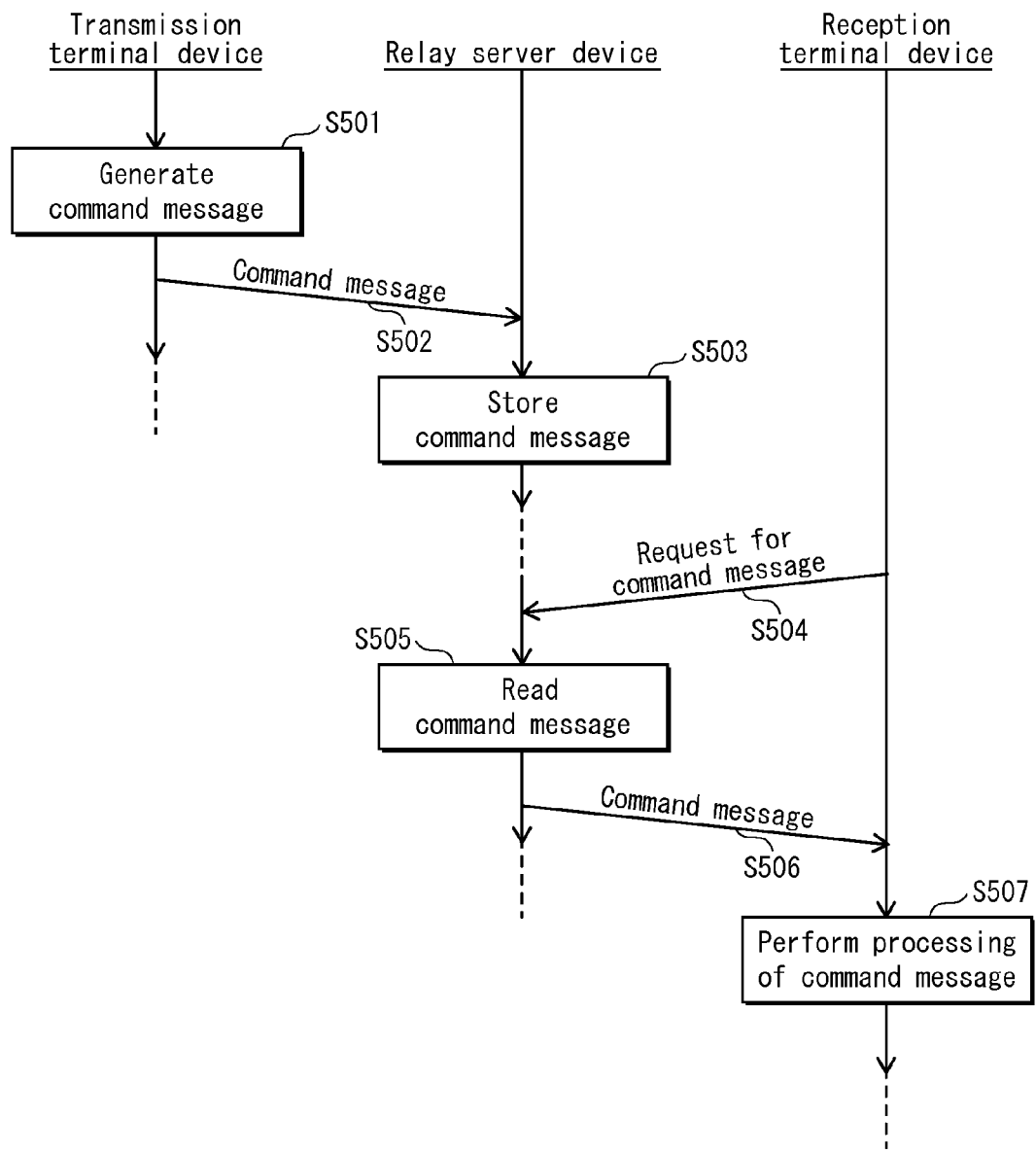

The following describes common operations in transmission and reception of a command message among the transmission terminal device 100a, the relay server device 500, and the reception terminal device 300a, with reference to the flowchart of FIG. 41. Note that the command message is specifically any of a distribution command message, a content selection-and-deletion command message, and a user selection-and-deletion command message.

The transmission terminal device 100a generates a command message (step S501), and transmits the command message and a device ID identifying a transmission destination device to the relay server device 500 (step S502).

The relay server device 500 receives the command message and the device ID identifying the transmission destination device from the transmission terminal device 100a (step S502), and stores the command message in correspondence with the device ID (step S503).

The reception terminal device 300a regularly transmits its own device ID and a request for a command message to the relay server device 500 (step S504).

The relay server device 500 receives the device ID and the request for a command message from the reception terminal device 300a (step S504). If the device ID and a command message corresponding to the request exist, the relay server device 500 reads the command message (step S505). Next, the relay server device 500 transmits the command message thus read to the reception terminal device identified by the device ID (step S506).

The reception terminal device 300a receives the command message from the relay server device 500 (step S506), and performs processing corresponding to the command message (step S507).

(3) Operations of Setting Unit 510 in Relay Server Device 500

Descriptions of the operations of the setting unit 510 in the relay server device 500 are omitted, since they are the same as those of the setting unit 110 in the transmission terminal device 100 according to Embodiment 3.

In Embodiment 4, the setting unit 510 of the relay server device 500 sets the switching period 551. However, it is not limited to such.

The transmission terminal device 100a may include the setting unit 110, and may transmit the switching period set by the setting unit 110 to the relay server device 500. In this case, the relay server device 500 receives the switching period from the transmission terminal device 100a, and writes the switching period into the switching period storage unit 507. Also, the transmission terminal device 100a may transmit the switching period and the user ID identifying the user of the transmission terminal device 100a to the relay server device 500. In this case, the setting unit 510 writes the user ID and the switching period as a pair into the switching period storage unit 507.

(4) Operations for Sharing Content in Data Management System 20a

The following describes operations for sharing a content in the data management system 20a, with reference to the flowcharts shown in FIGS. 24, 42, 43, and 26.

The transmission terminal device 100a specifies the ID of a content to be shared, as shown in steps S138 to S140 in FIG. 24 according to Embodiment 3.

The distribution processing unit 102 does not perform the subsequent step S141 in FIG. 24. In other words, the distribution processing unit 102 does not generate content history information. Furthermore, the distribution processing unit 102 does not write generated content history information into the content history table 162, either.

Next, the transmission terminal device 100a and the server device 200 connect to each other to perform mutual authentication, and the transmission terminal device 100a receives sharing partner information from the server device 200, as shown in steps S142 to S150 in FIG. 24.

Figure 42:
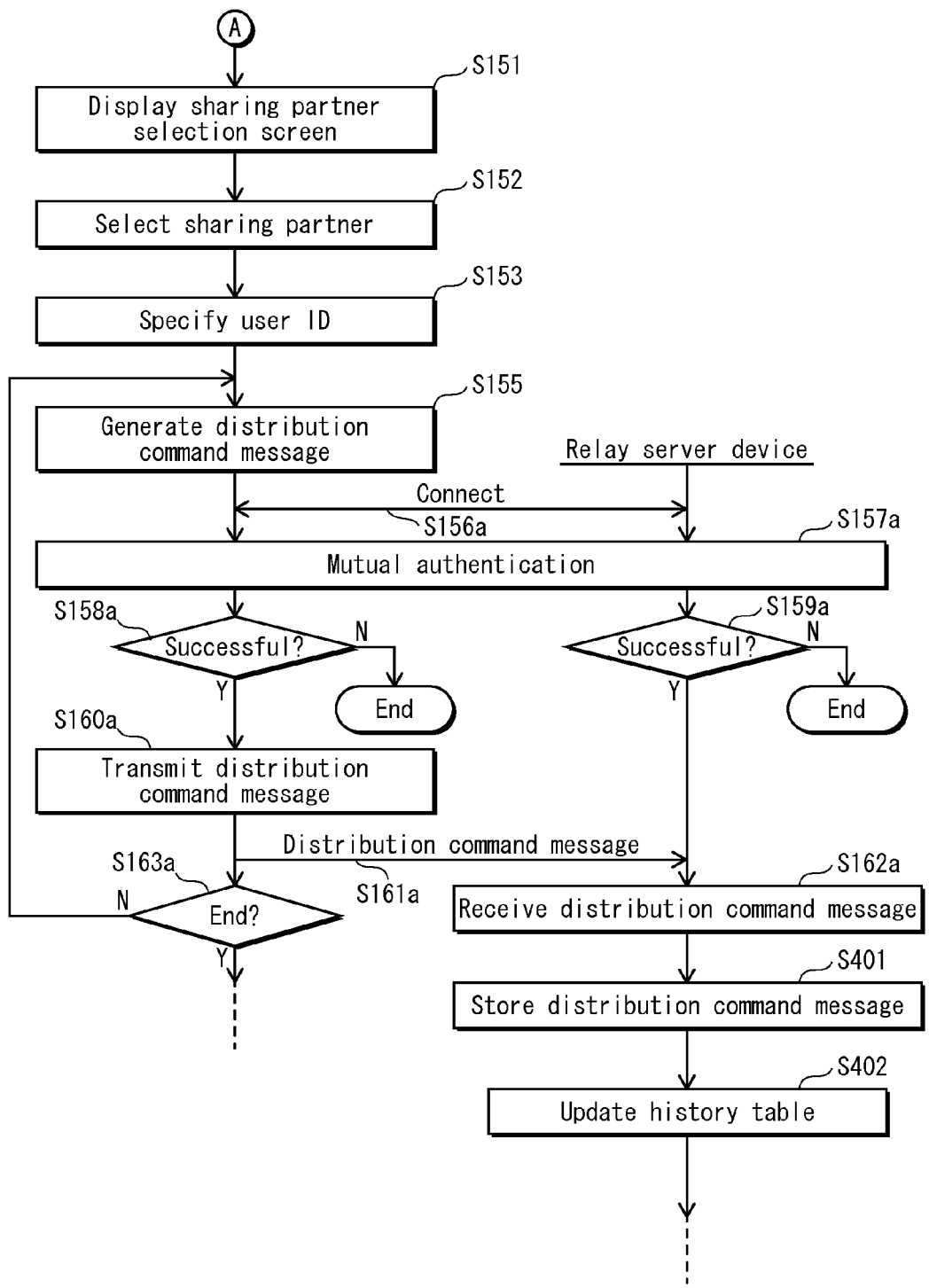
FIG. 42 is a flowchart showing the operations for sharing a content in the data management system 20a, and in particular showing the procedures of transmitting a distribution command message to the relay server device 500.
Figure 43:
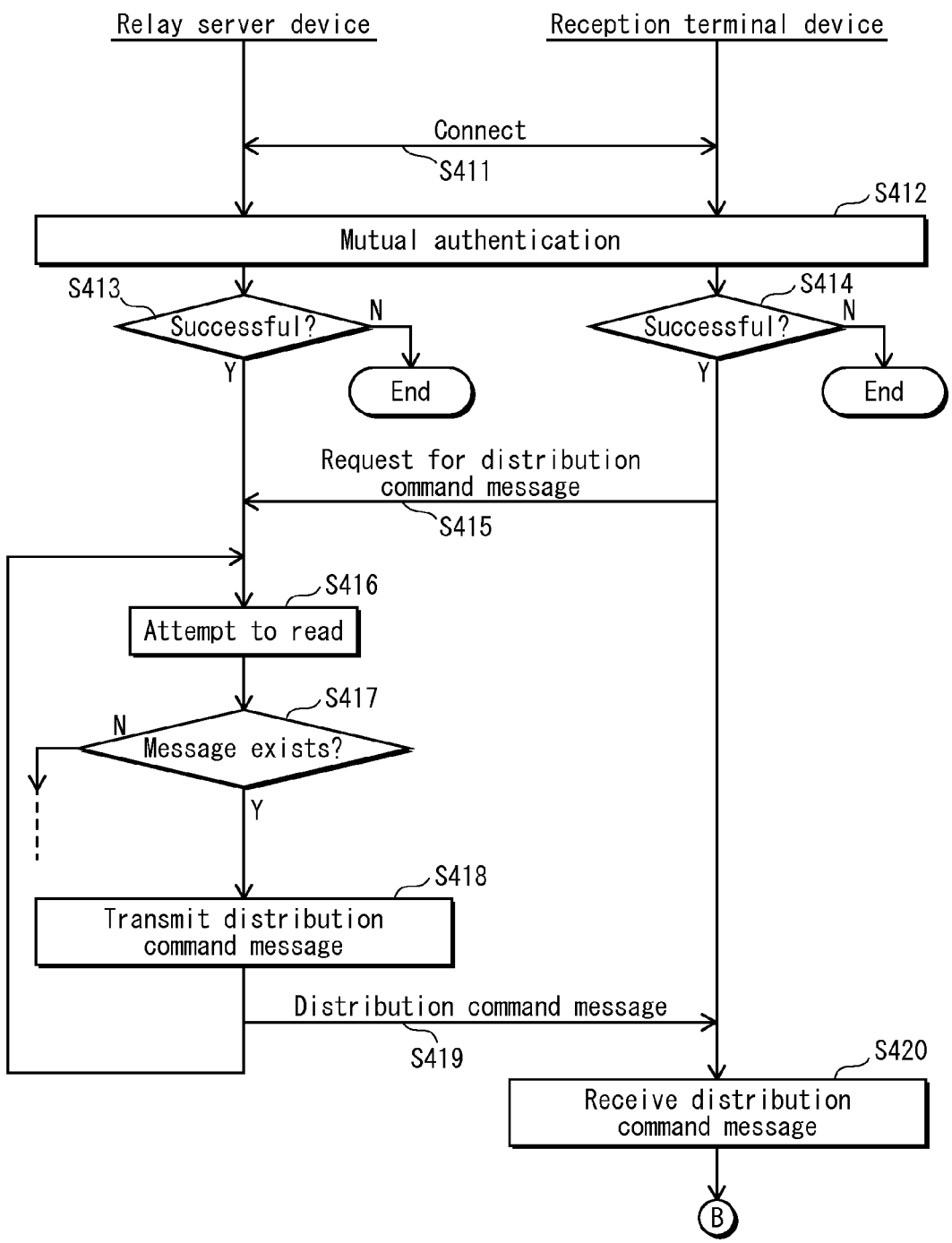
FIG. 43 is a flowchart showing the operations for sharing a content in the data management system 20a, and in particular showing the procedures in which the reception terminal device 300a receives the distribution command message from the relay server device 500.

Next, the transmission terminal device 100*a* selects a sharing partner and specifies the user ID of the sharing partner, as shown in steps S151 to S153 in FIG. 42. Note that steps S151 to S153 in FIG. 42 are the same as steps S151 to S153 in FIG. 25.

Next, the distribution processing unit 102 generates one distribution command message for a pair of the content ID of the content selected in the above step and the sharing destination user ID of the sharing partner (step S155).

The communication unit 104 of the transmission terminal device 100*a* connects to the relay server device 500 (step S156*a*), and the authentication unit 111 of the transmission terminal device 100*a* and the authentication unit 511 of the relay server device 500 perform mutual authentication (step S157*a*). The mutual authentication is described above in Embodiment 3, and details thereof are thus omitted.

When the authentication fails (N in step S158*a* or N in step S159*a*), the transmission terminal device 100*a* or the server device 500 does not perform subsequent processing.

When the authentication is successful (Y in step S158*a*), the distribution processing unit 102 of the transmission terminal device 100*a* transmits a device ID identifying a transmission destination device and the distribution command message to the relay server device 500 via the network 10 (steps S160*a* to S161*a*).

When the authentication is successful (Y in step S159*a*), the command input/output unit 502 of the relay server device 500 receives the device ID identifying the transmission destination device and the distribution command message, from the transmission terminal device 100*a* via the network 10 and the communication unit 504 (steps S161*a* to S162*a*).

Next, the command input/output unit 502 writes, into the storage unit 503, the device ID identifying the transmission destination device and the distribution command message thus received in correspondence with each other (step S401). Next, the command input/output unit 502 generates content history information and user history information from the received distribution command message. The content history information includes a content ID, which is included in the distribution command message. The user history information includes a sharing destination user ID, which is also included in the distribution command message. Furthermore, the command input/output unit 502 adds an element ID to each of the content history information and the user history information. Furthermore, the command input/output unit 502 adds the current date as a sharing date to the content history information, and writes the content history information to which the sharing date is added into the content history table 162 of the history table 561. Also, the command input/output unit 502 writes the generated user history information into the user history table 163 of the history table 561 (step S402).

Next, the communication unit 303 of the reception terminal device 300*a* connects to the relay server device 500 (step S411), and the authentication unit 511 of the relay server device 500 and the authentication unit 307 of the reception terminal device 300*a* perform mutual authentication (step S412). The mutual authentication is described above in Embodiment 3, and details thereof are thus omitted.

When the authentication fails (N in step S413 or N in step S414), the relay server device 500 or the reception terminal device 300*a* does not perform subsequent processing.

When the authentication is successful (Y in step S414), the distribution processing unit 304 of the reception terminal device 300*a* transmits the device ID of the reception terminal device 300*a* and a request for the distribution command message to the relay server device 500 via the network 10 (step S415).

When the authentication is successful (Y in step S413), the command input/output unit 502 of the relay server device 500 receives the device ID and the request for the distribution command message (step S415). Next, the command input/output unit 502 searches the storage unit 503 for the device ID and the distribution command message corresponding to the request, and attempts to read the device ID and the distribution command message (step S416). When the distribution command message exists (Y in step S417), the command input/output unit 502 transmits the distribution command message that has been read to the reception terminal device 300*a* (steps S418 to S419).

The reception terminal device 300*a* receives the distribution command message (steps S419 to S420).

Next, the reception terminal device 300*a* extracts and writes a content, as shown in FIG. 26 (steps S164 to S167). The reception terminal device 300*a* displays the content (steps S168 to S169).

(5) Operations for Deleting Content in Data Management System 20*a*

The following describes operations for deleting a content in the data management system 20*a*, with reference to the flowcharts shown in FIG. 33 and FIGS. 44 to 47.

The transmission terminal device 100*a* receives sharing partner information from the server device 200 connected thereto (steps S191 to S200 in FIG. 33).

Next, the transmission terminal device 100*a* displays the deletion menu screen 451, and receives either an instruction for selecting and deleting a content via the button 452 or an instruction for selecting a sharing partner and deleting corresponding contents via the button 453 (steps S201 to S202 in FIG. 33).

(Selection and Deletion of Content)

Upon receiving an instruction for selecting and deleting a content ("Content" in step S203 in FIG. 33), the deletion processing unit 106 displays the content selection-and-deletion screen 461 (step S204). In this way, the deletion processing unit 106 receives a selection of a content to be deleted (step S205). Next, the deletion processing unit 106 extracts a sharing destination user ID (step S206). Next, the deletion processing unit 106 generates the content selection-and-deletion command message 191 (step S207).

Figure 44:
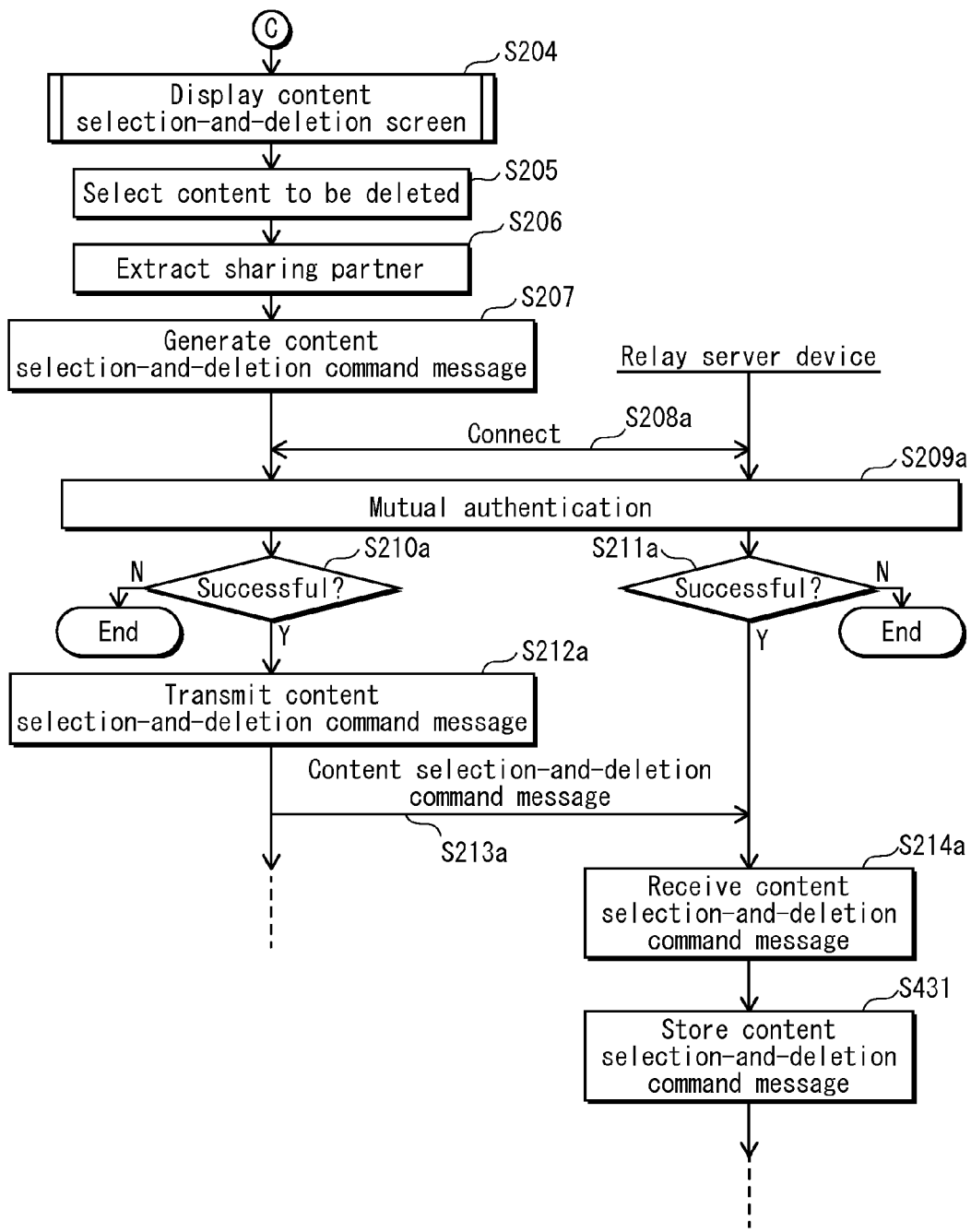
FIG. 44 is a flowchart showing the operations for deleting a content in the data management system 20a, and in particular showing the procedures for transmitting a content selection-and-deletion command message to the relay server device 500.
Figure 45:
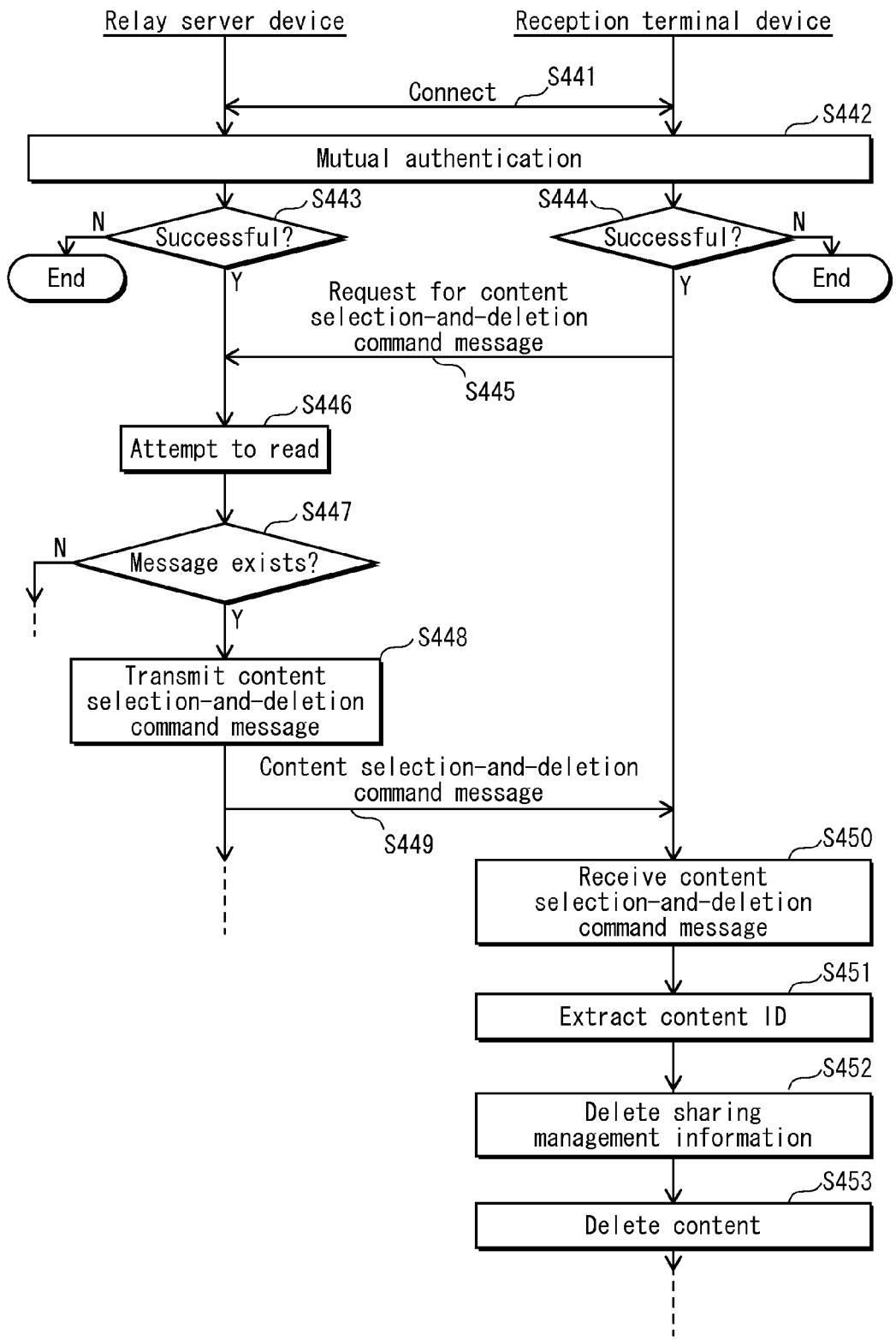
FIG. 45 is a flowchart showing the operations for deleting a content in the data management system 20a, and in particular showing the procedures in which the reception terminal device 300a receives the content selection-and-deletion command message from the relay server device 500.

Note that steps S204 to S207 in FIG. 44 are the same as steps S204 to S207 in FIG. 34.

Next, the communication unit 104 of the transmission terminal device 100*a* connects to the relay server device 500 (step S208*a*), and the authentication unit 111 of the transmission terminal device 100*a* and the authentication unit 511 of the relay server device 500 perform mutual authentication (step S209*a*). The mutual authentication is described above in Embodiment 3, and details thereof are thus omitted.

When the authentication fails (N in step S210*a* or N in step S211*a*), the transmission terminal device 100*a* or the relay server device 500 does not perform subsequent processing.

When the authentication is successful (Y in step S210*a*), the deletion processing unit 106 of the transmission terminal device 100*a* transmits a device ID identifying a transmission destination device and the content selection-and-deletion command message to the relay server device 500 via the network 10 (steps S212*a* to S213*a*).

When the authentication is successful (Y in step S211*a*), the command input/output unit 502 of the relay server device 500 receives the device ID identifying the transmission destination device and the content selection-and-deletion command message, from the transmission terminal device 100*a* via the network 10 and the communication unit 504 (steps S213*a* to S214*a*). Next, the command input/output unit 502 writes, into the storage unit 503, the device ID identifying the transmission destination device and the content selection-and-deletion command message thus received in correspondence with each other (step S431).

Next, the communication unit 303 of the reception terminal device 300*a* connects to the relay server device 500 (step S441), and the authentication unit 511 of the relay server device 500 and the authentication unit 307 of the reception terminal device 300*a* perform mutual authentication (step S442). The mutual authentication is described above in Embodiment 3, and details thereof are thus omitted.

When the authentication fails (N in step S443 or N in step S444), the relay server device 500 or the reception terminal device 300*a* does not perform subsequent processing.

When the authentication is successful (Y in step S444), the distribution processing unit 304 of the reception terminal device 300*a* transmits the device ID of the reception terminal device 300*a* and a request for the content selection-and-deletion command message, via the communication unit 303 and the network 10 (step S445).

When the authentication is successful (Y in step S443), the command input/output unit 502 of the relay server device 500 receives the device ID and the request for the content selection-and-deletion command message, via the network 10 and the communication unit 504 (step S445).

Next, the command input/output unit 502 searches the storage unit 503 for the device ID and the content selection-and-deletion command message corresponding to the request, and attempts to read the device ID and the distribution command message (step S446). When the content selection-and-deletion command message exists (Y in step S447), the command input/output unit 502 transmits the content selection-and-deletion command message that has been read to the reception terminal device 300*a* (steps S448 to S449).

The deletion processing unit 305 of the reception terminal device 300*a* receives the content selection-and-deletion command message from the relay server device 500, via the network 10 and the communication unit 303 (steps S449 to S450). Next, the deletion processing unit 305 extracts a content ID from the content selection-and-deletion command message 191 (step S451), and deletes the sharing management information including the extracted content ID from the sharing management table 391 (step S452). Also, the deletion processing unit 305 deletes the content identified by the extracted content ID from the storage unit 306 (step S453).

This completes the operations by the data management system 20*a* performed when a content is selected and deleted.

Note that steps S451 to S453 are the same as steps S215 to S217 in FIG. 34.

(Selection of User and Deletion of Contents)

On the other hand, upon receiving an instruction for selecting a sharing partner and deleting corresponding contents ("Sharing partner" in step S203 of FIG. 33), the deletion processing unit 106 displays the sharing partner selection-and-deletion screen 441 (step S221). Next, the deletion processing unit 106 receives a selection of a sharing partner whose contents are to be deleted (step S222). The deletion processing unit 106 generates the user selection-and-deletion command message 196 (step S223).

Figure 46:
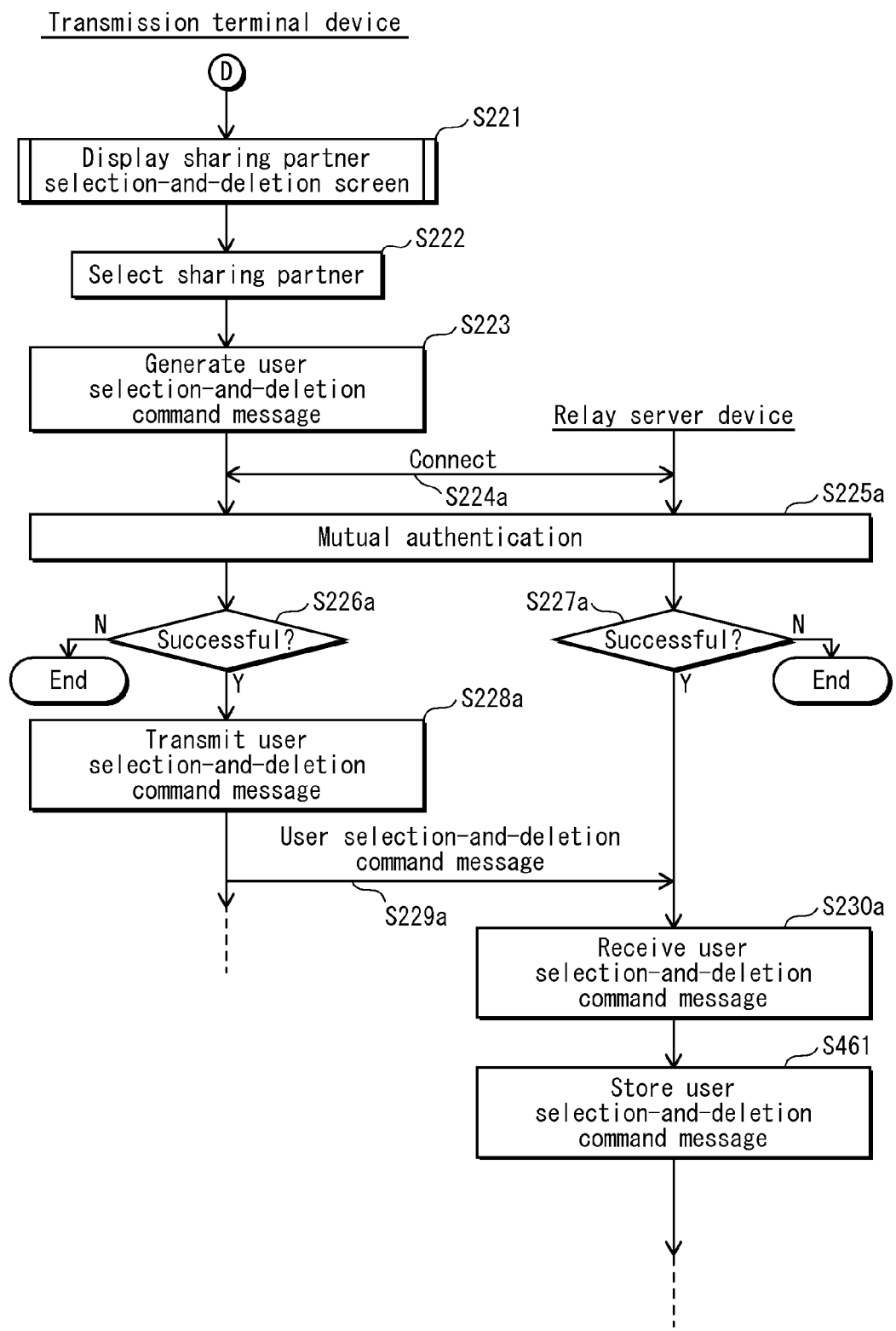
FIG. 46 is a flowchart showing the operations for deleting a content in the data management system 20a, and in particular showing the procedures for transmitting a user selection-and-deletion command message to the relay server device 500.

Note that steps S221 to S223 in FIG. 46 are the same as steps S221 to S223 in FIG. 35.

Next, the communication unit 104 of the transmission terminal device 100*a* connects to the relay server device 500 (step S224*a*), and the authentication unit 111 of the transmission terminal device 100*a* and the authentication unit 511 of the relay server device 500 perform mutual authentication (step S225*a*). The mutual authentication is described above in Embodiment 3, and details thereof are thus omitted.

When the authentication fails (N in step S226*a* or N in step S227*a*), the transmission terminal device 100*a* or the relay server device 500 does not perform subsequent processing.

When the authentication is successful (Y in step S226*a*), the deletion processing unit 106 of the transmission terminal device 100 transmits a device ID identifying a transmission destination device and the user selection-and-deletion command message to the relay server device 500 via the network 10 (steps S228*a* to S229*a*).

When the authentication is successful (Y in step S227*a*), the command input/output unit 502 of the relay server device 500 receives the device ID identifying the transmission destination device and the user selection-and-deletion command message, from the transmission terminal device 100*a* via the network 10 and the communication unit 504 (steps S229*a* to S230*a*). Next, the command input/output unit 502 writes, into the storage unit 503, the device ID identifying the transmission destination device and the user selection-and-deletion command message thus received in correspondence with each other (step S461).

Next, the communication unit 303 of the reception terminal device 300*a* connects to the relay server device 500 (step S471), and the authentication unit 511 of the relay server device 500 and the authentication unit 307 of the reception terminal device 300*a* perform mutual authentication (step S472). The mutual authentication is described above in Embodiment 3, and details thereof are thus omitted.

When the authentication fails (N in step S473 or N in step S474), the relay server device 500 or the reception terminal device 300*a* does not perform subsequent processing.

When the authentication is successful (Y in step S474), the distribution processing unit 304 of the reception terminal device 300*a* transmits the device ID of the reception terminal device 300*a* and a request for the user selection-and-deletion command message to the relay server device 500 via the communication unit 303 and the network 10 (step S475).

When the authentication is successful (Y in step S473), the command input/output unit 502 of the relay server device 500 receives the device ID and the request for the user selection-and-deletion command message, via the network 10 and the communication unit 504 (step S475).

Next, the command input/output unit 502 searches the storage unit 503 for the device ID and the user selection-and-deletion command message corresponding to the request, and attempts to read the device ID and the user selection-and-deletion command message (step S476). When the user selection-and-deletion command message exists (Y in step S477), the command input/output unit 502 transmits the user selection-and-deletion command message that has been read to the reception terminal device 300*a* (steps S478 to S479).

The deletion processing unit 305 of the reception terminal device 300*a* receives the user selection-and-deletion command message from the relay server device 500, via the network 10 and the communication unit 303 (steps S479 to S480). Next, the deletion processing unit 305 deletes all pieces of sharing management information stored in the sharing management table 391 (step S481), and deletes all contents stored in the storage unit 306 (step S482).

This completes the operations by the data management system 20*a* performed when a sharing partner is selected for deletion of corresponding contents.

Figure 47:
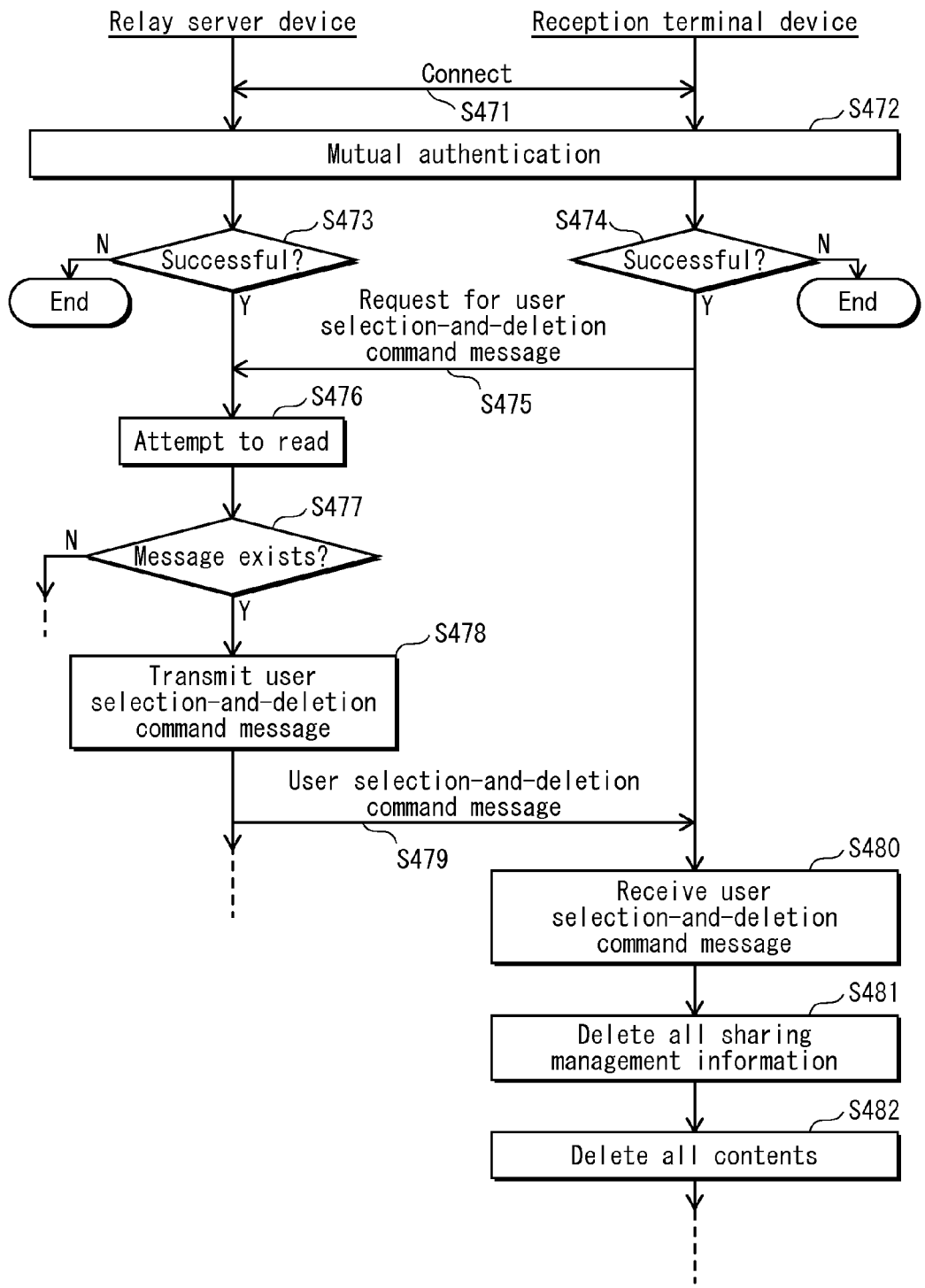
FIG. 47 is a flowchart showing the operations for deleting a content in the data management system 20a, and in particular showing the procedures in which the reception terminal device 300a receives the user selection-and-deletion command message from the relay server device 500.

Note that steps S481 to S482 in FIG. 47 are the same as steps S231 to S232 in FIG. 35.

7. Other Modifications

Although the present invention has been described based on the above embodiments, the present invention is of course not limited to the above embodiments. The present invention also includes cases such as the following.

(1) According to Embodiment 3, the history table of the transmission terminal device includes the user history table showing the sharing destination user IDs. However, it is not limited to such.

Instead of the user history table, the history table of the transmission terminal device may include a terminal history table showing sharing destination terminal IDs. Each of the sharing destination terminal IDs may be an identifier unique to a sharing destination terminal device, or may be the IP address of a sharing destination terminal device.

(2) According to Embodiment 3, the transmission terminal device holds the history table, and the history format conversion unit compares the switching period to the number of days elapsed since the day the content was shared. If the number of days elapsed is larger than the switching period, the format of the history table is converted. However, it is not limited to such.

As described in Embodiment 4, the server device may hold the history table instead of the transmission terminal device. Then, the history format conversion unit of the server device may compare the switching period to the number of days elapsed since the day the content was shared. If the number of days elapsed is larger than the switching period, the format of the history table may be converted.

(3) Not only can the present invention be realized as the transmission terminal device 100 including the above-described characteristic processing unit, it can also be realized as a content sharing history management method used in the transmission terminal device 100.

Also, the present invention can be realized as a computer program that causes a computer to perform the characteristic steps included in the content sharing history management method. It goes without saying that such a computer program can be distributed via a computer-readable non-transitory recording medium such as a CD-ROM (Compact Disc Read Only Memory) or a communication network such as the Internet.

(4) In Embodiment 4, the data management system 20a is composed of the transmission terminal device 100a, the server device 200, the reception terminal devices 300a, 300b, 300c, . . . , and the relay server device 500, as shown in FIG. 38. However, it is not limited to such.

The components of the server device 200 may be combined with the components of the relay server device 500 so that the server device 200 and the relay server device 500 are realized as a single server device.

(5) The following modification is possible for the display of the content selection-and-deletion screen 461 according to Embodiment 3.

Here, detailed description is provided of modified operations for displaying the content selection-and-deletion screen 461, with reference to the flowchart shown in FIG. 48. The flowchart shown in FIG. 48 is similar to the flowchart of FIG. 36, but differs therefrom with respect to steps S491 to S493 subsequent to step S243. The following describes the difference.

When reading of all pieces of content history information is not completed in step S243 (N in step S243), the deletion processing unit 106 extracts a sharing date from the read piece of content history information (step S491).

Next, the deletion processing unit 106 calculates a difference with use of the following formula.

Difference=Current date−Sharing date (step S492)

Next, the deletion processing unit 106 compares the calculated difference to the switching period (step S493).

When the difference is smaller than or equal to the switching period (step S493), control proceeds to step S244.

When the difference is larger than the switching period (step S493), control proceeds to step S242.

With the above processing, the display of the content selection-and-deletion screen 461 is performed such that, after the elapse of a predetermined time period from the sharing date of a content, the thumbnail image of the content is not shown.

(6) The present invention may be structured as follows.

One aspect of the present invention is a data management device for managing a permission history of use of a content. The data management device comprises a storage unit, a comparison unit, and a replacement unit. The storage unit stores, as the permission history, a content identifier identifying a content permitted to be used by another user. The comparison unit compares a threshold to the number of days elapsed from a date on which the use of the content was permitted. When the number of days elapsed is larger than the threshold, the replacement unit replaces the content identifier in the storage unit with a user identifier identifying the other user.

Another aspect of the present invention is a data management device for managing a permission history of a content permitted to be used by another user. The data management device comprises a storage unit, a comparison unit, and a replacement unit. The storage unit stores first permission history information composed of (i) a content identifier identifying the content, (ii) a permission date on which the content was permitted to be used by the other user; and (iii) a user identifier identifying the other user. The comparison unit compares a threshold to the number of days elapsed from the permission date. When the number of days elapsed is larger than the threshold, the replacement unit replaces the first permission history information in the storage unit with second permission history information composed of the user identifier.

The replacement unit may perform the replacement with the second permission history information by deleting the content identifier and the permission date from the first permission history information.

The content management device may further comprise a current date acquisition unit, a reception unit, and a writing unit. The current date acquisition unit acquires a current date. The reception unit receives the user identifier identifying the other user and a designation of the content identifier identifying the content. The writing unit writes the content identifier received by the reception unit, the current date as the permission date, and the user identifier into the writing unit as the first permission history information.

The content management device may further comprise a threshold storage unit and a current date acquisition unit. The threshold storage unit stores the threshold. The current date acquisition unit acquires a current date. The comparison unit may calculate a difference by subtracting the current date from the permission date, and may compare the difference to the threshold.

The data management device may be connected to a server device via a network. The server device may hold the content in correspondence with the content identifier or the user identifier. The data management device may transmit, to the server device, a deletion command indicating deletion of the content by designating the content identifier or the user identifier. The server device may receive the deletion command, and may delete the content corresponding to the content identifier or the user identifier designated by the deletion command.

Another aspect of the present invention is a data management method used in a data management device for managing a permission history of use of a content. The data management device comprises a storage unit that stores, as the permission history, a content identifier identifying a content permitted to be used by another user. The data management method comprises the steps of: comparing a threshold to the number of days elapsed from a date on which the use of the content was permitted; and when the number of days elapsed is larger than the threshold, replacing the content identifier in the storage unit with a user identifier identifying the other user.

Another aspect of the present invention is a computer program for data management used in a data management device for managing a permission history of use of a content. The data management device comprises a storage unit that stores, as the permission history, a content identifier identifying a content permitted to be used by another user. The computer program causes the data management device which is a computer to perform the steps of: comparing a threshold to the number of days elapsed from a date on which the use of the content was permitted; and when the number of days elapsed is larger than the threshold, replacing the content identifier in the storage unit with a user identifier identifying the other user.

Another aspect of the present invention is a computer-readable recording medium storing thereon a computer program for data management used in a data management device for managing a permission history of use of a content. The data management device comprises a storage unit that stores, as the permission history, a content identifier identifying a content permitted to be used by another user. The computer program causes the data management device which is a computer to perform the steps of: comparing a threshold to the number of days elapsed from a date on which the use of the content was permitted; and when the number of days elapsed is larger than the threshold, replacing the content identifier in the storage unit with a user identifier identifying the other user.

Another aspect of the present invention is an integrated circuit included in a data management device for managing a permission history of use of a content. The data management device comprises a storage unit that stores, as the permission history, a content identifier identifying a content permitted to be used by another user. The integrated circuit comprises a comparison unit and a replacement unit. The comparison unit compares a threshold to the number of days elapsed from a date on which the use of the content was permitted. When the number of days elapsed is larger than the threshold, the replacement unit replaces the content identifier in the storage unit with a user identifier identifying the other user.

(7) One aspect of the present invention is a terminal device for sharing a content with another user and deleting the content thus shared. The terminal device comprises a sharing history storage unit, a sharing history format conversion unit, and a format conversion timing storage unit. The sharing history storage unit stores sharing history information. The sharing history format conversion unit converts a format of the sharing history information stored in the sharing history storage unit. The format conversion timing storage unit stores a timing at which the sharing history format conversion unit converts the format. The sharing history format conversion unit converts the format at the timing stored in the format conversion timing storage unit.

With this structure, the format of the sharing history information is converted at an appropriate timing. This reduces unnecessary sharing history data and downsizes overall sharing history data.

The terminal device may further comprise a time acquisition unit. The sharing history information may include a sharing time at which the sharing was performed. The timing of converting the format may be a time elapsed since the sharing was performed. The format of the sharing history information may be converted according to the time elapsed since the sharing was performed.

With this structure, the format of the sharing history information is converted according to the time elapsed since the sharing was performed. This enables reduction of unnecessary sharing history data, without the need for a user to give an instruction for converting the format.

The terminal device may further comprise a comparison unit that: calculates a difference between a current time acquired by the time acquisition unit and the sharing time included in the sharing history information stored in the sharing history information storage unit; compares the difference to a threshold stored in the format conversion timing storage unit and thereby calculates the time elapsed since the sharing was performed; and converts the format of the sharing history information according to the calculated time.

With this structure, the difference between the current time and the sharing time is calculated. Then, the difference is compared to the threshold. According to a result of the comparison, the format of the sharing history information is converted. This makes it possible to uniformly determine the timing at which the format is converted.

The terminal device may further comprise an input unit. The format conversion timing storage unit may store a format conversion timing input by the input unit.

This enables the user to change the format conversion timing at which the format of the sharing history information is converted.

In the terminal device, the sharing history information may at least include a shared content identifier and a sharing destination user identifier. The sharing history format conversion unit may delete the shared content identifier from the sharing history information.

With this structure, unnecessary sharing history data is reduced by deletion of the shared content identifier.

In the terminal device, the sharing history information may at least include a shared content identifier and a terminal identifier identifying a terminal device of the other user. The sharing history format conversion unit may delete the shared content identifier from the sharing history information.

With this structure, unnecessary sharing history data is reduced by deletion of the shared content identifier.

In the terminal device, the sharing history information may at least include a shared content identifier. The sharing history format conversion unit may replace the sharing history information including the shared content identifier with sharing history information composed of a sharing destination user identifier.

With this structure, the sharing history information at least including the shared content identifier is replaced with the sharing history information composed of the sharing destination user identifier. This downsizes sharing history data.

In the terminal device, the sharing history information may at least include a shared content identifier. The sharing history format conversion unit may replace the sharing history information including the shared content identifier with sharing history information composed of a terminal identifier identifying a terminal device of the other user.

With this structure, the sharing history information at least including the shared content identifier is replaced with the sharing history information composed of the terminal identifier. This downsizes sharing history data.

The terminal device may further comprise a content sharing unit that shares the content. The sharing history storage unit may store a content identifier and a user identifier. The content identifier identifies the content shared by the content sharing unit. The user identifier identifies the other user with whom the content is shared.

With this structure, the content identifier identifying the shared content and the user identifier identifying the user who is a sharing partner can be included in the sharing history information. This enables a sharing source user to check shared contents and sharing partners before deletion of a content.

The terminal device may further comprise a content sharing unit that shares the content. The sharing history storage unit may store a content identifier and a terminal identifier. The content identifier identifies the content shared by the content sharing unit. The terminal identifier identifies a terminal device of the other user with whom the content is shared.

With this structure, the content identifier identifying the shared content and the terminal identifier identifying the terminal device of the user who is a sharing partner can be included in the sharing history information. This enables a sharing source user to check shared contents and the terminal devices of sharing partners before deletion of a content.

The terminal device may further comprise a content deletion unit that allows a user to select whether to delete a specific content or to delete contents of a specific user.

With this structure, the user can select whether to delete the specific content or to delete the contents of the specific user.

The terminal device may further comprise a communication unit that transmits a deletion message corresponding to a deletion target selected by the user.

This makes it possible to convey the deletion target by the deletion message, and to delete at least one content that is the deletion target.

Another aspect of the present invention is a server device for sharing a content with another user and deleting the content thus shared. The server device comprises a sharing history storage unit, a sharing history format conversion unit, and a format conversion timing storage unit. The sharing history storage unit stores sharing history information. The sharing history format conversion unit converts a format of the sharing history information stored in the sharing history storage unit. The format conversion timing storage unit stores a timing at which the sharing history format conversion unit converts the format. The sharing history format conversion unit converts the format at the timing stored in the format conversion timing storage unit.

With this structure, the format of the sharing history information is converted at an appropriate timing. This reduces unnecessary sharing history data and downsizes overall sharing history data.

One aspect of the present invention is a data management method for sharing a content with another user and deleting the content thus shared. The data management method comprises: a sharing history storage step of storing sharing history information; a sharing history format conversion step of converting a format of the sharing history information stored in a sharing history storage unit; and a format conversion timing storage step of storing a timing at which the sharing history format conversion step converts the format. The sharing history format conversion step converts the format at the timing stored by the format conversion timing storage step.

With this method, the format of the sharing history information is converted at an appropriate timing. This reduces unnecessary sharing history data and downsizes overall sharing history data.

Another aspect of the present invention is a computer program used in a terminal device for sharing a content with another user and deleting the content thus shared. The computer program causes the terminal device which is a computer to perform: a sharing history storage step of storing sharing history information into a sharing history storage unit of the terminal device; a sharing history format conversion step of converting a format of the sharing history information stored in the sharing history storage unit; and a format conversion timing storage step of storing a timing at which the sharing history format conversion step converts the format. The sharing history format conversion step converts the format at the timing stored by the format conversion timing storage step.

By executing the computer program, the format of the sharing history information is converted at an appropriate timing. This reduces unnecessary sharing history data and downsizes overall sharing history data.

Another aspect of the present invention is a computer-readable recording medium storing thereon a computer program used in a terminal device for sharing a content with another user and deleting the content thus shared. The computer program causes the terminal device which is a computer to perform: a sharing history storage step of storing sharing history information into a sharing history storage unit of the terminal device; a sharing history format conversion step of converting a format of the sharing history information stored in the sharing history storage unit; and a format conversion timing storage step of storing a timing at which the sharing history format conversion step converts the format. The sharing history format conversion step converts the format at the timing stored by the format conversion timing storage step.

By executing the computer program on the recording medium, the format of the sharing history information is converted at an appropriate timing. This reduces unnecessary sharing history data and downsizes overall sharing history data.

Another aspect of the present invention is an integrated circuit built in a terminal device for sharing a content with another user and deleting the content thus shared. The terminal device comprises a sharing history storage unit that stores sharing history information. The integrated circuit comprises: a sharing history format conversion unit that converts a format of the sharing history information stored in the sharing history storage unit; and a format conversion timing storage unit that stores a timing at which the sharing history format conversion unit converts the format. The sharing history format conversion unit converts the format at the timing stored in the format conversion timing storage unit.

With this structure, the format of the sharing history information is converted at an appropriate timing. This reduces unnecessary sharing history data and downsizes overall sharing history data.

(8) Each of the above devices is specifically a computer system composed of a microprocessor, a ROM, a RAM, a hard disk unit, a display unit, a keyboard, a mouse, and so on. The RAM or the hard disk unit stores a computer program. Here, the computer program is composed of combinations of instruction codes each indicating an instruction to a computer so as to achieve predetermined functions. Functions of each of the devices are achieved by the microprocessor operating in accordance with the computer program. In other words, the microprocessor fetches the instructions contained in the computer program one by one, decodes the fetched instructions, and operates in accordance with a result of the decoding.

Note that each of the devices is not limited to a computer system including all of a microprocessor, a ROM, a RAM, a hard disk unit, a display unit, a keyboard, a mouse, and so on. Each of the devices may be a computer system including some of these components.

Furthermore, owing to the microprocessor operating in accordance with the instructions contained in the computer program stored in the RAM or the hard disk unit, it is possible to make the computer program and the microprocessor appear as if they constituted a single hardware circuit and this hardware circuit were operating.

(9) Some or all of the components constituting each of the above devices may be assembled as one system LSI (Large Scale Integration). A system LSI is an ultra-multifunctional LSI produced by integrating multiple components on one chip. More specifically, a system LSI is a computer system including a microprocessor, ROM, RAM, and so on. The RAM stores a computer program. Functions of the system LSI are achieved by the microprocessor operating in accordance with the computer program.

Also, each of the components of the above devices may be separately integrated into a single chip, or some or all of the components may be integrated into a single chip.

The system LSI is composed of a plurality of circuit blocks.

Furthermore, the method of integration is not limited to an LSI. Integration may be achieved via a dedicated circuit or a general-purpose processor. Furthermore, it is possible to use an FPGA (Field Programmable Gate Array) programmable after manufacturing LSIs or a reconfigurable processor that allows the reconfiguration of the connection and settings of the circuit cells in the LSI.

Furthermore, if technology for assembling integrated circuits that replaces LSIs emerges, owing to advances in semiconductor technology or to another derivative technology, the integration of functional blocks may naturally be accomplished using such technology.

(10) Some or all of the components constituting each of the above devices may be assembled as an IC card detachable from each device, or as a single module. The IC card or the module is a computer system composed of a microprocessor, a ROM, a RAM, and so on. The IC card or the module may include the above super multifunctional LSI. Functions of the IC card or the module are achieved by the microprocessor operating in accordance with a computer program. The IC card or the module may be each tamper-resistant.

(11) The present invention may be implemented by another independent computer system, by transferring a recording medium on which is stored the computer program or a digital signal composed of the computer program or by transferring the computer program or the digital signal via a network or the like.

(12) The above embodiments and modifications may be combined with one another.

INDUSTRIAL APPLICABILITY

A content management device as one aspect of the present invention achieves an advantageous effect of protecting a content of a provider, and is useful as a technology for managing a content shared with another user.

REFERENCE SIGNS LIST 10 network
20 data management system
20a content management system
100, 100a transmission terminal device
101 input/output unit
102 distribution processing unit
103 content storage unit
104 communication unit
105 history storage unit
106 deletion processing unit
107 switching period storage unit
108 history format conversion unit
109 clock
110 setting unit
111 authentication unit
112 control unit
200 server device
201 storage unit
202 authentication unit
203 communication unit
300a, 300b, 300c, reception terminal device
301 input/output unit
302 display processing unit
303 communication unit
304 distribution processing unit
305 deletion processing unit
306 storage unit
307 authentication unit
500 relay server device
501 input/output unit
502 command input/output unit
503 storage unit
504 communication unit
505 history storage unit
507 switching period storage unit
508 history format conversion unit
509 clock
510 setting unit
511 authentication unit
512 control unit
700 terminal device
701 sharing history storage unit
702 sharing history format conversion unit
703 format conversion timing storage unit

The invention claimed is:

1. A content management device for deleting one or more contents shared with and held by a user of another device, comprising:
    a sharing history storage unit;
    a sharing unit configured to: distribute the contents to the user and thereby share the contents with the user; and write sharing history information in a short-term format to the sharing history storage unit, the short-term format of the sharing history information including one or more shared content identifiers that identify the one or more contents, sharing time information that indicates a time at which the one or more contents are shared, and a sharing user identifier that identifies the user; and
    a switching unit configured to switch a method of the deletion to another method according to a time elapsed from the distribution, the switching unit including:
    a threshold storage unit storing a switching threshold;
    a timing acquisition unit configured to acquire a current time;

a difference calculation unit configured to calculate a difference between the current time and the time indicated by the sharing time information included in the sharing history information stored by the sharing history unit;

a comparison unit configured to compare the difference to the switching threshold; and a format conversion unit configured to convert the short-term format to a long-term format when the difference is larger than the switching threshold, the long-term format of the sharing history information including the sharing user identifier and not including the one or more shared content identifiers.

2. The content management device of claim 1, wherein the methods include a first display method and a second display method, the first display method being for displaying information indicating the contents so as to delete one of the contents, and the second display method being for displaying information indicating the user so as to delete all of the contents, and the switching unit switches from the first display method to the second display method when the difference is larger than the switching threshold.

3. The content management device of claim 2, further comprising:

a reception unit configured to receive a request for deleting either the one content or all of the contents with use of one of the first and second display methods to which the switching unit has switched; and a deletion instruction unit configured to give an instruction to delete either the one content or all of the contents according to the request.

4. The content management device of claim 3, further comprising a communication unit configured to transmit a deletion message according to the instruction by the deletion instruction unit.

5. The content management device of claim 1, wherein the methods include a first deletion method and a second deletion method, the first deletion method being for deleting one of the contents, and the second deletion method being for deleting all of the contents, and the switching unit switches from the first deletion method to the second deletion method when the difference is larger than the switching threshold.

6. The content management device of claim 5, further comprising:

a reception unit configured to receive a request for deleting either the one content or all of the contents; and a deletion instruction unit configured to give an instruction to delete either the one content or all of the contents with use of one of the first and second deletion methods to which the switching unit has switched.

7. The content management device of claim 6, further comprising a communication unit configured to transmit a deletion message according to the instruction by the deletion instruction unit.

8. The content management device of claim 1, wherein the threshold storage unit and a calculation procedure of the difference calculation unit constitute a rule holding unit holding a temporal rule defining switching of the methods according to the time elapsed from the distribution; and the timing acquisition unit, the calculation by the difference calculation unit, the comparison unit, and the format conversion unit constitute a switch configured to switch between the short-term format and the long-term format based on the temporal rule.

9. The content management device of claim 8, wherein the content management device is a server device, the rule holding unit holds, as the temporal rule, a timing at which the switching unit switches between display formats of the sharing history information, and the switching unit switches between the display formats according to the timing.

10. The content management device of claim 8, wherein the content management device is a terminal device of a user who provides the contents, the rule holding unit holds, as the temporal rule, a timing at which the switching unit switches a storage format of the sharing history information to another storage format, and the format conversion unit is further configured to convert the storage format according to the timing.

11. The content management device of claim 1, wherein the format conversion unit deletes the shared content identifiers from the sharing history information when the difference is larger than the switching threshold.

12. The content management device of claim 1, wherein the sharing history information further includes a sharing terminal identifier identifying a terminal device owned by the user, and the format conversion unit deletes the shared content identifiers from the sharing history information when the difference is larger than the switching threshold.

13. The content management device of claim 12, wherein the sharing unit is further configured to write the sharing history information including the sharing terminal identifier instead of the sharing user identifier into the sharing history storage unit when sharing contents with the user.

14. The content management device of claim 1, wherein the format conversion unit replaces the sharing history information including the one or more shared content identifiers with sharing history information including a sharing user identifier identifying the user.

15. The content management device of claim 1, wherein the format conversion unit replaces the sharing history information including the one or more shared content identifiers with sharing history information including a sharing terminal identifier identifying a terminal device owned by the user.

16. The content management device of claim 1, further comprising an input unit configured to receive an input of a timing at which the switching is performed, wherein the switching unit holds the timing received by the input unit.

17. A server device for deleting one or more contents shared with and held by a user of another device, comprising:

a sharing history storage unit;

a sharing unit configured to: distribute the contents to the user and thereby share the contents with the user; and write sharing history information in a short-term format to the sharing history storage unit, the short-term format of the sharing history information including one or more shared content identifiers that identify the one or more contents, sharing time information that indicates a time at which the one or more contents are shared, and a sharing user identifier that identifies the user; and a switching unit configured to switch a method of the deletion to another method according to a time elapsed from the distribution, the switching unit including:

a threshold storage unit storing a switching threshold;
a timing acquisition unit configured to acquire a current time;
a difference calculation unit configured to calculate a difference between the current time and the time indicated by the sharing time information included in the sharing history information stored by the sharing history unit;
a comparison unit configured to compare the difference to the switching threshold; and
a format conversion unit configured to convert the short-term format to a long-term format when the difference is larger than the switching threshold, the long-term format of the sharing history information including the sharing user identifier and not including the one or more shared content identifiers.

18. A content management method used in a content management device for deleting one or more contents shared with and held by a user of another device, the content management method comprising the steps of:
storing a sharing history;
distributing the contents to the user and thereby sharing the contents with the user and, in the storing, writing sharing history information in a short-term format, the short-term format of the sharing history information including one or more shared content identifiers that identify the one or more contents, sharing time information that indicates a time at which the one or more contents are shared, and a sharing user identifier that identifies the user; and
switching a method of the deletion to another method according to a time elapsed from the distribution, the switching including:
storing a switching threshold;
acquiring a current time;
calculating a difference between the current time and the time indicated by the sharing time information included in the stored sharing history information;
comparing the difference to the switching threshold; and
converting the short-term format to a long-term format when the difference is larger than the switching threshold, the long-term format of the sharing history information including the sharing user identifier and not including the one or more shared content identifiers.

19. A computer-readable non-transitory recording medium storing thereon a computer program for a content management method used in a content management device for deleting one or more contents shared with and held by a user of another device, the computer program causing a computer to perform the steps of:
storing a sharing history;
distributing the contents to the user and thereby sharing the contents with the user and, in the storing, writing sharing history information in a short-term format, the short-term format of the sharing history information including one or more shared content identifiers that identify the one or more contents, sharing time information that indicates a time at which the one or more contents are shared, and a sharing user identifier that identifies the user; and
switching a method of the deletion to another method according to a time elapsed from the distribution, the switching including:
storing a switching threshold;
acquiring a current time;
calculating a difference between the current time and the time indicated by the sharing time information included in the stored sharing history information;
comparing the difference to the switching threshold; and
converting the short-term format to a long-term format when the difference is larger than the switching threshold, the long-term format of the sharing history information including the sharing user identifier and not including the one or more shared content identifiers.

20. An integrated circuit built in a content management device for deleting one or more contents shared with and held by a user of another device, the integrated circuit comprising:
a sharing history storage unit;
a sharing unit configured to: distribute the contents to the user and thereby share the contents with the user; and write sharing history information in a short-term format to the sharing history storage unit, the short-term format of the sharing history information including one or more shared content identifiers that identify the one or more contents, sharing time information that indicates a time at which the one or more contents are shared, and a sharing user identifier that identifies the user; and
a switching unit configured to switch a method of the deletion to another method according to a time elapsed from the distribution, the switching unit including:
a threshold storage unit storing a switching threshold;
a timing acquisition unit configured to acquire a current time;
a difference calculation unit configured to calculate a difference between the current time and the time indicated by the sharing time information included in the sharing history information stored by the sharing history unit;
a comparison unit configured to compare the difference to the switching threshold; and
a format conversion unit configured to convert the short-term format to a long-term format when the difference is larger than the switching threshold, the long-term format of the sharing history information including the sharing user identifier and not including the one or more shared content identifiers.

* * * * *